US012456909B2

United States Patent
Matteson et al.

(10) Patent No.: US 12,456,909 B2
(45) Date of Patent: Oct. 28, 2025

(54) MODULAR MULTI-LEVEL INVERTER USING CASCADED H-BRIDGES WITH CHARGE BALANCING

(71) Applicant: AC Battery Technology, LLC, East Lansing, MI (US)

(72) Inventors: Arthur William Matteson, East Lansing, MI (US); Stanislav Todromovich, Richmond, VA (US)

(73) Assignee: AC BATTERY TECHNOLOGY LLC, East Lansing, MI (US)

( * ) Notice: Subject to any disclaimer, the term of this patent is extended or adjusted under 35 U.S.C. 154(b) by 133 days.

(21) Appl. No.: 18/397,050

(22) Filed: Dec. 27, 2023

(65) Prior Publication Data

US 2024/0235362 A1 Jul. 11, 2024

Related U.S. Application Data

(60) Provisional application No. 63/534,067, filed on Aug. 22, 2023, provisional application No. 63/479,182, filed on Jan. 9, 2023.

(51) Int. Cl.
*B60L 53/22* (2019.01)
*H02J 7/00* (2006.01)
(Continued)

(52) U.S. Cl.
CPC ............ *H02M 1/0012* (2021.05); *B60L 53/22* (2019.02); *H02J 7/0068* (2013.01); *H02M 7/493* (2013.01);
(Continued)

(58) Field of Classification Search
CPC ........ H02J 3/1857; H02M 7/49; H02M 7/537; H02M 7/53875; Y02E 10/56; Y02E 40/10; Y02E 40/20
(Continued)

(56) References Cited

U.S. PATENT DOCUMENTS 3,839,667 A * 10/1974 King ..................... H02M 7/537
363/40
5,642,275 A * 6/1997 Peng .................... H02M 7/4835
363/58
(Continued)

FOREIGN PATENT DOCUMENTS

JP 2016158340 A * 9/2016

*Primary Examiner* — Elim Ortiz

(74) *Attorney, Agent, or Firm* — Boris Leschinsky

(57) ABSTRACT

A multi-level inverter using cascaded H-bridge modules, where each module can balance its at least two charge storage elements by means of voltage equalization. Modules are arranged in series into at least one cascade inverter phase with optional center taps, and modules communicate with a control unit by being addressed over at least one serial communication bus. Additional features that can be included in embodiments are the configuration of modules to react to multiple specific addresses in order to increase the maximum output voltage slew rate, metal circuit breaking springs to provide fusing within modules, and the ability to interconnect multiple physically distinct inverters into a single unit. This inverter is predominantly intended for electric vehicle applications, and the optional incorporation of a switching array allows the possibility for power transfer to or from a wide range of voltage sources including other inverters.

37 Claims, 52 Drawing Sheets

(51) Int. Cl.
*H02M 1/00* (2007.01)
*H02M 7/493* (2007.01)
*H02M 7/5387* (2007.01)

(52) U.S. Cl.
CPC ..... *H02M 7/53873* (2013.01); *H02J 2207/20* (2020.01)

(58) Field of Classification Search
USPC ............................... 361/79; 363/137, 40, 58
See application file for complete search history.

(56) References Cited

U.S. PATENT DOCUMENTS

2018/0015831 A1* 1/2018 Rozman .................. B60L 50/40
2022/0103088 A1* 3/2022 Slepchenkov ........ H02J 7/0042

* cited by examiner

NOTE: FINE LINES SHOW CONTOUR BY MARKING LIMITS OF CURVED AREAS

NOTE: FINE LINES SHOW CONTOUR BY MARKING LIMITS OF CURVED AREAS

NOTE: FINE LINES SHOW CONTOUR BY MARKING LIMITS OF CURVED AREAS

NOTE: FINE LINES SHOW CONTOUR BY MARKING LIMITS OF CURVED AREAS

NOTE: FINE LINES SHOW CONTOUR BY MARKING LIMITS OF CURVED AREAS

NOTE: FINE LINES SHOW CONTOUR BY MARKING LIMITS OF CURVED AREAS

NOTE: FINE LINES SHOW CONTOUR BY MARKING LIMITS OF CURVED AREAS

NOTE: FINE LINES SHOW CONTOUR BY MARKING LIMITS OF CURVED AREAS

| NAME | DEFINITION | HEATERS | CENTER TAPS | COMBINING |
|---|---|---|---|---|
| MC | MOTORCYCLE | PER PACK (1) | YES | N/A |
| GS | GENERATOR SET | PER MODULE | YES | RECESSIVE |
| ST | SMALL SEMI TRAILER | PER MODULE | YES | RECESSIVE |
| LT | LARGE SEMI TRAILER | PER MODULE | NO | RECESSIVE |
| SC | SMALL PASSENGER CAR | PER PHASE (3) | YES | N/A |
| LC | LARGE PASSENGER CAR | PER MODULE | YES | N/A |
| SV | SMALL WORK VAN | PER MODULE | YES | DOMINANT |
| MV | MEDIUM WORK VAN | PER MODULE | NO | DOMINANT |
| LV | LARGE WORK VAN | PER MODULE | NO | DOMINANT |
| SM | SEMI TRUCK | PER MODULE | NO | DOMINANT |
| D + R | DOMINANT + RECESSIVE COMBINATION | | | |

| TERM | FULL DESCRIPTION |
|---|---|
| APPLICATION | INVERTER CONFIGURATION OR COMBINATION |
| TOTAL PHASES | NUMBER OF CASCADE PHASES |
| TOTAL BUSES | NUMBER OF COMMUNICATION BUSES |
| MODULES / PHASE | NUMBER OF MODULES PER PHASE |
| MODULES / BUS | NUMBER OF MODULES PER COMMUNICATION BUS |
| TOTAL MODULES | TOTAL NUMBER OF MODULES |
| EQUIV. MOD. / PHASE | MODULES PER PHASE IN UNFOLDED COMBINATION |
| AMP-HOURS / MODULE | AMP-HOURS OF CELLS WITHIN EACH MODULE |
| NOM. VOLTS / MODULE | TOTAL VOLTAGE OF CELLS WITHIN EACH MODULE |
| VOLTS / PHASE | NOMINAL UNFOLDED VOLTAGE PER PHASE |
| FOLDED MOD. / PHASE | MODULES PER PHASE IN FOLDED COMBINATION |
| F. EQUIV. M. / PHASE | VOLTAGE-WISE EQUIVALENT MODULES PER PHASE |
| F. VOLTS / PHASE | NOMINAL FOLDED VOLTAGE PER PHASE |
| F. EQUIV. A-H / MODULE | EQUIVALENT AMP-HOURS OF CELLS WHEN FOLDED |
| KW-HOURS TOTAL | KILOWATT-HOURS OF ENTIRE INVERTER SYSTEM |
| VDC SERIES | DC VOLTAGE WITH SERIES PHASES |
| VDC HALF SERIES | DC VOLTAGE WITH FOLDED SERIES PHASES |
| VDC PARALLEL | DC VOLTAGE WITH PARALLEL PHASES |
| 1PH VAC SERIES | 1-PHASE AC VOLTAGE WITH SERIES PHASES |
| 1PH VAC HALF SERIES | 1-PHASE AC VOLTAGE WITH FOLDED SERIES PHASES |
| 1PH VAC PARALLEL | 1-PHASE AC VOLTAGE WITH PARALLEL PHASES |
| 3PH VAC(L-L) WYE | 3-PHASE AC VOLTAGE IN WYE TOPOLOGY |
| 3PH VAC(L-L) DELTA | 3-PHASE AC VOLTAGE IN DELTA TOPOLOGY |

FIG. 38

| APPLICATION | MC | GS | ST | LT | SC | LC | SV | MV | LV | SM |
|---|---|---|---|---|---|---|---|---|---|---|
| TOTAL PHASES | 3 | 3 | 3 | 3 | 3 | 3 | 3 | 3 | 3 | 3 |
| TOTAL BUSES | 1 | 1 | 2 | 2 | 3 | 3 | 3 | 3 | 3 | 3 |
| MODULES / PHASE | 20 | 20 | 60 | 60 | 60 | 72 | 84 | 108 | 108 | 126 |
| MODULES / BUS | 60 | 60 | 90 | 90 | 60 | 72 | 84 | 108 | 108 | 126 |
| TOTAL MODULES | 60 | 60 | 180 | 180 | 180 | 216 | 252 | 324 | 324 | 378 |
| AMP-HOURS / MODULE | 20 | 40 | 80 | 160 | 40 | 60 | 60 | 60 | 80 | 160 |
| NOM. VOLTS / MODULE | 7.4 | 6.6 | 6.6 | 6.6 | 6.6 | 6.6 | 6.6 | 6.6 | 6.6 | 6.6 |
| VOLTS / PHASE | 148 | 132 | 396 | 396 | 396 | 475 | 554 | 713 | 713 | 832 |
| KW-HOURS TOTAL | 8.9 | 15.8 | 95.0 | 190 | 47.5 | 85.5 | 100 | 128 | 171 | 399 |
| VDC SERIES | 444 | 396 | 1188 | 1188 | 1188 | 1426 | 1663 | 2138 | 2138 | 2495 |
| VDC HALF SERIES | 222 | 198 | 594 | 594 | 594 | 713 | 832 | N/A | N/A | N/A |
| VDC PARALLEL | N/A | N/A | 396 | 396 | 396 | 475 | 554 | 713 | 713 | 832 |
| 1PH VAC SERIES | 314 | 280 | 840 | 840 | 840 | 1008 | 1176 | 1512 | 1512 | 1764 |
| 1PH VAC HALF SERIES | 157 | 140 | 420 | 420 | 420 | 504 | 588 | N/A | N/A | N/A |
| 1PH VAC PARALLEL | N/A | N/A | 280 | 280 | 280 | 336 | 392 | 504 | 504 | 588 |
| 3PH VAC(L-L) WYE | N/A | N/A | 560 | 560 | 560 | 672 | 784 | 1008 | 1008 | 1176 |
| 3PH VAC(L-L) DELTA | N/A | N/A | 280 | 280 | 280 | 336 | 392 | 504 | 504 | 588 |

| APPLICATION | SV + GS | MV + GS | LV + GS | SM + ST | SM + LT |
|---|---|---|---|---|---|
| TOTAL PHASES | 3 | 3 | 3 | 3 | 3 |
| TOTAL BUSES | 3 + 1 | 3 + 1 | 3 + 1 | 3 + 2 | 3 + 2 |
| MODULES / PHASE | 84 & 20 | 108 & 20 | 108 & 20 | 126 & 60 | 126 & 60 |
| MODULES / BUS | 84 & 60 | 108 & 60 | 108 & 60 | 126 & 90 | 126 & 90 |
| TOTAL MODULES | 312 | 384 | 384 | 558 | 558 |
| EQUIV. MOD. / PHASE | 104 | 128 | 128 | 186 | 186 |
| AMP-HOURS / MODULE | 60 & 40 | 60 & 40 | 80 & 40 | 160 & 80 | 160 & 160 |
| NOM. VOLTS / MODULE | 6.6 | 6.6 | 6.6 | 6.6 | 6.6 |
| VOLTS / PHASE | 686 | 845 | 845 | 1228 | 1228 |
| FOLDED MOD. / PHASE | 84 & 20 | 108 & 20 | 108 & 10 | 126 & 30 | 126 & 60 |
| F. EQUIV. M. / PHASE | 104 | 128 | 118 | 156 | 186 |
| F. VOLTS / PHASE | 686 | 845 | 779 | 1030 | 1228 |
| F. EQUIV. A-H / MODULE | 56.2 | 56.9 | 80.0 | 160.0 | 160.0 |
| KW-HOURS TOTAL | 116 | 144 | 187 | 494 | 589 |
| VDC SERIES | 2059 | 2534 | 2336 | 3089 | 3683 |
| VDC HALF SERIES | 1030 | N/A | N/A | N/A | N/A |
| VDC PARALLEL | 686 | 845 | 779 | 1030 | 1228 |
| 1PH VAC SERIES | 1456 | 1792 | 1652 | 2184 | 2604 |
| 1PH VAC HALF SERIES | 728 | N/A | N/A | N/A | N/A |
| 1PH VAC PARALLEL | 485 | 597 | 551 | 728 | 868 |
| 3PH VAC(L-L) WYE | 971 | 1195 | 1101 | 1456 | 1736 |
| 3PH VAC(L-L) DELTA | 485 | 597 | 551 | 728 | 868 |

FIG. 39

TYPE: MC

| OPERATING MODE | 42 SWITCH SUFFIX |  |  |  |  |  | 53 SWITCH SUFFIX |  |  |  |  |  |  |  |
|---|---|---|---|---|---|---|---|---|---|---|---|---|---|---|
|  | r | q | b | g | i | j | n | e | s | m | o | a | d | t |
| DRIVE | C |  | C | C |  |  | C | C |  |  | C |  |  |  |
| AUXILIARY 1PH 240VAC | C | C |  | C |  |  | C | C |  |  | C |  |  |  |
| AUXILIARY 1PH 120VAC | C | C |  |  | C |  | C | C |  |  | C |  |  |  |
| CHARGING 1PH 240VAC | C | C |  | C |  |  | C | C |  |  |  |  | C | T |
| CHARGING 1PH 120VAC | C | C |  |  | C |  | C | C |  |  |  |  | C | T |
| CHARGING DC FULL | C | C |  | C |  |  | C | C |  |  |  |  | C | T |
| CHARGING DC HALF | C | C |  |  | C |  | C | C |  |  |  |  | C | T |

TYPE: GS

| OPERATING MODE | 44 SWITCH SUFFIX |  |  |  |  |  | 54 SWITCH SUFFIX |  |  |  |
|---|---|---|---|---|---|---|---|---|---|---|
|  | r | q | b | g | i | j | e | o | a | d |
| SPLIT-PHASE 120/240VAC | C |  | C | C |  |  |  | C |  |  |
| CHARGING 1PH 240VAC | C | C |  | C |  |  | C |  | C |  |
| CHARGING 1PH 120VAC | C | C |  |  | C |  | C |  | C |  |
| CHARGING DC HIGH | C | C |  | C |  |  | C |  |  | C |
| CHARGING DC LOW | C | C |  |  | C |  | C |  |  | C |
| INTERSP. UNFILT. FULL | C |  | C | C |  |  |  |  |  |  |
| INTERSP. UNFILT. HALF | C | C | C | C | C |  |  |  |  |  |
| INTERSP. FILT. FULL | C |  | C | C |  |  |  |  |  |  |
| INTERSP. FILT. HALF | C | C |  |  | C |  |  |  |  |  |

TYPE: SC

| OPERATING MODE | 43 SWITCH SUFFIX |  |  |  |  |  |  | 51 SWITCH SUFFIX |  |  |  |  |  |  |  |  |  |
|---|---|---|---|---|---|---|---|---|---|---|---|---|---|---|---|---|---|
|  | r | q | b | g | i | j | t | n | e | s | k | p | m | o | c | a | d |
| DRIVE | C |  | C | C |  |  | C | C | C |  |  |  | C |  |  |  |  |
| AUX. 1PH SERIES | C | C |  | C |  |  |  | C | C |  |  |  | C |  |  |  |  |
| AUX. 1PH HALF SERIES | C | C |  |  | C |  | C | C | C |  |  |  | C |  |  |  |  |
| AUX. 1PH PARALLEL | C |  | C | C |  |  | C | C | C |  |  | C | C |  |  |  |  |
| CHARGING 3PH WYE | C |  | C | C |  |  | T | C | C |  |  |  |  |  | C |  |  |
| CHARGING 3PH DELTA | C |  | C | C |  |  | T |  | C | C |  |  |  |  | C |  |  |
| CHG. 1PH SERIES | C |  | C | C |  |  | T | C | C |  |  |  |  |  |  | C |  |
| CHG. 1PH HALF SERIES | C | C |  |  | C |  | T | C | C |  |  |  |  |  |  | C |  |
| CHG. 1PH PARALLEL | C |  | C | C |  |  | T | C | C |  |  | C |  |  |  | C |  |
| CHG. DC SERIES | C |  | C | C |  |  | T | C | C |  |  |  |  |  |  |  | C |
| CHG. DC HALF SERIES | C | C |  |  | C |  | T | C | C |  |  |  |  |  |  |  | C |
| CHG. DC PARALLEL | C |  | C | C |  |  | T | C | C |  |  | C |  |  |  |  | C |

'C': SWITCH CLOSED — 'T': SWITCH STATE BASED ON PACK TEMPERATURE

FIG. 40A

| TYPE: ST | 42 SWITCH SUFFIX | | | | | | 51 SWITCH SUFFIX | | | | | | | | | |
|---|---|---|---|---|---|---|---|---|---|---|---|---|---|---|---|---|
| OPERATING MODE | r | q | b | g | i | j | n | e | s | k | p | m | o | c | a | d |
| AUXILIARY 3PH WYE | C |  | C | C |  |  | C | C |  |  |  | C |  |  |  |  |
| AUXILIARY 3PH DELTA | C |  | C | C |  |  |  |  | C | C |  | C |  |  |  |  |
| AUX. 1PH SERIES | C |  | C | C |  |  |  | C | C |  |  |  | C |  |  |  |
| AUX. 1PH HALF SERIES | C | C |  |  |  | C |  | C | C |  |  |  | C |  |  |  |
| AUX. 1PH PARALLEL | C |  | C | C |  |  | C | C |  |  |  | C | C |  |  |  |
| CHARGING 3PH WYE | C |  | C | C |  |  | C | C |  |  |  |  |  | C |  |  |
| CHARGING 3PH DELTA | C |  | C | C |  |  |  |  | C | C |  |  |  | C |  |  |
| CHG. 1PH SERIES | C |  | C | C |  |  |  | C | C |  |  |  |  |  | C |  |
| CHG. 1PH HALF SERIES | C | C |  |  |  | C |  | C | C |  |  |  |  |  | C |  |
| CHG. 1PH PARALLEL | C |  | C | C |  |  | C | C |  |  |  | C |  |  | C |  |
| CHG. DC SERIES | C |  | C | C |  |  |  | C | C |  |  |  |  |  |  | C |
| CHG. DC HALF SERIES | C | C |  |  |  | C |  | C | C |  |  |  |  |  |  | C |
| CHG. DC PARALLEL | C |  | C | C |  |  | C | C |  |  |  | C |  |  |  | C |
| INTERSP. UNFILT. FULL | C |  |  | C | C |  |  |  |  |  |  |  |  |  |  |  |
| INTERSP. UNFILT. HALF | C | C | C | C |  | C |  |  |  |  |  |  |  |  |  |  |
| INTERSP. FILT. FULL | C |  | C | C |  |  |  |  |  |  |  |  |  |  |  |  |
| INTERSP. FILT. HALF | C | C |  |  |  | C |  |  |  |  |  |  |  |  |  |  |

| TYPE: LT | 41 SWITCH SUFFIX | | 51 SWITCH SUFFIX | | | | | | | | | |
|---|---|---|---|---|---|---|---|---|---|---|---|---|
| OPERATING MODE | r | g | n | e | s | k | p | m | o | c | a | d |
| AUXILIARY 3PH WYE | C |  | C | C |  |  |  | C |  |  |  |  |
| AUXILIARY 3PH DELTA | C |  |  |  | C | C |  | C |  |  |  |  |
| AUX. 1PH SERIES | C |  |  | C | C |  |  |  | C |  |  |  |
| AUX. 1PH PARALLEL | C |  | C | C |  |  |  | C | C |  |  |  |
| CHARGING 3PH WYE | C |  | C | C |  |  |  |  |  | C |  |  |
| CHARGING 3PH DELTA | C |  |  |  | C | C |  |  |  | C |  |  |
| CHG. 1PH SERIES | C |  |  | C | C |  |  |  |  |  | C |  |
| CHG. 1PH PARALLEL | C |  | C | C |  |  |  | C |  |  | C |  |
| CHG. DC SERIES | C |  |  | C | C |  |  |  |  |  |  | C |
| CHG. DC PARALLEL | C |  | C | C |  |  |  | C |  |  |  | C |
| INTERSP. UNFILTERED | C | C |  |  |  |  |  |  |  |  |  |  |
| INTERSP. FILTERED | C |  |  |  |  |  |  |  |  |  |  |  |

'C': SWITCH CLOSED — 'T': SWITCH STATE BASED ON PACK TEMPERATURE

FIG. 40B

| TYPE: LC | 42 SWITCH SUFFIX | | | | | | 51 SWITCH SUFFIX | | | | | | | | | |
|---|---|---|---|---|---|---|---|---|---|---|---|---|---|---|---|---|
| OPERATING MODE | r | q | b | g | i | j | n | e | s | k | p | m | o | c | a | d |
| DRIVE | C |  | C | C |  |  | C | C |  |  | C |  |  |  |  |  |
| AUX. 1PH SERIES | C | C |  | C |  |  | C | C |  |  |  |  | C |  |  |  |
| AUX. 1PH HALF SERIES | C | C |  |  |  | C | C | C |  |  |  |  | C |  |  |  |
| AUX. 1PH PARALLEL | C | C |  | C |  |  | C | C |  |  |  | C | C |  |  |  |
| CHARGING 3PH WYE | C | C |  | C |  |  | C | C |  |  |  |  |  | C |  |  |
| CHARGING 3PH DELTA | C | C |  | C |  |  |  |  | C | C |  |  |  | C |  |  |
| CHG. 1PH SERIES | C | C |  | C |  |  | C | C |  |  |  |  |  |  | C |  |
| CHG. 1PH HALF SERIES | C | C |  |  |  | C | C | C |  |  |  |  |  |  | C |  |
| CHG. 1PH PARALLEL | C | C |  | C |  |  | C | C |  |  |  | C |  |  | C |  |
| CHG. DC SERIES | C | C |  | C |  |  | C | C |  |  |  |  |  |  |  | C |
| CHG. DC HALF SERIES | C | C |  |  |  | C | C | C |  |  |  |  |  |  |  | C |
| CHG. DC PARALLEL | C | C |  | C |  |  | C | C |  |  |  | C |  |  |  | C |

| TYPE: SV | 42 SWITCH SUFFIX | | | | | | 52 SWITCH SUFFIX | | | | | | | | | |
|---|---|---|---|---|---|---|---|---|---|---|---|---|---|---|---|---|
| OPERATING MODE | r | q | b | g | i | j | n | e | s | k | p | m | o | c | a | d |
| DRIVE | C |  | C | C |  |  | C | C |  |  | C |  |  |  |  |  |
| AUX. 1PH SERIES | C | C |  | C |  |  | C | C |  |  |  |  | C |  |  |  |
| AUX. 1PH HALF SERIES | C | C |  |  |  | C | C | C |  |  |  |  | C |  |  |  |
| AUX. 1PH PARALLEL | C | C |  | C |  |  | C | C |  |  |  | C | C |  |  |  |
| CHARGING 3PH WYE | C | C |  | C |  |  | C | C |  |  |  |  |  | C |  |  |
| CHARGING 3PH DELTA | C | C |  | C |  |  |  |  | C | C |  |  |  | C |  |  |
| CHG. 1PH SERIES | C | C |  | C |  |  | C | C |  |  |  |  |  |  | C |  |
| CHG. 1PH HALF SERIES | C | C |  |  |  | C | C | C |  |  |  |  |  |  | C |  |
| CHG. 1PH PARALLEL | C | C |  | C |  |  | C | C |  |  |  | C |  |  | C |  |
| CHG. DC SERIES | C | C |  | C |  |  | C | C |  |  |  |  |  |  |  | C |
| CHG. DC HALF SERIES | C | C |  |  |  | C | C | C |  |  |  |  |  |  |  | C |
| CHG. DC PARALLEL | C | C |  | C |  |  | C | C |  |  |  | C |  |  |  | C |

| TYPE: MV/LV/SM | 41 SWITCH SUFFIX | | | 52 SWITCH SUFFIX | | | | | | | | | |
|---|---|---|---|---|---|---|---|---|---|---|---|---|---|
| OPERATING MODE | r | g | | n | e | s | k | p | m | o | c | a | d |
| DRIVE | C | C | | C | C |  |  | C |  |  |  |  |  |
| AUX. 1PH SERIES | C |  | | C | C |  |  |  |  | C |  |  |  |
| AUX. 1PH PARALLEL | C |  | | C | C |  |  |  | C | C |  |  |  |
| CHARGING 3PH WYE | C |  | | C | C |  |  |  |  |  | C |  |  |
| CHARGING 3PH DELTA | C |  | |  |  | C | C |  |  |  | C |  |  |
| CHG. 1PH SERIES | C |  | | C | C |  |  |  |  |  |  | C |  |
| CHG. 1PH PARALLEL | C |  | | C | C |  |  |  | C |  |  | C |  |
| CHG. DC SERIES | C |  | | C | C |  |  |  |  |  |  |  | C |
| CHG. DC PARALLEL | C |  | | C | C |  |  |  | C |  |  |  | C |

'C': SWITCH CLOSED — 'T': SWITCH STATE BASED ON PACK TEMPERATURE

FIG. 40C

THREE PHASES PER BUS, PREFERABLY 20 MODULES PER PHASE

PHASE U

| 1X | 01 | 0B | 02 | 0C | 03 | 0D | 04 | 0E | 05 | 0F | 06 | 10 | 07 | 11 | 08 | 12 | 09 | 13 | 0A | 14 |
|---|---|---|---|---|---|---|---|---|---|---|---|---|---|---|---|---|---|---|---|---|
| 2X | 3D | | 3E | | 3F | | 40 | | 41 | | 42 | | 43 | | 44 | | 45 | | 46 | |
| 3X | 5B | 5C | 5D | 5E | 5F | 60 | 61 | 62 | 63 | 64 | 65 | 66 | 67 | 68 | 69 | 6A | 6B | 6C | 6D | 6E |
| 6X | 6F | | 70 | | 71 | | 72 | | 73 | | 74 | | 75 | | 76 | | 77 | | 78 | |

PHASE V

| 1X | 15 | 1F | 16 | 20 | 17 | 21 | 18 | 22 | 19 | 23 | 1A | 24 | 1B | 25 | 1C | 26 | 1D | 27 | 1E | 28 |
|---|---|---|---|---|---|---|---|---|---|---|---|---|---|---|---|---|---|---|---|---|
| 2X | 47 | | 48 | | 49 | | 4A | | 4B | | 4C | | 4D | | 4E | | 4F | | 50 | |
| 3X | 5B | 5C | 5D | 5E | 5F | 60 | 61 | 62 | 63 | 64 | 65 | 66 | 67 | 68 | 69 | 6A | 6B | 6C | 6D | 6E |
| 6X | 6F | | 70 | | 71 | | 72 | | 73 | | 74 | | 75 | | 76 | | 77 | | 78 | |

PHASE W

| 1X | 29 | 33 | 2A | 34 | 2B | 35 | 2C | 36 | 2D | 37 | 2E | 38 | 2F | 39 | 30 | 3A | 31 | 3B | 32 | 3C |
|---|---|---|---|---|---|---|---|---|---|---|---|---|---|---|---|---|---|---|---|---|
| 2X | 51 | | 52 | | 53 | | 54 | | 55 | | 56 | | 57 | | 58 | | 59 | | 5A | |
| 3X | 5B | 5C | 5D | 5E | 5F | 60 | 61 | 62 | 63 | 64 | 65 | 66 | 67 | 68 | 69 | 6A | 6B | 6C | 6D | 6E |
| 6X | 6F | | 70 | | 71 | | 72 | | 73 | | 74 | | 75 | | 76 | | 77 | | 78 | |

THREE PHASES PER BUS, PREFERABLY 30 MODULES PER PHASE

PHASE U

| 1X | 01 | 02 | 03 | 04 | 05 | 06 | 07 | 08 | 09 | 0A | 0B | 0C | 0D | 0E | 0F |
|---|---|---|---|---|---|---|---|---|---|---|---|---|---|---|---|
| 3X | 5B | 5C | 5D | 5E | 5F | 60 | 61 | 62 | 63 | 64 | 65 | 66 | 67 | 68 | 69 |

| 1X | 10 | 11 | 12 | 13 | 14 | 15 | 16 | 17 | 18 | 19 | 1A | 1B | 1C | 1D | 1E |
|---|---|---|---|---|---|---|---|---|---|---|---|---|---|---|---|
| 3X | 6A | 6B | 6C | 6D | 6E | 6F | 70 | 71 | 72 | 73 | 74 | 75 | 76 | 77 | 78 |

PHASE V

| 1X | 1F | 20 | 21 | 22 | 23 | 24 | 25 | 26 | 27 | 28 | 29 | 2A | 2B | 2C | 2D |
|---|---|---|---|---|---|---|---|---|---|---|---|---|---|---|---|
| 3X | 5B | 5C | 5D | 5E | 5F | 60 | 61 | 62 | 63 | 64 | 65 | 66 | 67 | 68 | 69 |

| 1X | 2E | 2F | 30 | 31 | 32 | 33 | 34 | 35 | 36 | 37 | 38 | 39 | 3A | 3B | 3C |
|---|---|---|---|---|---|---|---|---|---|---|---|---|---|---|---|
| 3X | 6A | 6B | 6C | 6D | 6E | 6F | 70 | 71 | 72 | 73 | 74 | 75 | 76 | 77 | 78 |

PHASE W

| 1X | 3D | 3E | 3F | 40 | 41 | 42 | 43 | 44 | 45 | 46 | 47 | 48 | 49 | 4A | 4B |
|---|---|---|---|---|---|---|---|---|---|---|---|---|---|---|---|
| 3X | 5B | 5C | 5D | 5E | 5F | 60 | 61 | 62 | 63 | 64 | 65 | 66 | 67 | 68 | 69 |

| 1X | 4C | 4D | 4E | 4F | 50 | 51 | 52 | 53 | 54 | 55 | 56 | 57 | 58 | 59 | 5A |
|---|---|---|---|---|---|---|---|---|---|---|---|---|---|---|---|
| 3X | 6A | 6B | 6C | 6D | 6E | 6F | 70 | 71 | 72 | 73 | 74 | 75 | 76 | 77 | 78 |

FIG. 41A

ONE PHASE PER BUS, PREFERABLY 60 MODULES

| | | | | | | | | | | | | | | | | | | | | |
|---|---|---|---|---|---|---|---|---|---|---|---|---|---|---|---|---|---|---|---|---|
| 1X | 01 | 10 | 1F | 2E | 02 | 11 | 20 | 2F | 03 | 12 | 21 | 30 | 04 | 13 | 22 | 31 | 05 | 14 | 23 | 32 |
| 2X | 3D | 3D | 4C | 4C | 3E | 3E | 4D | 4D | 3F | 3F | 4E | 4E | 40 | 40 | 4F | 4F | 41 | 41 | 50 | 50 |
| 3X | 5B | 6A | 65 | 60 | 5C | 6B | 66 | 61 | 5D | 6C | 67 | 62 | 5E | 6D | 68 | 63 | 5F | 6E | 69 | 64 |
| 4X | 6F | 6F | 6F | 6F | 70 | 70 | 70 | 70 | 71 | 71 | 71 | 71 | 72 | 72 | 72 | 72 | 73 | 73 | 73 | 73 |
| 1X | 06 | 15 | 24 | 33 | 07 | 16 | 25 | 34 | 08 | 17 | 26 | 35 | 09 | 18 | 27 | 36 | 0A | 19 | 28 | 37 |
| 2X | 42 | 42 | 51 | 51 | 43 | 43 | 52 | 52 | 44 | 44 | 53 | 53 | 45 | 45 | 54 | 54 | 46 | 46 | 55 | 55 |
| 3X | 60 | 5B | 6A | 65 | 61 | 5C | 6B | 66 | 62 | 5D | 6C | 67 | 63 | 5E | 6D | 68 | 64 | 5F | 6E | 69 |
| 4X | 74 | 74 | 74 | 74 | 75 | 75 | 75 | 75 | 76 | 76 | 76 | 76 | 77 | 77 | 77 | 77 | 78 | 78 | 78 | 78 |
| 1X | 0B | 1A | 29 | 38 | 0C | 1B | 2A | 39 | 0D | 1C | 2B | 3A | 0E | 1D | 2C | 3B | 0F | 1E | 2D | 3C |
| 2X | 47 | 47 | 56 | 56 | 48 | 48 | 57 | 57 | 49 | 49 | 58 | 58 | 4A | 4A | 59 | 59 | 4B | 4B | 5A | 5A |
| 3X | 65 | 60 | 5B | 6A | 66 | 61 | 5C | 6B | 67 | 62 | 5D | 6C | 68 | 63 | 5E | 6D | 69 | 64 | 5F | 6E |
| 4X | 79 | 79 | 79 | 79 | 7A | 7A | 7A | 7A | 7B | 7B | 7B | 7B | 7C | 7C | 7C | 7C | 7D | 7D | 7D | 7D |

ONE PHASE PER BUS, PREFERABLY 72 MODULES

| | | | | | | | | | | | | | | | | | | | | | | | | |
|---|---|---|---|---|---|---|---|---|---|---|---|---|---|---|---|---|---|---|---|---|---|---|---|---|
| 1X | 01 | 25 | 13 | 37 | 02 | 26 | 14 | 38 | 03 | 27 | 15 | 39 | 04 | 28 | 16 | 3A | 05 | 29 | 17 | 3B | 06 | 2A | 18 | 3C |
| 2X | 49 | 49 | 5B | 5B | 4A | 4A | 5C | 5C | 4B | 4B | 5D | 5D | 4C | 4C | 5E | 5E | 4D | 4D | 5F | 5F | 4E | 4E | 60 | 60 |
| 4X | 6D | 6D | 6D | 6D | 6E | 6E | 6E | 6E | 6F | 6F | 6F | 6F | 70 | 70 | 70 | 70 | 71 | 71 | 71 | 71 | 72 | 72 | 72 | 72 |
| 1X | 07 | 2B | 19 | 3D | 08 | 2C | 1A | 3E | 09 | 2D | 1B | 3F | 0A | 2E | 1C | 40 | 0B | 2F | 1D | 41 | 0C | 30 | 1E | 42 |
| 2X | 4F | 4F | 61 | 61 | 50 | 50 | 62 | 62 | 51 | 51 | 63 | 63 | 52 | 52 | 64 | 64 | 53 | 53 | 65 | 65 | 54 | 54 | 66 | 66 |
| 4X | 73 | 73 | 73 | 73 | 74 | 74 | 74 | 74 | 75 | 75 | 75 | 75 | 76 | 76 | 76 | 76 | 77 | 77 | 77 | 77 | 78 | 78 | 78 | 78 |
| 1X | 0D | 31 | 1F | 43 | 0E | 32 | 20 | 44 | 0F | 33 | 21 | 45 | 10 | 34 | 22 | 46 | 11 | 35 | 23 | 47 | 12 | 36 | 24 | 48 |
| 2X | 55 | 55 | 67 | 67 | 56 | 56 | 68 | 68 | 57 | 57 | 69 | 69 | 58 | 58 | 6A | 6A | 59 | 59 | 6B | 6B | 5A | 5A | 6C | 6C |
| 4X | 79 | 79 | 79 | 79 | 7A | 7A | 7A | 7A | 7B | 7B | 7B | 7B | 7C | 7C | 7C | 7C | 7D | 7D | 7D | 7D | 7E | 7E | 7E | 7E |

ONE PHASE PER BUS, PREFERABLY 84 MODULES

| | | | | | | | | | | | | | | | | | | | | | | | | |
|---|---|---|---|---|---|---|---|---|---|---|---|---|---|---|---|---|---|---|---|---|---|---|---|---|
| 1X | 01 | 2B | 02 | 2C | 03 | 2D | 04 | 2E | 05 | 2F | 06 | 30 | 07 | 31 | 08 | 32 | 09 | 33 | 0A | 34 | 0B | 35 | 0C | 36 |
| 2X | 55 | 55 | 56 | 56 | 57 | 57 | 58 | 58 | 59 | 59 | 5A | 5A | 5B | 5B | 5C | 5C | 5D | 5D | 5E | 5E | 5F | 5F | 60 | 60 |
| 1X | 0D | 37 | 0E | 38 | 0F | 39 | 10 | 3A | 11 | 3B | 12 | 3C | 13 | 3D | 14 | 3E | 15 | 3F | 16 | 40 | 17 | 41 | 18 | 42 |
| 2X | 61 | 61 | 62 | 62 | 63 | 63 | 64 | 64 | 65 | 65 | 66 | 66 | 67 | 67 | 68 | 68 | 69 | 69 | 6A | 6A | 6B | 6B | 6C | 6C |
| 1X | 19 | 43 | 1A | 44 | 1B | 45 | 1C | 46 | 1D | 47 | 1E | 48 | 1F | 49 | 20 | 4A | 21 | 4B | 22 | 4C | 23 | 4D | 24 | 4E |
| 2X | 6D | 6D | 6E | 6E | 6F | 6F | 70 | 70 | 71 | 71 | 72 | 72 | 73 | 73 | 74 | 74 | 75 | 75 | 76 | 76 | 77 | 77 | 78 | 78 |
| 1X | 25 | 4F | 26 | 50 | 27 | 51 | 28 | 52 | 29 | 53 | 2A | 54 | | | | | | | | | | | | |
| 2X | 79 | 79 | 7A | 7A | 7B | 7B | 7C | 7C | 7D | 7D | 7E | 7E | | | | | | | | | | | | |

FIG. 41B

GENERAL MESSAGE SEQUENCE:

CHECKSUMMED MESSAGE SEQUENCE:

CHECKSUMMED MESSAGE SEQUENCE WITH BITSTREAM:

WAKE/CALIBRATE SEQUENCE:

STORE CALIBRATION SEQUENCE:

WAKE TIMELINE:

V(19s)−V(19n) AND V(19n)−V(19t):

V(19p)−V(19n) AND V(19n)−V(19q):

19a AND 19d SWITCH STATES (HIGH=CLOSED):

19b AND 19c SWITCH STATES (HIGH=CLOSED):

MODULAR MULTI-LEVEL INVERTER USING CASCADED H-BRIDGES WITH CHARGE BALANCING

CROSS-REFERENCE DATA

This patent application claims a priority date benefit from the following U.S. Provisional Patent Applications: 63/479,182 filed on Jan. 9, 2023, and 63/534,067 filed on Aug. 22, 2023 by the same inventors, incorporated herein in their respective entireties by reference.

TECHNICAL FIELD

The present invention relates to powertrains of electric vehicles as well as other energy storage applications such as powered trailers and electric utility load balancing systems.

BACKGROUND

Most existing inverter topologies for electric vehicles use pulse width modulation (PWM) to control effective output voltages across three or more motor phases and have a DC bus input which is supplied by a large number of battery cells permanently connected in series. In order to alleviate current ripple and audible noise, PWM frequencies are typically 10 kilohertz or faster. Each switching cycle imparts an energy loss which must be dissipated mostly as heat, and the rapidly changing voltages resultant from this switching are problematic due to unavoidable stray capacitances within the system. In severe cases, motor bearings are damaged due to arcing, and this risk will become more significant as DC bus voltages continue to rise in order to keep currents reasonable in the quest for greater power. Although switching devices rated for many kilovolts are available, they are often cost prohibitive and difficult to reliably design into inverters due to fundamentally high stresses per unit. Nearly all modern electric vehicle inverters require liquid cooling to operate nominally, which adds to overall system cost and complexity. Furthermore, additional equipment must be included per electric vehicle in order to support battery cell balancing, AC charging and vehicle-to-grid capability (often requiring full galvanic isolation of the power stages to alleviate leakage currents, capped to the low milliamp range by safety standards), and one or more DC accessory and/or AC auxiliary supplies, all of which are current market expectations. These devices reduce the allocatable volume for batteries or storage, and add design effort, cost, and weight. Finally, safety becomes a major concern when using high voltage battery packs—not only due to shock hazards, but also due to risk of fire and explosion since fault currents often pass through a substantial number of cells at once.

Because of switching difficulties experienced at the high voltages required to drive very large motors, many applications where speed control is desired have historically used multi-level inverters, such as locomotives, pumps, and conveyors. High-voltage power transmission components have also employed multi-level inverters, such as those for static VAR generation (SVG). Traditionally a drawback was the requirement for a group of isolated voltage sources, but this is not a concern when storage batteries are necessarily present. As semiconductor technology progresses, high-volume components such as low-voltage transistors are becoming more affordable and efficient, so inverters with a greater number of levels are consequently more practical. Although many types and configurations of multi-level inverters are possible, the present invention is of the cascaded H-bridge (CHB) variety, which is one of the simplest topologies and avoids the specific requirement for any diodes or flying capacitors. The CHB inverter contains a relatively large number of transistors, but each is inexpensive and under minimal stress due to the low required voltage rating (around 15 to 30 volts each), so this is not entirely a disadvantage. The greater total transistor surface area also helps spread out heat with or without liquid cooling, and some redundancy is intrinsically built into the system. Still, due to the hardware and software complexity of a practical CHB design, there have been a limited number of marketable implementations.

U.S. Pat. No. 5,642,275, issued Jun. 24, 1997, discloses a CHB inverter for SVG and power line conditioning. Due to a lack of specifics relating to electric vehicle powertrains and mobile energy storage devices, applicability to the primary aspect of this field is limited.

SUMMARY OF THE INVENTION

The present invention relates to a multi-level inverter using cascaded H-bridges, which can convert DC supplied by battery cells or other types of charge storage elements into AC to drive a motor or otherwise transfer power to or from another load or source. The present invention can be employed in powertrains of electric vehicles (specifically light and heavy automotive, freight, construction, mining, nautical, and aeronautical) as well as in other energy storage devices such as powered trailers and electric utility load balancing systems.

A preferred embodiment of the system includes a plurality of modules containing H-bridge power stages, where the power input (or "DC link") of each is provided by preferably two, three, or four charge storage elements wired in series and contained within each corresponding module, and where the charge storage elements are preferably electrochemical battery cells. (For easier depiction, embodiment variations featuring two charge storage elements per module will be described.) Each H-bridge power stage, comprising a plurality of low- and high-side switches, can be put into five states: one where all switches are off, one where all low-side switches are on, one where all high-side switches are on, one where only switches across a first diagonal are on, and one where only switches across a second diagonal are on. The state of the H-bridge power stage thereby defines the differential output voltage from the module as is well known in prior art, which may be zero, of a first polarity, or of a second polarity. Each module optionally includes one or more metal circuit breaking springs or a single standard fuse to interrupt current flow between the charge storage elements and the H-bridge power stage power input shortly following an overcurrent condition. Furthermore, each module contains a balancing circuit which attempts to equalize the voltage of the multiple charge storage elements by passing current between them when necessary.

The modules are permanently wired into a set of series strings by the differential outputs of their H-bridge power stages, where each series string corresponds to a cascade inverter phase—more specifically a drive motor phase for systems employed in automotive applications. Each cascade inverter phase includes two power terminals which connect to the module differential outputs at the far ends of each series string. The number of cascade inverter phases is preferably three, and the quantity of modules per cascade inverter phase is preferably 20 to 126 over a range of applications. In addition to the H-bridge power stage and balancing circuit, each module contains a micro-controller, a communication interface, a power management section, and gate drivers for controlling the transistors within the H-bridge power stage and any optional transistors used for operating one or more heaters (the balancing circuit includes its own dedicated gate drivers).

The system also includes a control unit which preferably contains one processor and one communication interface, where the processor can execute arithmetic/logical operations at a minimum rate of preferably 32 million per second. The control unit communicates with modules over preferably one to three internal serial buses and zero to one external serial buses. Each individual bus is associated with preferably 20 to 126 modules and preferably zero to one temperature sensing or general purpose input/output units, and operates at preferably 500 kilobaud or greater. External buses are able to control modules which are not directly contained within the associated multi-level inverter, but instead within another likewise entity. All modules are assigned a configurable numerical address during manufacturing or final assembly, which is preferably one to 126 (represented as $01 to $7E in hexadecimal), and messages including checksums originating from the control unit that are addressed to particular modules will be acknowledged by those specific modules during normal operation. Modules may optionally be configured to react to one or more shared addresses in addition to the uniquely assigned address, so that multiple modules can be commanded to perform a similar or identical action simultaneously; acknowledgments are generally disabled for this type of messaging. Shared addressing allows for a higher maximum output voltage slew rate which may be otherwise limited by the baud rate, and is useful when employing a large quantity of modules or while driving motors at rapid speeds due to the high output waveform frequencies involved. Furthermore, the communication interface within the control unit optionally supports one or more auxiliary serial buses for communication to various other systems (including other inverters), which preferably use a different protocol than the buses intended for internal or external module networking.

The control unit may optionally include the ability to wake all modules on a given communication bus from an idle state and calibrate their oscillator frequencies to ensure accurate data transfer. In this case, each module may be equipped with a less accurate but adjustable oscillator—typically internal to the micro-controller—as a cost saving measure. The control unit would be responsible for putting modules to sleep as an energy saving measure. In this idle state, a subset of module functions would be disabled, especially the balancing circuit, certain gate drivers, and communication interface. The modules would occasionally wake while asleep to check for incoming communications.

To support an isolated accessory supply, which could be utilized by the control unit and other external loads, a subset of modules within each cascade inverter phase may feature bidirectional DC/DC converters which would connect directly to the charge storage elements (optionally through one or more metal circuit breaking springs or a single standard fuse). The DC/DC converters may also be enabled or disabled by the micro-controllers as part of the processing units within the modules by using a dedicated internal signal line, typically in response to a communication bus message sent by the control unit. These converters would nominally operate with a fixed voltage ratio so that balancing would automatically occur between an accessory charge storage element set and the charge storage elements within the associated modules featuring converters, and therefore it is preferred that these two charge storage element technologies are similar or identical. Control schemes regarding a system including an accessory supply may be quite flexible and could additionally allow the system to support energy input directly into the accessory supply, such as that from photovoltaic arrays.

Finally, the system preferably comprises a single switching array, which is optionally segregated into a processing array and an interface array, in order to interact with various inputs and outputs having a range of nominal voltages. For systems employed in automotive applications, power inputs would typically include a DC fast-charger source as well as one- and three-phase AC electric utility voltage sources with a wide range of ratings, and power outputs would typically include a three-phase AC drive motor and an auxiliary AC outlet. Depending on the application, the switching array optionally includes three or six series inductors to reduce current ripple while interacting with sources and loads, which can be enabled or disabled at will. Shared module addressing can also allow simpler driving of modules while cascade inverter phases are paralleled by the switching array—for example, while charging from low-voltage sources—with the intention of keeping the voltages across the individual cascade inverter phases consistent.

In a variation of the preferred embodiment intended for motorcycle applications, a single electrical heating element optionally composed of permanently interconnected individual sections is included to warm the battery cells to allow faster charging during cold weather conditions. This heating configuration shall hereinafter be referred to as "per-pack." Center taps within each of the three cascade inverter phases are additionally made available to the switching array in order to increase efficiency while charging from low-voltage sources; there shall be an even number of modules per cascade inverter phase in such an embodiment. This reconfiguration is accomplished by conditionally connecting together both power terminals of each cascade inverter phase and applying the source voltage across each of those junctions and each respective center tap, as opposed to simply across the power terminals of each cascade inverter phase, thereby increasing the current capability and decreasing the effective series resistance of each cascade inverter phase; this mode shall hereinafter be referred to as "folding." In this variation of the preferred embodiment, only charging from a DC or a one-phase AC source is possible, where all three cascade inverter phases will be placed in series with or without being folded depending on the nominal source voltage. The electrical heating element can be conditionally placed in series with the paralleled set of cascade inverter phases while charging to induce current flow into it, thereby warming the battery cells.

In a variation of the preferred embodiment intended for small passenger car applications, three electrical heating elements each optionally composed of permanently interconnected individual sections are included, where one is associated with each of the three cascade inverter phases. This heating configuration shall hereinafter be referred to as "per-phase." Each electrical heating element can be conditionally placed in series with each cascade inverter phase while charging, allowing three-phase AC sources to be utilized during cold weather conditions. For purposes of charging from DC or one-phase AC sources, all three sets of cascade inverter phases with optional series electrical heating elements can be placed in series or parallel, depending on the nominal source voltage. Center taps are also included to support folding when appropriate. An advantage of being able to select between many different series/parallel configurations is that the useful voltage range is extended and system efficiency can be kept as high as possible at all times.

In a variation of the preferred embodiment intended for large passenger car applications, one or two electrical heating elements per module each optionally composed of permanently interconnected individual sections are included. This heating configuration shall hereinafter be referred to as "per-module." If desired, these electrical heating elements can dually function as part of the charge balancing circuit, thereby reducing the number of necessary components in the latter. A per-module configuration allows for superior battery cell temperature control and a capability for warming independent of the presence of an external power source. Other general aspects of this embodiment are identical to that intended for small passenger car applications.

In a variation of the preferred embodiment intended for truck applications, one or two electrical heating elements per module each optionally composed of permanently interconnected individual sections are included as previously described. Center taps are only included for small work vans, as other applications tend to use higher module counts and would not commonly interface with voltage sources having power ratings in the range where the presence of center taps would show a benefit. An additional feature of this variation is the ability to have another recessive multi-level inverter interconnected within this dominant one, where the two individual inverters can now function as a single unit. In this way, power can be transferred between the inverters in many circumstances by commanding the modules in a particular manner. This represents an advantage over non-cascaded inverters because this power transfer is conducted merely on the basis of an algorithmic change plus a basic series wiring connection as opposed to additional conversion hardware, as would be needed to achieve a similar result otherwise. Per-module electrical heating elements are preferred for inverter systems which are intended to become interconnected, as no additional wiring connections need to be of concern.

In a variation of the preferred embodiment intended for cargo trailer applications, one or two electrical heating elements per module each optionally composed of permanently interconnected individual sections are included as previously described. This variation is recessive and can be interconnected within the dominant inverters found in semi trucks. Center taps are included only for trailer applications with a relatively small energy capacity, but for a different reason than previously discussed. In order to allow similar charging capabilities regarding supply voltages, and for general manufacturing standardization, trailers with varying energy capacities should still possess a consistent number of modules. Battery cell amp-hour capacities can be modified per design to affect the total stored energy as necessary. However, due to the preference to roughly equalize the amp-hour capacity of the battery cells within modules connected in series into cascade inverter phases, trailers with smaller energy capacities should internally fold their internal cascade inverter phases while interfacing with a dominant inverter in order to boost their apparent amp-hour capacities and provide a consistent overall current capability.

In a variation of the preferred embodiment intended for generator set (i.e. mobile power) applications, one or two electrical heating elements per module each optionally composed of permanently interconnected individual sections are included as previously described. This variation is recessive and can be interconnected within the dominant inverters found in certain trucks—specifically small, medium, and large work vans. Center taps and a folding capability are preferably included in this embodiment; at the minimum a center tap for the middle cascade inverter phase (the second of three) is needed for split-phase operation. The middle cascade inverter phase is the one which covers a central voltage range while the cascade inverter phases are placed in series. The inclusion of a split-phase mode allows the generator set to provide both 120 volts AC and 240 volts AC at the same time, and the presence of additional circuitry in the form of a transistor array with gate drivers is preferred to allow swapping of the two output lines during each half-cycle to better equalize the charge among the total quantity of battery cells during asymmetric loading across the pair of output lines. Although it would seem more economical to utilize a per-pack or per-phase heating design, these options would incur operational difficulties while this inverter was interconnected within another.

Three methods are contemplated for achieving functional unity between dominant and recessive inverters. The first is to have the dominant control unit communicate with the recessive control unit over a dedicated auxiliary bus. The second is to have the dominant control unit merge its preferably one external bus with the preferably one internal bus of the recessive inverter. The third is to have the dominant control unit merge its preferably one to three internal buses with each of the preferably one to three internal buses of the recessive inverter, while ensuring that no undesirable numerical address overlaps are present. Communication between dominant and recessive control units is also possible with the second and third methods using reserved message types. Preferably one method will be chosen depending on the particular use case of a system. For illustrative purposes, the first method is described for interactions between cargo trailers and semi trucks, and the second method is described for interactions between work vans and generator sets. For the third method, more attention must be paid to signal termination and/or impedance tuning within the one or more merged buses, so it is anticipated that this method may be the least preferable of the options, but it could still be advantageous for systems with a large total number of modules.

Embodiment variations and their associated schema categorizations are only illustrative examples and are not limited to the specific details described. The present invention also applies to systems utilizing alternate selections of the following: switching array configurations, types of passive or active filters within the switching array other than inductors, charge balancing methods, charge storage element heating/cooling methods (if any), resistive electrical heating element configurations and counts per module optionally performing charge balancing, current measurement and/or interruption devices, cascade inverter phase and/or module counts per inverter (including drive motor phase and pole counts), baud rates and/or configurations of communication buses, module addressing tables and/or configurations, overall voltage/current levels and frequencies, and deployment applications.

Charge storage element counts of two or greater per module apply to the present invention, and it is assumed that no hidden series connections are internally present in the charge storage elements in order for inter-element balancing to be properly provided. Therefore, the terminals of each charge storage element shall present the fundamentally minimum discrete voltage of its particular physical composition. For example, each charge storage element may correspond directly to exactly one supercapacitor or electrochemical cell in series, although multiples of each may be placed in parallel. (Cells which operate using ion intercalation are considered electrochemical cells.) Groups of modules containing different types of charge storage elements may be present in a single multi-level inverter, for example to take advantage of contrasting power vs. energy densities of specific physical compositions. Modules may themselves mix types of charge storage elements (such as supercapacitors in parallel with electrochemical cells). Finally, modules may feature external connections to their charge storage elements, such as inputs for photovoltaic cells, wind turbines, or fuel cells, and interfacing circuitry (such as maximum powerpoint tracking) may be present. All of the discussed variations shall be included in the present invention. The term "cell" will be used interchangeably with "charge storage element" in the remainder of this summary.

The advantages of the present invention over inverters in prior art that use a large number of battery cells permanently connected in series—where the latter are in widespread commercial use—include improved shock safety, much smaller voltage spikes leading to lower leakage currents for reduced isolation and EMI suppression requirements, very high system efficiency, continuous and widely ratiometric cell balancing even with hybrid/mixed packs in nearly all operational modes, simplification or elimination of inverter cooling systems, reduction or elimination of expensive offboard DC charging stations due to intrinsically fast onboard AC charging, greatly condensed functionality for electric vehicles leading to streamlined onboard systems and manufacturing cost/weight savings, configuration and parameter versatility including the optional ability to interconnect and transfer charge between two or more inverter systems, and simplified problem diagnosis plus modular repairability.

The advantages of the present invention over other CHB multi-level inverters in prior art—of which there is no evidence of commercial use within the primary aspect of the field of this invention—include practical methods for modularity, general system organization including the ability to interconnect inverters, communication and management specifics, and cell balancing. It is apparent that until this invention, commercial factors such as manufacturability, reliability, efficiency, performance, and economics have not been fully considered for CHB multi-level inverters within the primary aspect of this field, and additional features—specifically those disclosed in the present invention—are required to satisfy these criteria.

In prior art, much attention has been paid to the overall CHB topology and to balancing charge between H-bridge power stages (referred to as "modules" when including more advanced features as disclosed in this invention), but never to balancing cell voltages within each H-bridge power stage itself. This is a crucial function when using most types of battery cells in series. It must be assumed that most prior art would only support one cell per H-bridge power stage, but simulations show that this would be an impractical configuration due to excessive current ratings and/or a very large number of stages, leading to significantly lower system efficiency and uncompetitive economics.

In the present invention, multiple methods for balancing two or more cells per module are disclosed. In two of the six methods, charge can be transferred between cells, which reduces energy waste. In the other four methods, balancing circuitry is combined with one or more electrical heating elements, which may offer enhanced economics depending on the system setup. The voltage readings of each individual cell are returned over the network to the control unit so that it can make decisions regarding when to turn on and off the associated module, as the modules themselves have no ability to redirect the majority of current flowing through their cells other than to turn themselves off against the will of the control unit (where those modules, through their differential outputs, would simply act as a short circuit). For example, if the multi-level inverter is discharging and if one of the two cells in a module has a voltage reading which is near or below the lower safe limit for that type of physical composition, the control unit will avoid turning on the module to protect that cell even if the other cell is in a safe voltage range. The control unit will also report such inconsistencies to the user, as they indicate possible cell damage. It may be able to wait for the balancing circuit within the module to better equilibrate the two voltages (indicating highly varying capacities between the cells), after which the module may be usable again. The control unit may even choose to speed up the process by redirecting power into that module at the expense of other modules by turning on the module in question in the reverse polarity of others (where the differential output polarity is determined by the state of the H-bridge power stage) so that both cells could be recharged if it was safe to do so based on the higher voltage of the healthier cell. This same concept can also apply during charging to limit peak cell voltages in order to prevent cell damage.

There has been a limited focus on actual communication methods within multi-level inverters in prior art. A centrally located control unit is essentially mandatory in this type of system, as many inputs and outputs are needed, plus the requirement for sufficient processing power to handle motor drive algorithms or electric utility interaction. This implies that there must be some manner in which the real-time H-bridge power stage state information is transferred from the control unit to the stages themselves. Direct gate drive wiring may suffice in implementations with fewer stages, but this still leaves the open question of transferring locally gathered information back to the control unit, which is not a simple task—involving carefully isolated analog signals, considerably more wiring, and a large number of data converters at the control unit. It may be supposed that the H-bridge power stages can be grouped together, located separately from the battery pack, but the required number of power connections—with thick cables by necessity—would make this configuration even less preferable. Of course, the trend in automotive hardware is to avoid large wire bundles and to instead embrace networking.

With few stages per cascade inverter phase (<20) to accommodate direct wiring, it is difficult to realize the full benefits of the CHB topology: pulse width modulation would still be required to manage harmonics, and transistor cooling along with leakage current are again concerns. Battery pack construction would be challenging with a low number of stages as the necessary breadth of each stage—due to the large number of connections per unit and the span which they necessarily cover—would make them difficult to efficiently incorporate into the thin under-floor layout which is now standard for electric vehicles. Instead, it has been found through simulation and study that the optimal number of H-bridge power stages per cascade inverter phase is around 64 for a light duty electric vehicle application, implying 192 total modules for three-phase operation (heavy duty vehicles may prefer slightly more). This count provides very smooth output waveforms—technically 129-level per phase with single addressing— and each module can be kept fairly simple and compact while interfacing with two, three, or four cells. The majority of module hardware may even be incorporated into wafer-like system-on-chip circuits, which for example may be just 25×25×5 mm in size. A large module count, within reason, supports the continued trend toward higher system voltage and power ratings while maintaining safety during servicing.

Using a practically compromised module count of around 64 per phase, the communication data rate becomes the limiting factor for high-frequency outputs. It is well known that four-pole motors exhibit superior efficiency versus two-pole motors in most applications, and this may further increase the peak drive frequency requirement to 300 hertz or greater. At a typical network rate of one megabaud, for example using ISO 11898-2 physical layer hardware which is typically approved for automotive use, the output voltage from the inverter would be proportionally limited as the frequency rose above 60 hertz leading to unacceptable vehicle performance. This limit is due to the high slew rate of the phase output voltages and the need for modules to turn on and off very rapidly as the frequency increases, thereby overloading the communication network with traffic. An alternative such as TIA/EIA-485-A could be considered to achieve higher bus speeds, but would present numerous issues. One benefit of the ISO 11898-2 physical layer is the notion of recessive and dominant bits, which is not present in TIA/EIA-485-A. The significance of this is due to the fact that acknowledgments and other bit data can efficiently be transmitted in the opposite direction after and even within messages, greatly compressing the overall traffic. For example, the preferred embodiment of the present invention has a message structure with two nine-bit words, which is a hardware configuration supported by default in many micro-controllers (TIA/EIA-232-F uses the ninth bit as an address/data byte identifier). Out of those 18 bits in a common message, 15 are transferred from the control unit to all modules, one is an acknowledgment bit transferred from a single module to the control unit, one is a bit from a larger bitstream transferred from a single module to the control unit, and one is a spare typically used as an additional stop bit. It is possible to mix transmission directions since any recessive bit may be made dominant by any bus node, and it will be read as such by all bus nodes. Using TIA/EIA-485-A, the baud rate would need to be yet higher to allow for reverse communication, at least without custom hardware. Transceivers complying to the latter physical layer specification also require drive enable lines, which are not necessarily present on many processors, and inconveniently take up an extra pin. A further problem with higher baud rates is the need for more careful wiring, especially given the large number of stubs (due to 65 or more total network nodes). The single-wire bus as disclosed in the present invention may encounter difficulties with signal reflections above one megabaud or so. Finally, in general, lower baud rates will lead to greater reliability and lower computation requirements from micro-controllers within modules.

These points all illustrate the great importance of the disclosure of multiple addressing in the present invention. Multiple addressing grants the ability to turn a small subset of modules on and off simultaneously with the same amount of message data as for a single module, thereby significantly extending the output frequency range. Ratios of 2:1 and 4:1, requiring additional shared address spaces of 32 (64/2) and 16 (64/4) per phase, will lead to sufficient performance in most applications. A 2:1 ratio would also be useful to drive a phase which has been folded to halve the voltage and double the capacity of the string, given that modules paired together on each of the 32 shared addresses were on alternating halves; otherwise, short internal glitches would occur while switching only one module at a time due to the halves being electrically paralleled, albeit through one or more inductors. Every module may be configured to respond to a set of addresses through a user-defined map; one address will always be unique to that module, and the others will be shared. Acknowledgments and bitstream replies will generally be disabled in messages addressed to multiple modules, but in typical system configurations with three individual buses, sufficient bandwidth will still be present for the control unit to address modules individually as the rate of voltage change per bus is peak-limited as opposed to average-limited. For example, using triplen harmonic zero sequence injection, each bus will otherwise be idle for one-third of each cycle, allowing ample opportunities to address modules individually to receive acknowledgments and status data.

An opportunity for a medium- or heavy-duty electric vehicle application is the transferring of energy between two physically isolated battery packs, such as between a construction van and a mobile storage unit (taking the place of a fossil-fueled generator) or between a semi truck and a cargo trailer. There have been a limited number of commercial implementations of this concept due to the requirement of added interfacing circuitry using packs with cells permanently connected in series. However, with the CHB topology, the process of interconnecting two inverters is much more streamlined as their cascade inverter phases are simply placed in series and their communication buses are merged. Such a technique has not been discussed in the prior art regarding multi-level inverters, and this disclosure is unique compared to that using traditional packs due to the efficient method in which the combination can be made. Versatility is nearly unlimited with CHB interconnecting as power can be transferred in any direction from either individual pack. For example, a construction van which has run out of charge may be rescued by attaching a small fully-charged mobile trailer, where the trailer could not only provide power to propel the van, but additionally recharge the van's cells simultaneously so that the van could make it to a charging station on its own. The van might also carry the trailer to the charging station where both could be recharged at once through the van's charging inlet, after which the rescuing vehicle would then reclaim the trailer for the next mission. In a separate example, a van may show up at a jobsite to recharge a trailer being used to power tools and other equipment. The van and trailer would be interconnected, and the equipment could simultaneously be powered via the van's auxiliary outlet in order to continue operating. All of this can be accomplished through algorithmic changes—the timing of the states of the H-bridge power stages communicated to modules—instead of complicated additional circuitry which would otherwise be necessary in a non-CHB topology.

BRIEF DESCRIPTION OF THE DRAWINGS

FIG. 38 details broad characteristics of application types used throughout this patent and includes a glossary of terms used in FIG. 39.

FIG. 39 details specific implementations of application types, including battery cell configuration and charging/discharging voltage ability.

FIG. 40A is a table of switch states for motorcycle, generator set, and small passenger car applications.

FIG. 40B is a table of switch states for small trailer and large trailer applications.

FIG. 40C is a table of switch states for large passenger car, small work van, medium work van, large work van, and semi truck applications.

FIG. 41A is a table of hexadecimal module addresses for communication buses each supporting three phases and either 20 or 30 modules per phase.

FIG. 41B is a table of hexadecimal module addresses for communication buses each supporting one phase and either 60, 72, or 84 modules per phase.

DETAILED DESCRIPTION OF THE DRAWINGS

The preferred embodiment of the present invention is comprised of a plurality of modules organized into cascade inverter phases, a control unit, a communication network, and a switching array which for easier definition has been segregated into a processing array and an interface array. FIG. 38 includes a glossary of application types relating to specific minor variations of the preferred embodiment, which will be referred to throughout this section, and lists basic functional qualities of each. FIG. 39 discusses the quantities of particular design values for these various application types. As these figures only represent illustrative examples for easier definition, other systems are supported and still covered within the present invention, especially those using three or more charge storage units per module. It shall be noted that all described AC voltage values will be assumed to be root-mean-square over sinusoidal waveforms.

Figure 1:
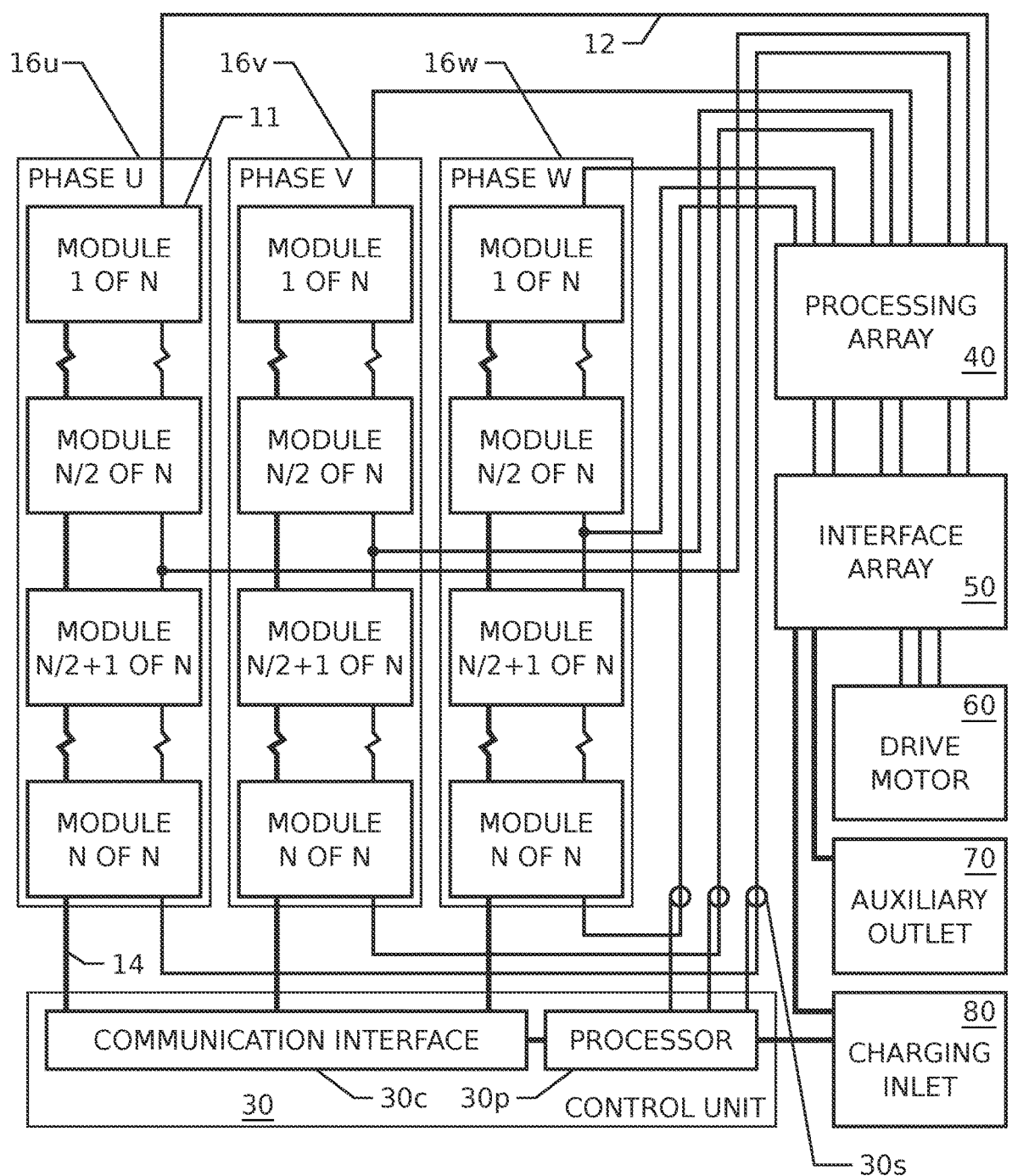
FIG. 1 is a block diagram of a generic multi-level inverter system.

FIG. 1 is a block diagram of a multi-level inverter including a set of modules 11 organized into three cascade inverter phases 16u, 16v, and 16w having power terminals 12 that include center taps in this example. Control unit 30, which contains communication interface 30c and processor 30p, interfaces with modules 11 via communication buses 14, and measures phase current via sensors 30s. Processing array 40 and interface array 50 configure connections between power terminals 12 and drive motor 60, auxiliary outlet 70, and charging inlet 80. Signal wires interconnect charging inlet 80 to processor 30p.

Figure 2:
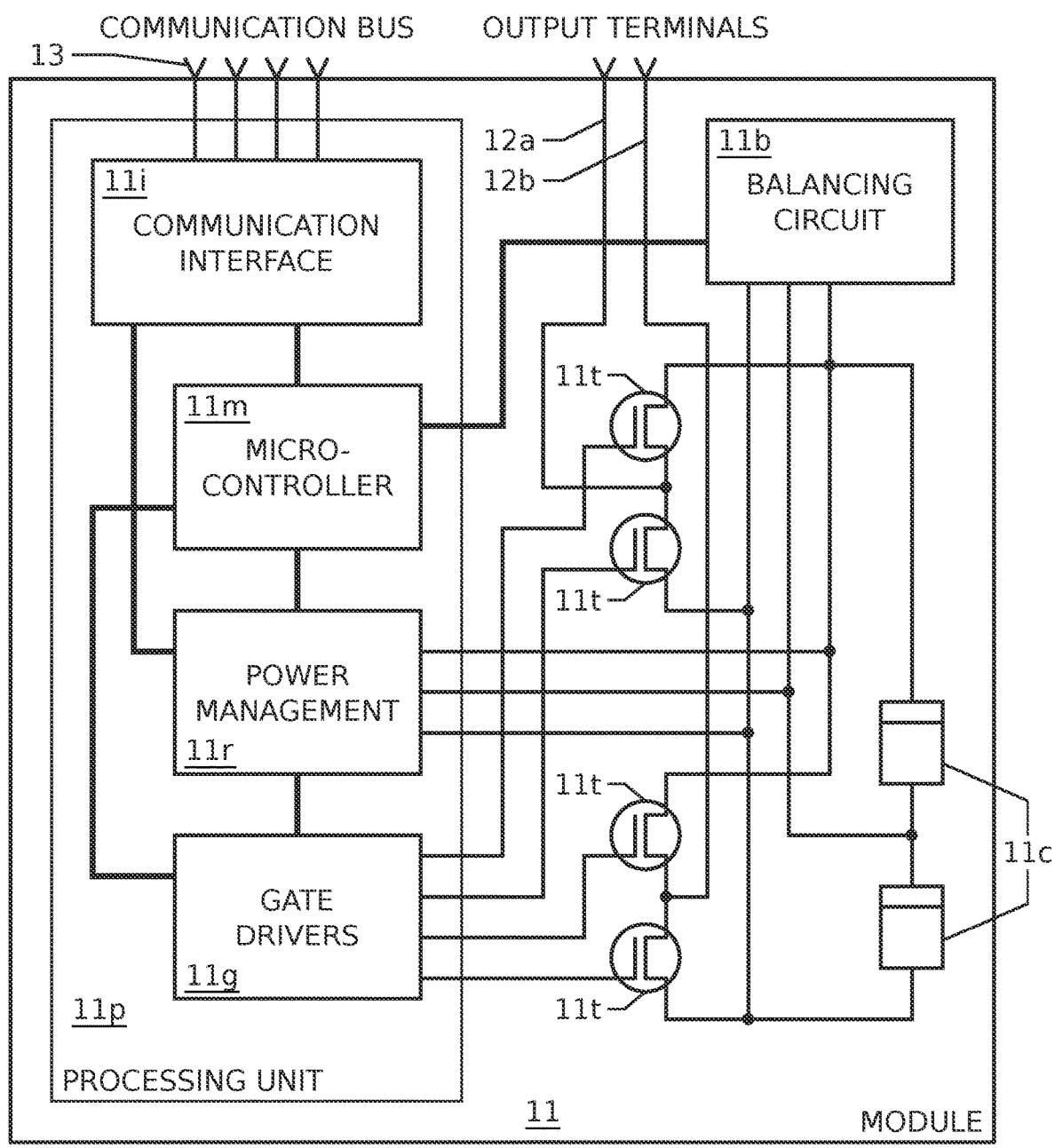
FIG. 2 is a block diagram of a module intended for motorcycle and small passenger car applications, without any module-level electrical heating elements.

FIG. 2 is a block diagram of a module 11 intended for motorcycle and small passenger car applications. Two charge storage elements 11c are shown, which are preferably electrochemical cells. Balancing circuit 11b attempts to equalize the voltage of these cells by shifting charge between them when necessary. An H-bridge power stage is comprised of four transistors 11t, which are preferably low-voltage N-type MOSFETs. Within processing unit 11p, power management section 11r provides a regulated supply to micro-controller 11m and communication interface 11i, while additionally the gate drivers section 11g controls the gates of the four transistors. This variant of module is intended to be used with per-pack or per-phase electrical heating elements, if any, and does not include per-module electrical heating elements. Output terminals 12a and 12b allow a plurality of modules to be connected into preferably three cascade inverter phases, and internal bus 13 is common to a group of at least two modules which may or may not all be within the same cascade inverter phase. For motorcycle applications it is preferred to use one internal bus with approximately 20 modules per cascade inverter phase, and for small passenger car applications it is preferred to use three internal buses each with approximately 60 modules per cascade inverter phase where each of the three buses are common to modules within only one cascade inverter phase.

Figure 3:
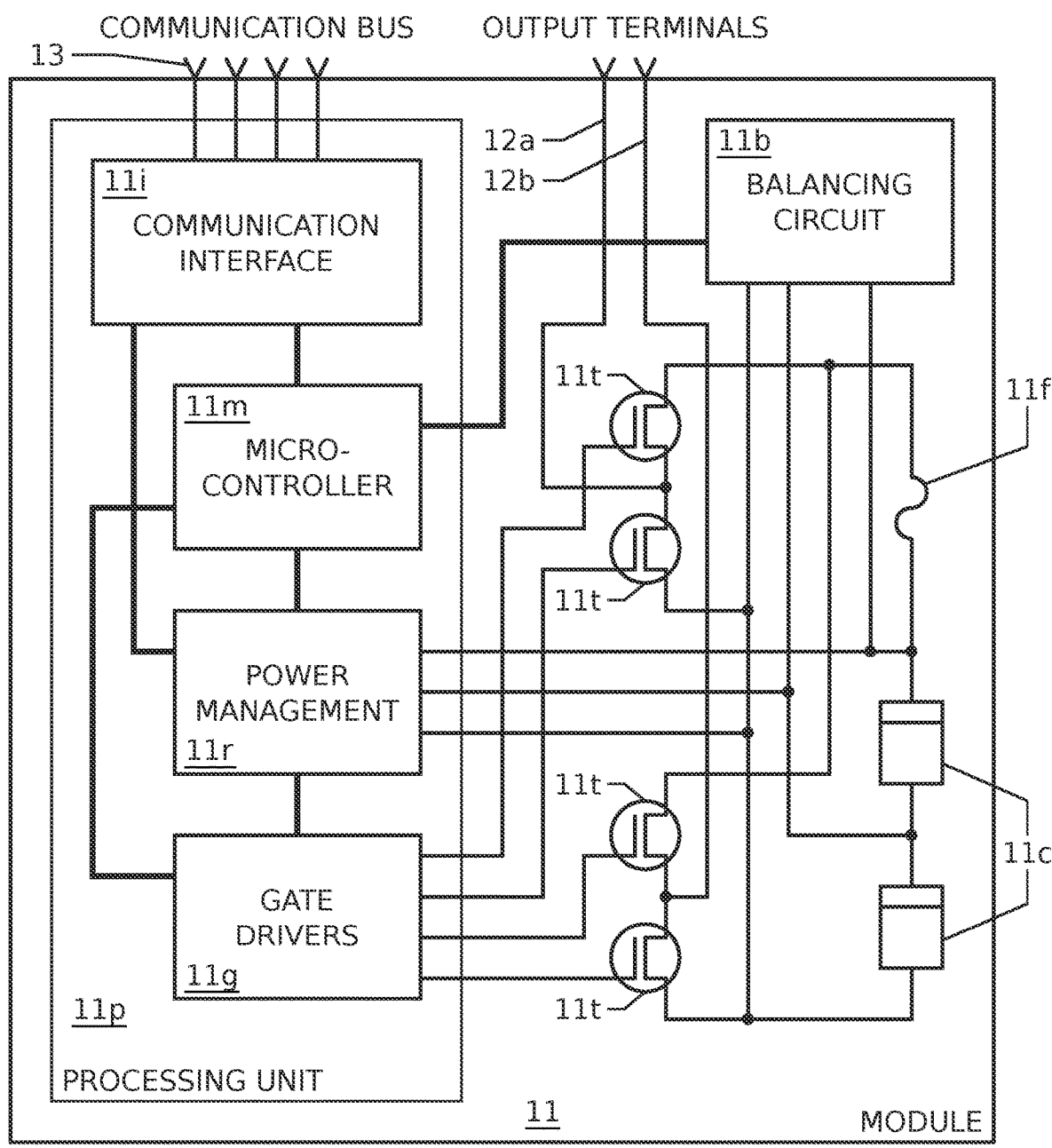
FIG. 3 is similar to FIG. 2, but additionally includes a fuse.
Figure 18A:
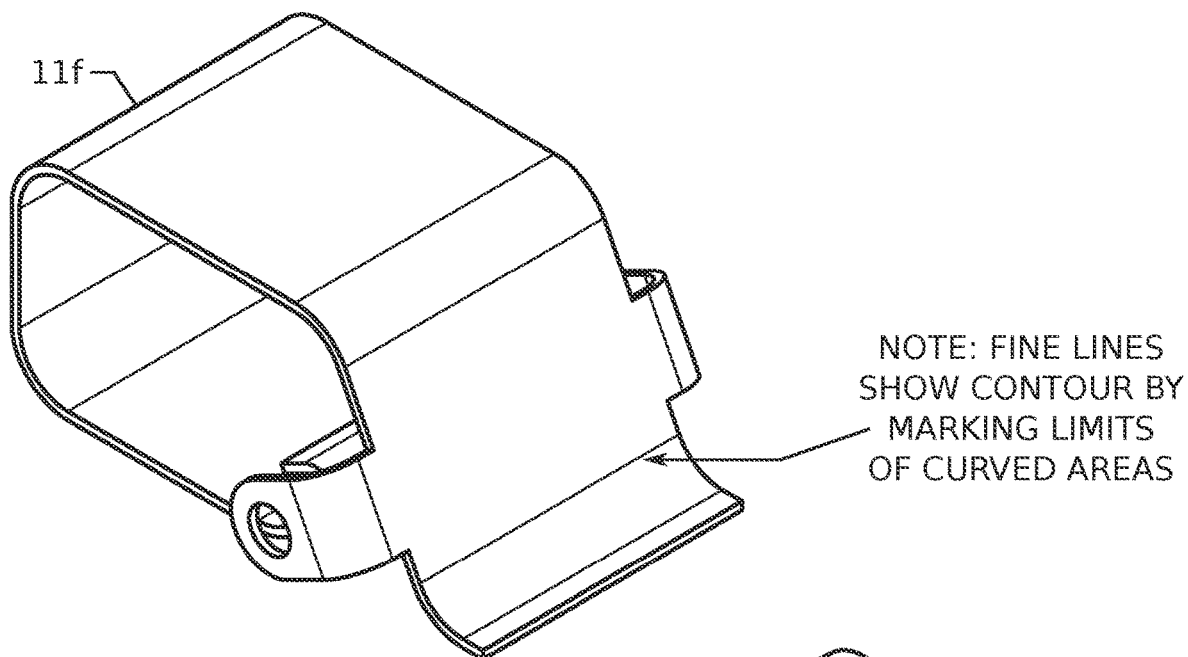
FIGS. 18A, 18B, 18C, 18D, 18E, 18F, and 18G illustrate a metal circuit-breaking spring in its normal operational state.
Figure 18B:
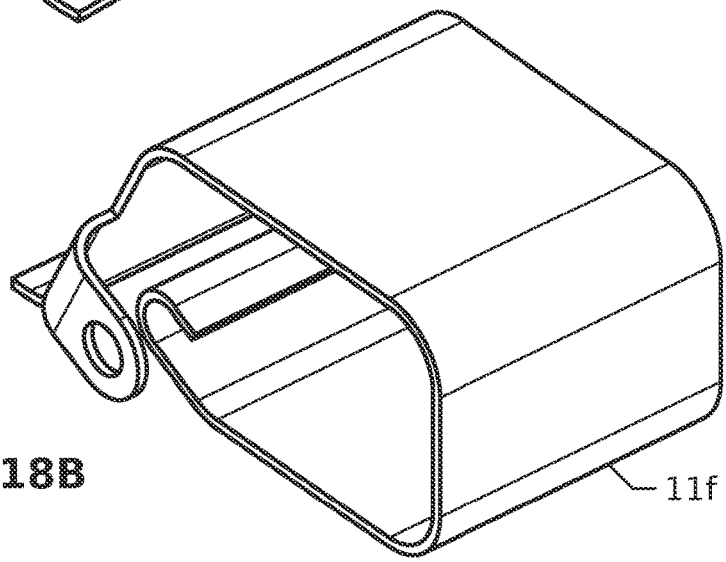
Figure 18C:
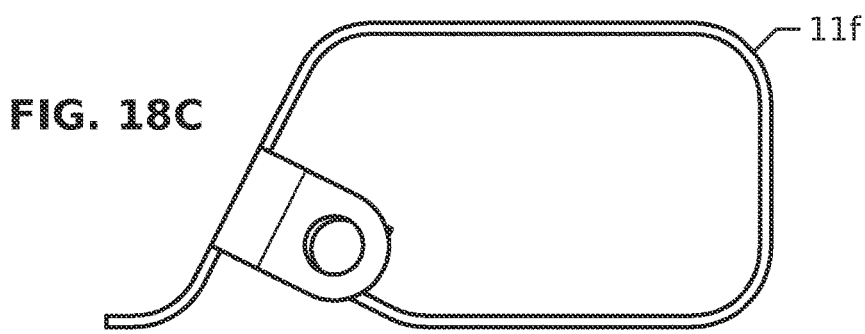
Figure 18D:
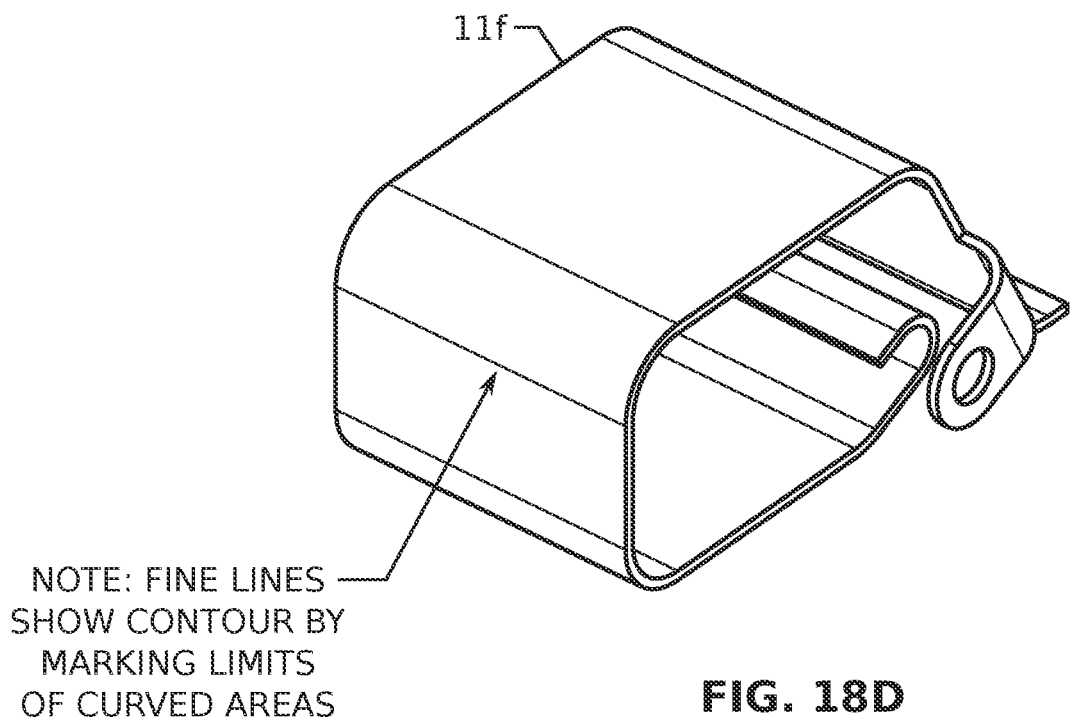
Figure 18E:
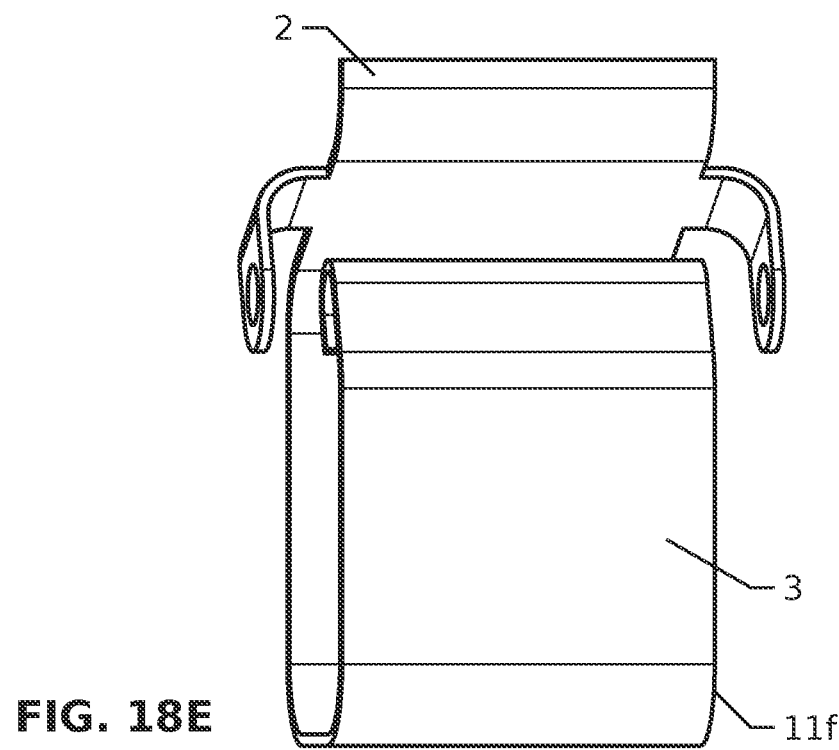
Figure 18F:
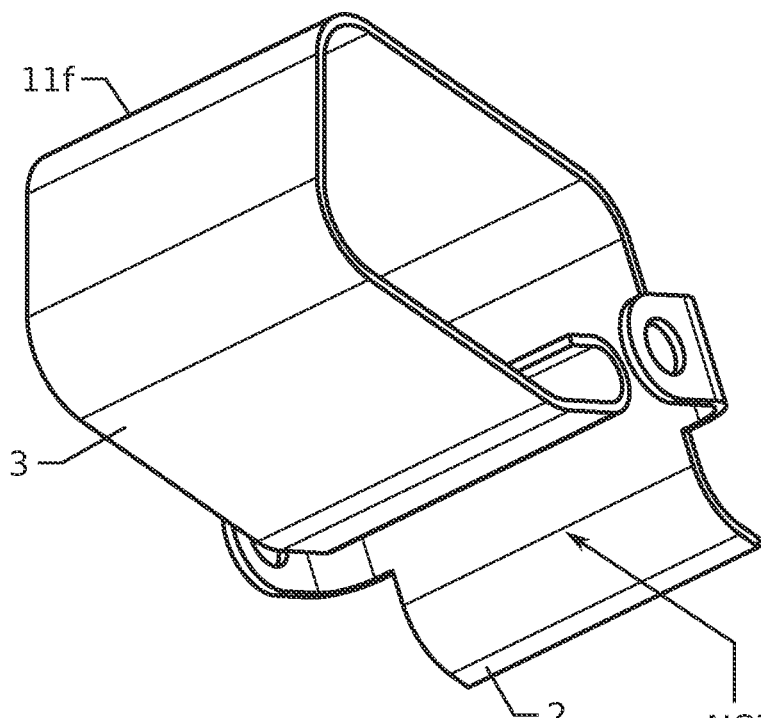
Figure 18G:
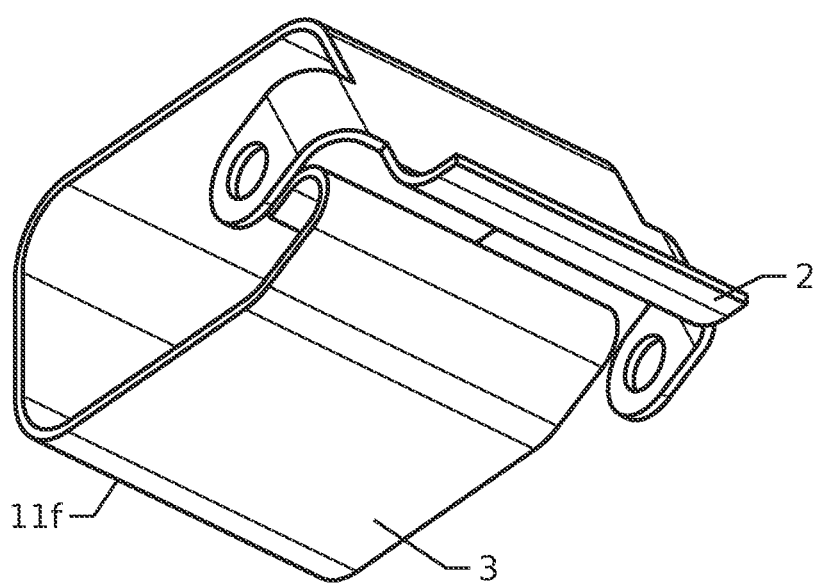

FIG. 3 is a block diagram of a module 11 which is similar to that shown in FIG. 2, except for the addition of a fuse 11f which is a fire prevention measure in the case that an overcurrent event occurs in response to an overload at terminals 12a and 12b or in response to a local issue such as one or more shorted/damaged transistors 11t. Fuse 11f may also be designed to open on a general overtemperature event at preferably 125 to 150 degrees Celsius in order to restrict current flow during an ongoing fire. Fuse 11f may be comprised of at least one metal circuit breaking spring, for example that shown in FIG. 18A, or may be a bespoke or common-off-the-shelf filament fuse.

Figure 4:
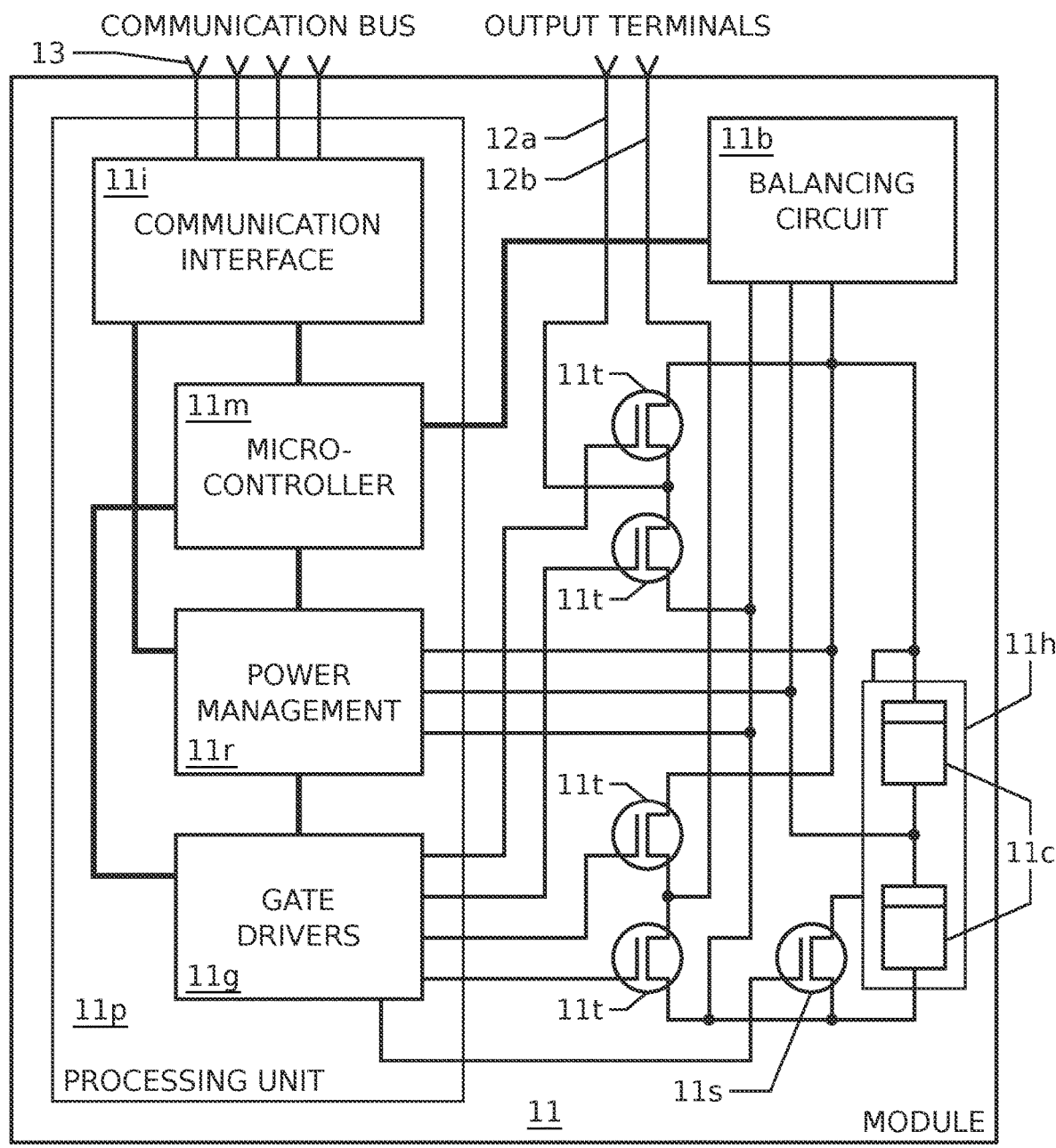
FIG. 4 is a block diagram of a module intended for generator set, small trailer, large trailer, large passenger car, small work van, medium work van, large work van, and semi truck applications, with one module-level electrical heating element.

FIG. 4 is a block diagram of a module 11 intended for generator set, small trailer, large trailer, large passenger car, small work van, medium work van, large work van, and semi truck applications. One module-level electrical heating element 11h and one electrical heating element switch 11s, which is preferably a low-voltage MOSFET transistor, have been added in comparison to FIG. 2. Cell balancing is accomplished within balancing circuit 11b without use of the electrical heating element.

Figure 5:
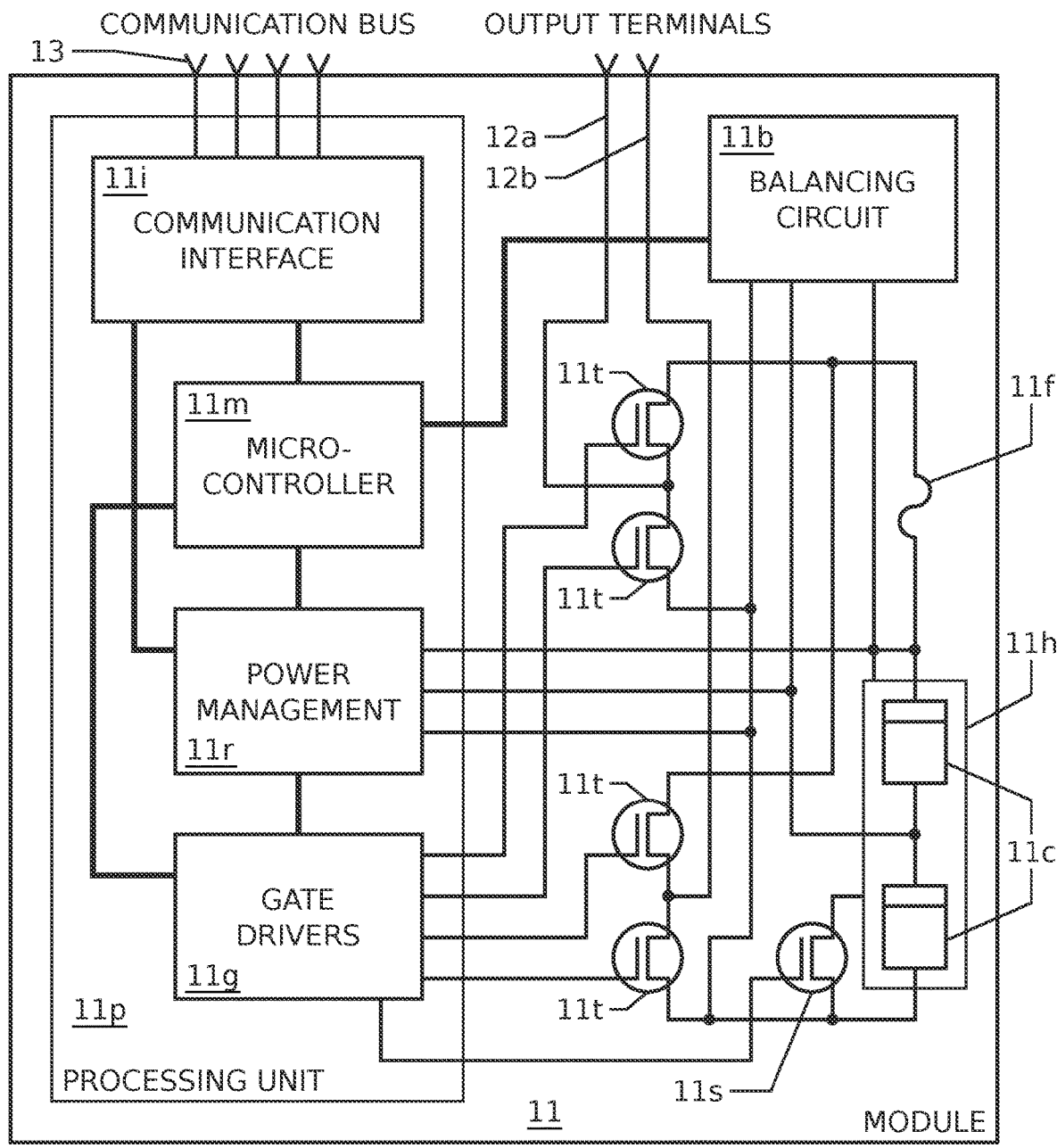
FIG. 5 is similar to FIG. 4, but additionally includes a fuse.

FIG. 5 is a block diagram of a module 11 which is similar to that shown in FIG. 4, except for the addition of a fuse 11f serving the same purpose as that within FIG. 3.

Figure 6:
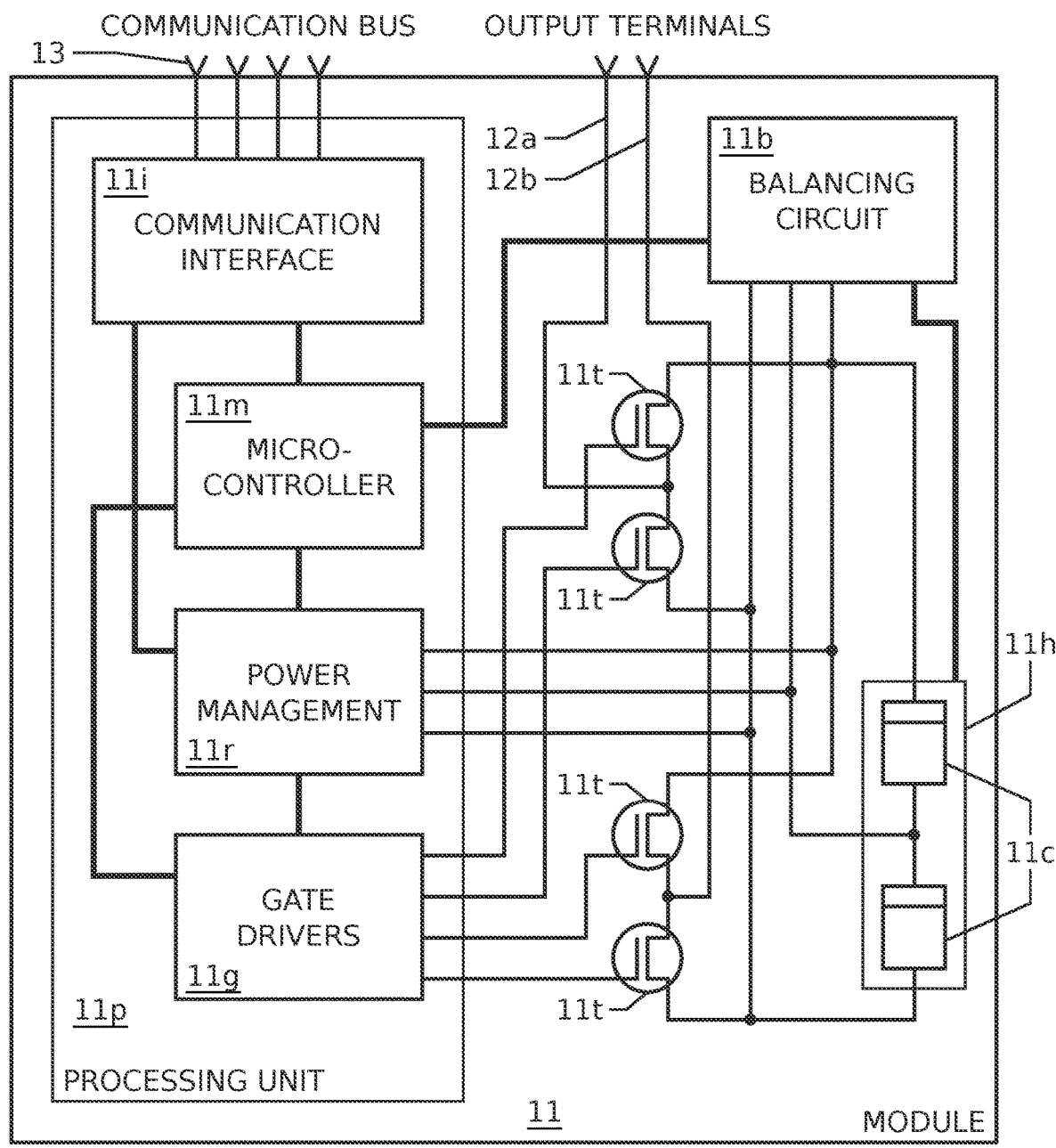
FIG. 6 is a block diagram of a module intended for generator set, small trailer, large trailer, large passenger car, small work van, medium work van, large work van, and semi truck applications, with one module-level electrical heating element that assists in charge balancing.

FIG. 6 is a block diagram of a module 11 which is similar to that shown in FIG. 4, except that the electrical heating element switch 11s has been subsumed into the balancing circuit 11b, where the electrical heating element 11h is now dually used to accomplish cell balancing instead of a direct charge transfer method.

Figure 7:
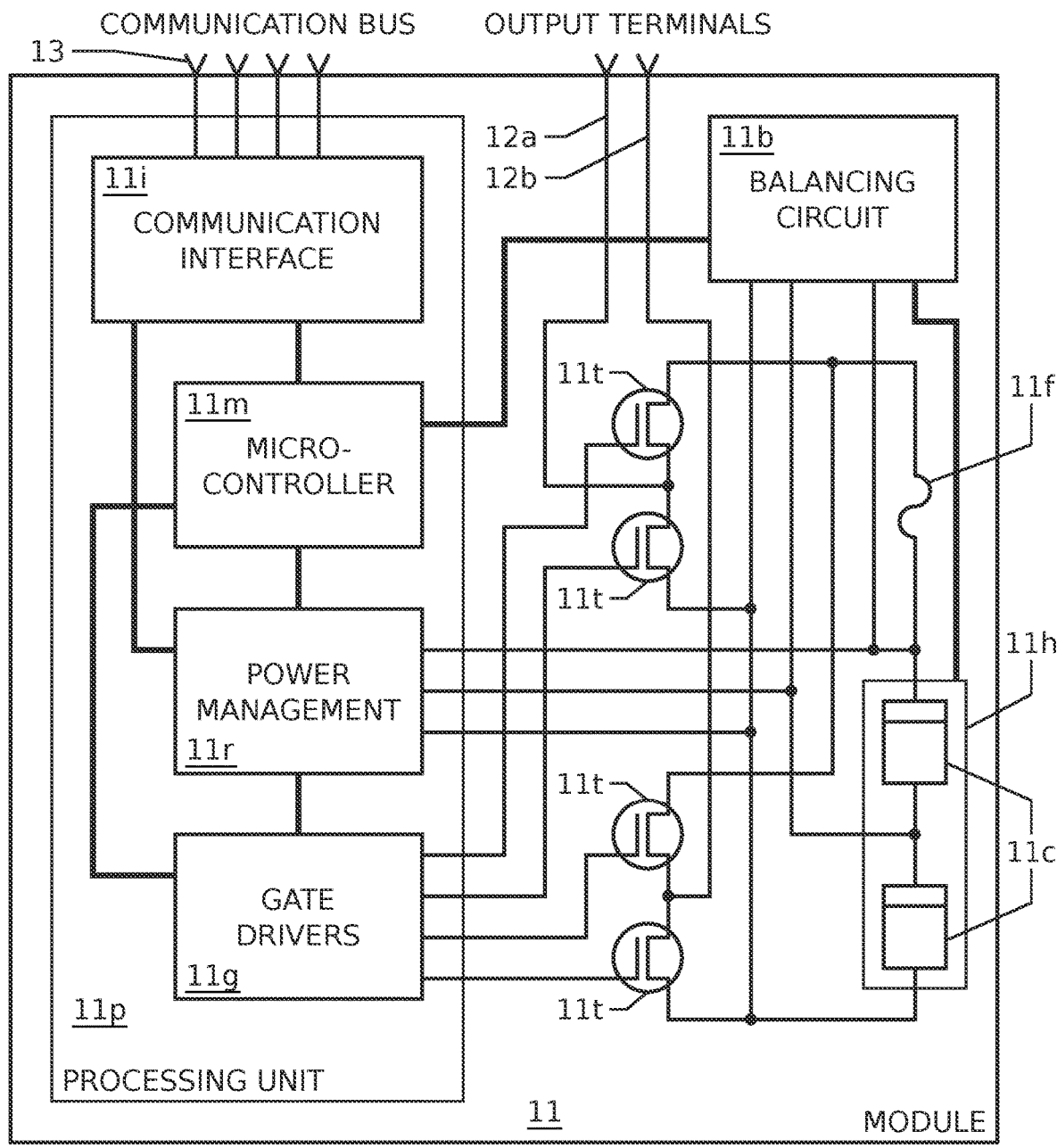
FIG. 7 is similar to FIG. 6, but additionally includes a fuse.

FIG. 7 is a block diagram of a module 11 which is similar to that shown in FIG. 6, except for the addition of a fuse 11f serving the same purpose as that within FIG. 3.

Figure 8:
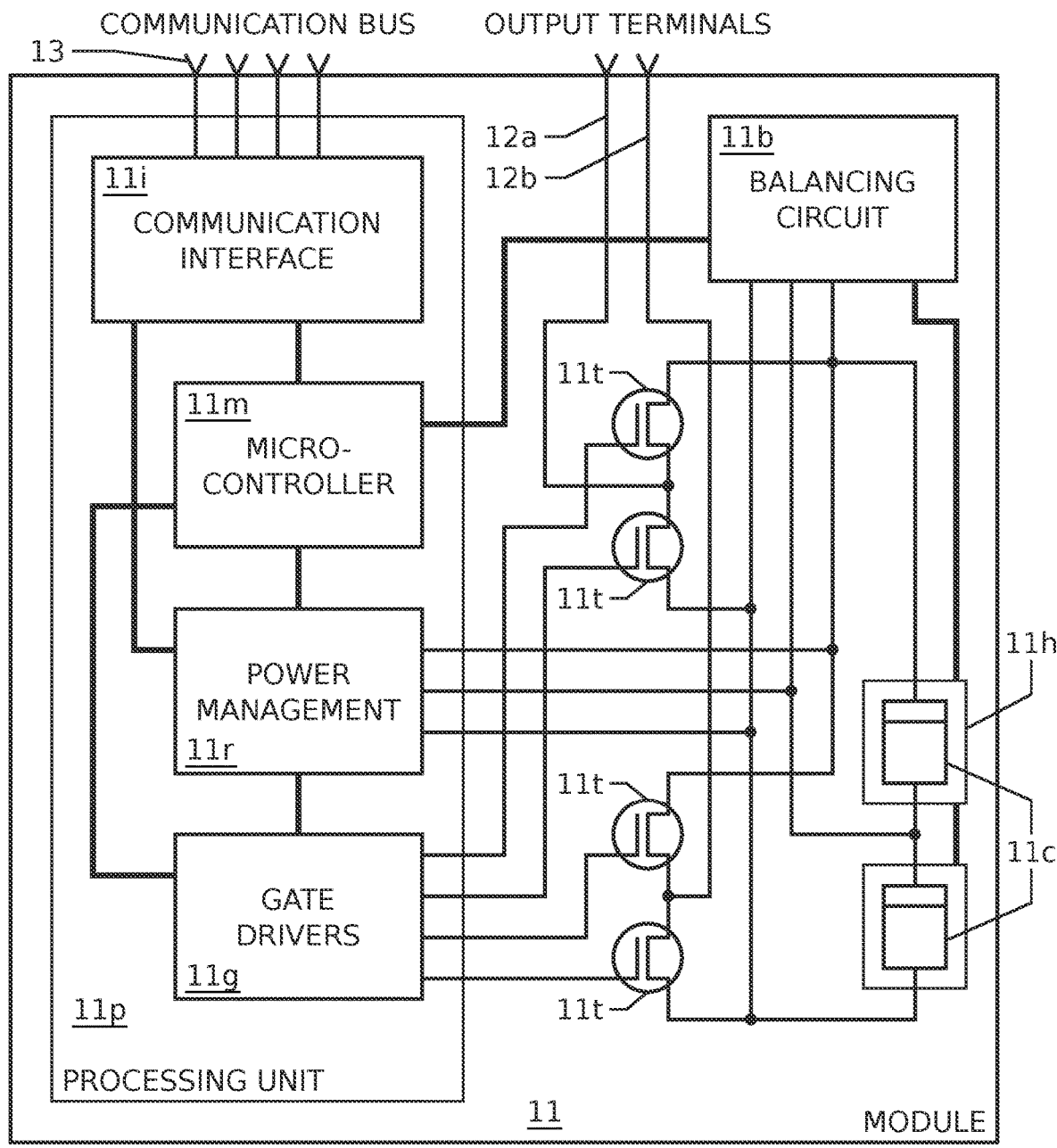
FIG. 8 is a block diagram of a module intended for generator set, small trailer, large trailer, large passenger car, small work van, medium work van, large work van, and semi truck applications, with two module-level electrical heating elements that assist in charge balancing.

FIG. 8 is a block diagram of a module 11 which is similar to that shown in FIG. 6, except that the one electrical heating element 11h in FIG. 6 has now been split into two elements 11h in FIG. 8. Each of these elements are dually used to accomplish cell balancing instead of a direct charge transfer method.

Figure 9:
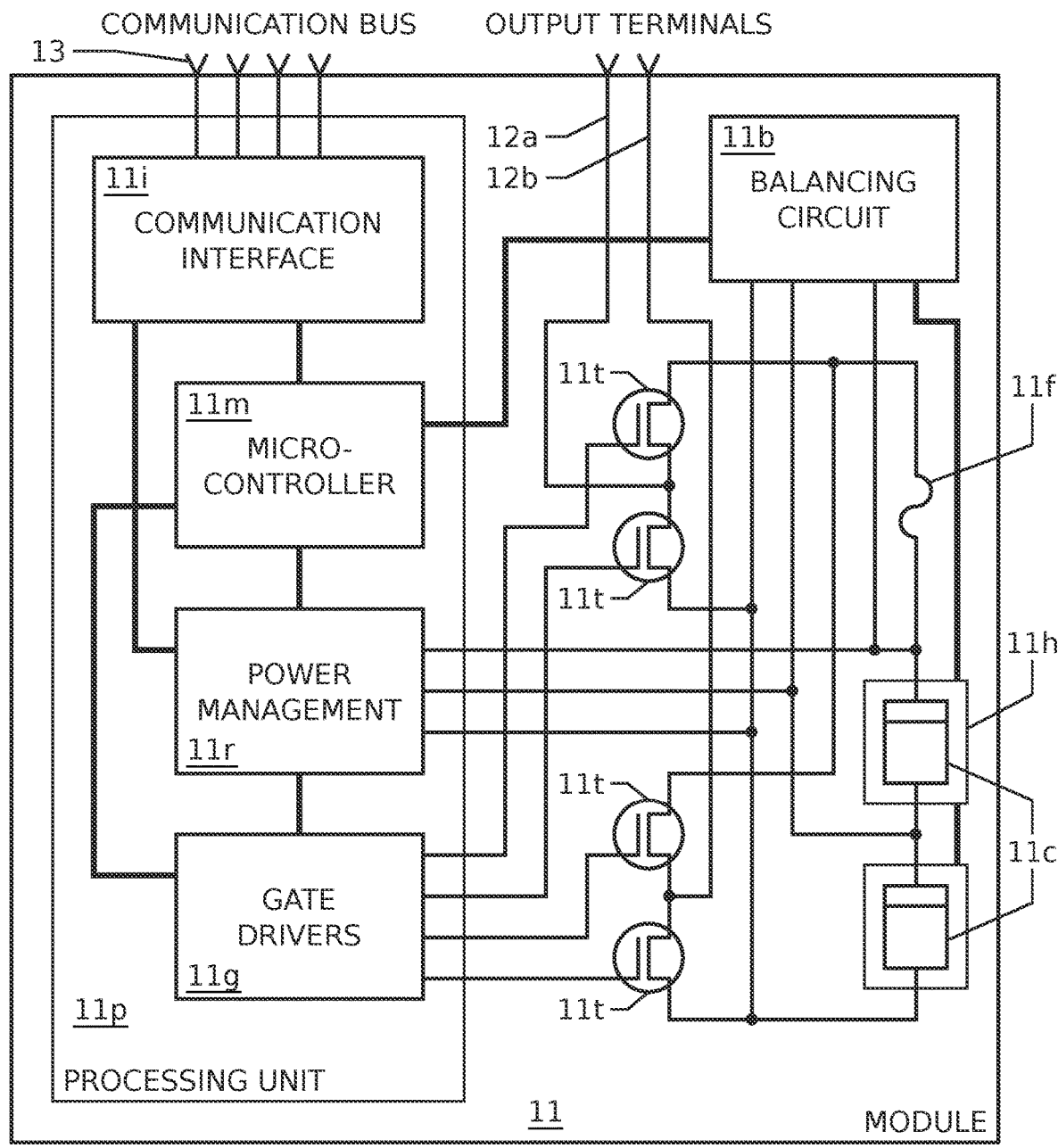
FIG. 9 is similar to FIG. 8, but additionally includes a fuse.

FIG. 9 is a block diagram of a module 11 which is similar to that shown in FIG. 8, except for the addition of a fuse 11f serving the same purpose as that within FIG. 3.

Figure 10:
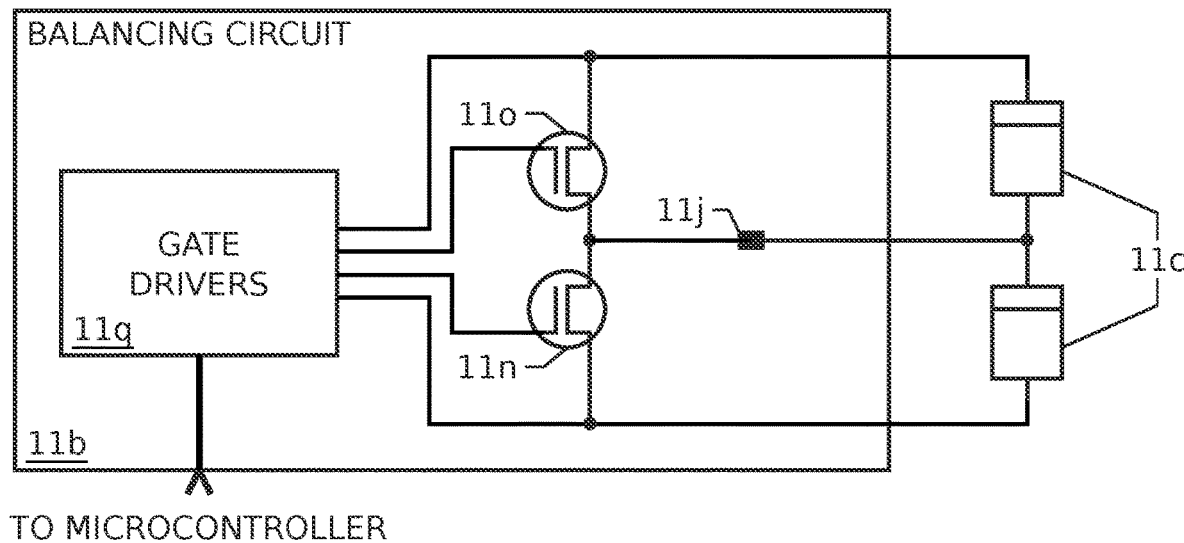
FIG. 10 is a schematic of balancing circuitry using an inductor within a module as shown in FIGS. 2, 3, 4, and 5.

FIG. 10 is a block diagram of a balancing circuit 11b that uses an inductor 11j and a control circuit comprised of one low-side switch 11n and one high-side switch 11o, which are preferably low-voltage MOSFET transistors and are driven by the gate drivers section 11q, to transfer charge between two charge storage elements 11c, which are preferably electrochemical cells. The designs in FIGS. 10 and 11 are preferred from an efficiency standpoint over those in FIGS. 12, 13, 14, and 15 since energy making up the imbalance is transferred as opposed to dissipated.

Figure 11:
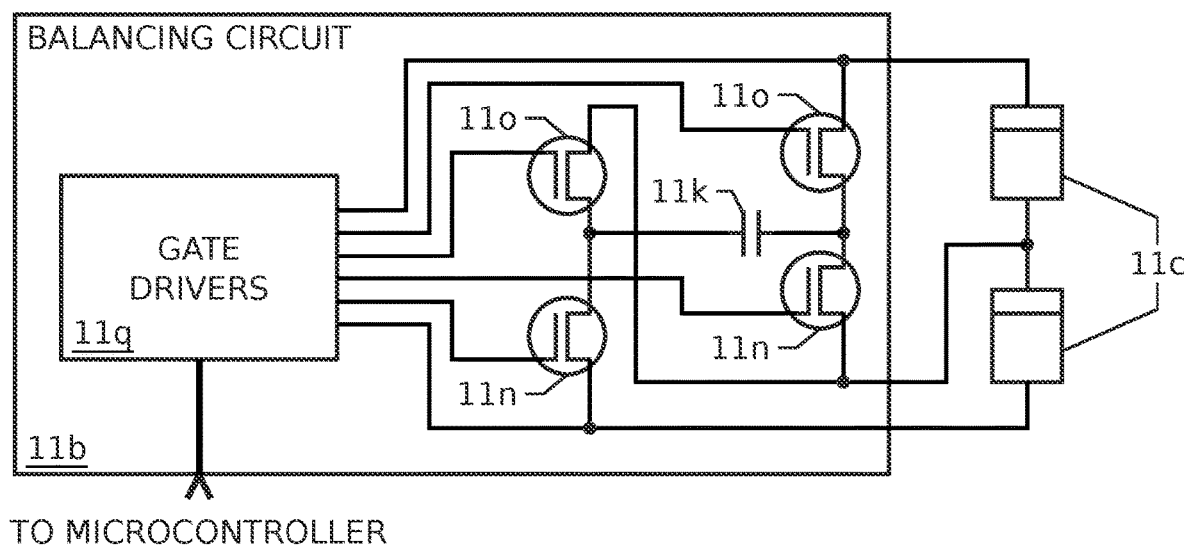
FIG. 11 is a schematic of balancing circuitry using a flying capacitor within a module as shown in FIGS. 2, 3, 4, and 5.

FIG. 11 is a block diagram of a balancing circuit 11b that uses flying capacitor 11k and a control circuit comprised of two low-side switches 11n and two high-side switches 11o, which are preferably low-voltage MOSFET transistors and are driven by the gate drivers section 11q, to transfer charge between two charge storage elements 11c, which are preferably electrochemical cells. In this design, both transistors 11n are on at the same time within roughly the first half of the switching period, and both transistors 11o are on at the same time within roughly the second half of the switching period.

Figure 12:
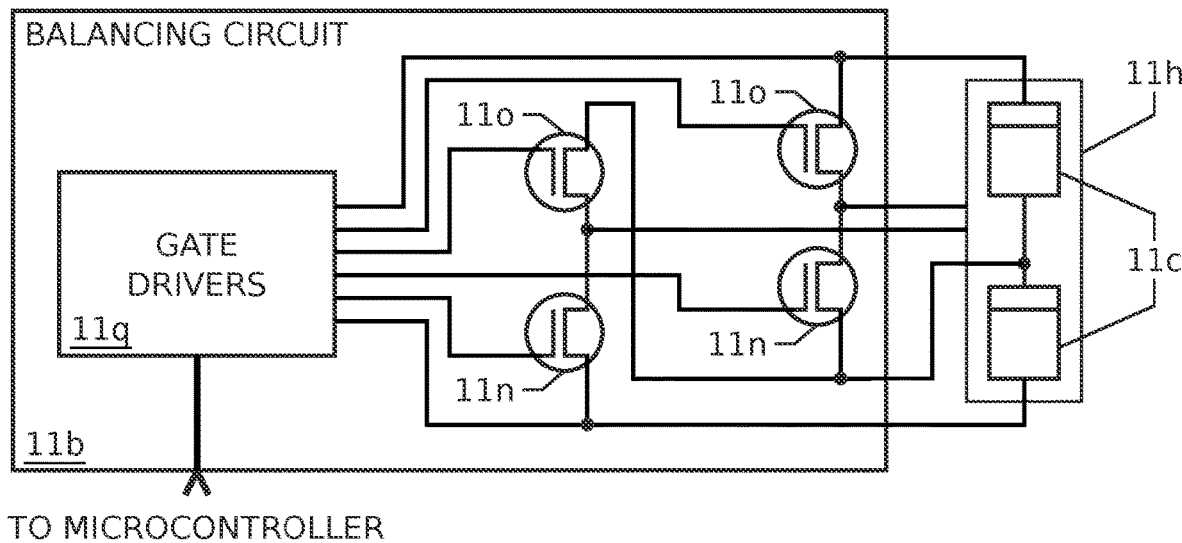
FIG. 12 is a schematic of balancing circuitry using one module-level electrical heating element within a module as shown in FIGS. 6 and 7.

FIG. 12 is a block diagram of a balancing circuit 11b that includes access to one electrical heating element 11h over charge storage elements 11c, which are preferably electrochemical cells. This design activates electrical heating element 11h when charge storage elements 11c are desired to be warmed, and dually uses electrical heating element 11h when necessary to drain excess charge from one of the two charge storage elements 11c in order to equalize their voltages. A control circuit comprised of two low-side switches 11n and two high-side switches 11o, which are preferably low-voltage MOSFET transistors and are driven by the gate drivers section 11q, adjusts the current path through electrical heating element 11h and charge storage elements 11c to achieve the desired result at any particular instant.

Figure 13:
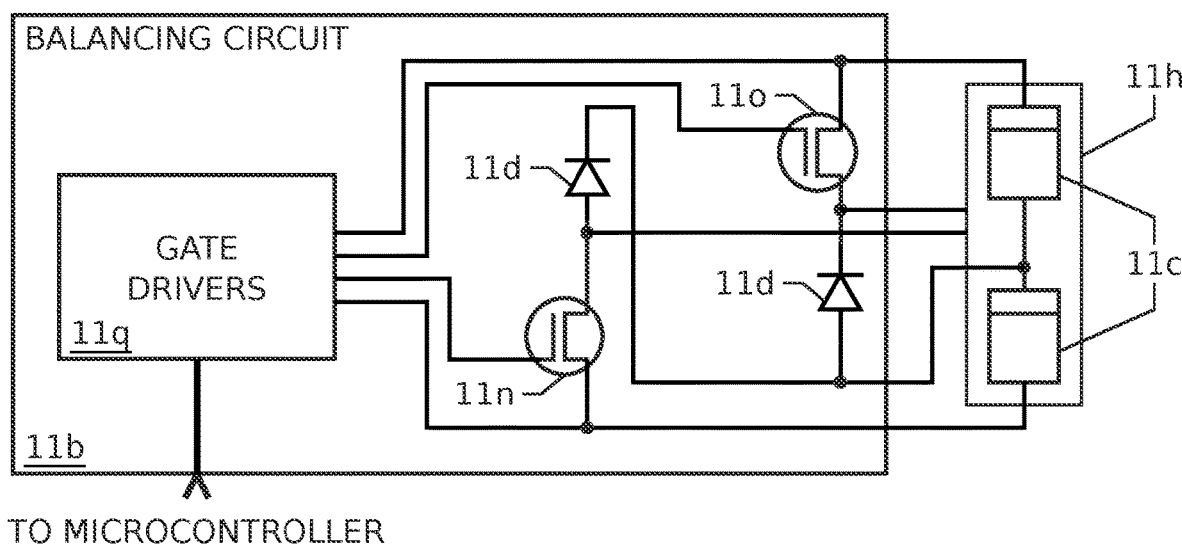
FIG. 13 is similar to FIG. 12, but replaces two switches with diodes.

FIG. 13 is a block diagram of a balancing circuit 11b which is similar to that shown in FIG. 12, except for the replacement of one low-side switch 11n and one high-side switch 11o with two diodes 11d. Diodes 11d simplify the circuit and halve the number of required gate drivers within section 11q.

Figure 14:
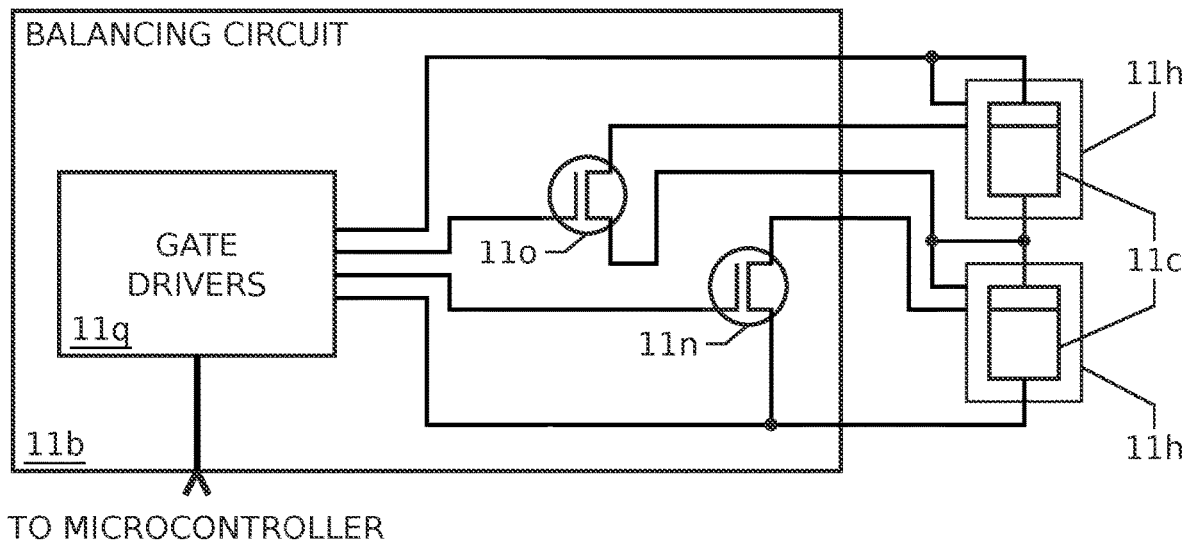
FIG. 14 is a schematic of balancing circuitry using two module-level electrical heating elements within a module as shown in FIGS. 8 and 9.

FIG. 14 is a block diagram of a balancing circuit 11b which is similar to that shown in FIGS. 12 and 13, except that two electrical heating elements 11h are now included and can be activated individually by one low-side switch 11n and one high-side switch 11o, which are preferably low-voltage MOSFET transistors and are driven by the gate drivers section 11q.

Figure 15:
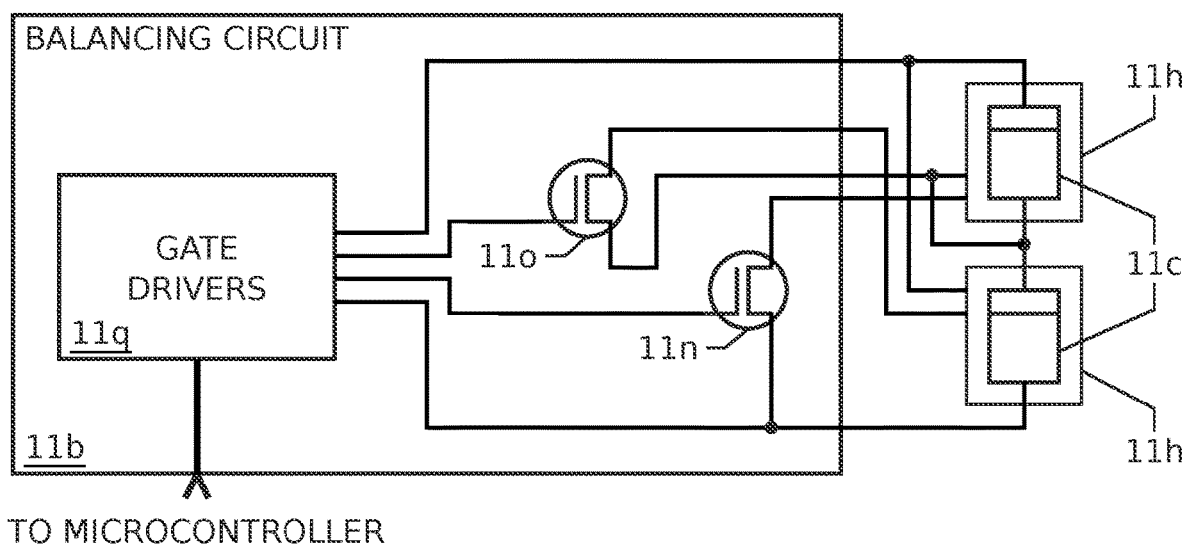
FIG. 15 is similar to FIG. 14, but swaps electrical heating element positions.

FIG. 15 is a block diagram of a balancing circuit 11b which is similar to that shown in FIG. 14, but where the positions of electrical heating elements 11h are swapped with respect to charge storage elements 11c. This design may be advantageous compared with that shown in FIG. 14 when charge storage elements 11c are electrochemical cells, because such cells tend to gain voltage as they are warmed, and the short-term efficacy of balancing circuit 11b may be reduced if a cell with a voltage higher than that of one or more of its accompanying cells is warmed to drain charge. By swapping this association, cells with a lower voltage will be warmed by charge provided by cells with a higher voltage. However, this design may become less meaningful in systems with three or more charge storage elements 11c.

Figure 16A:
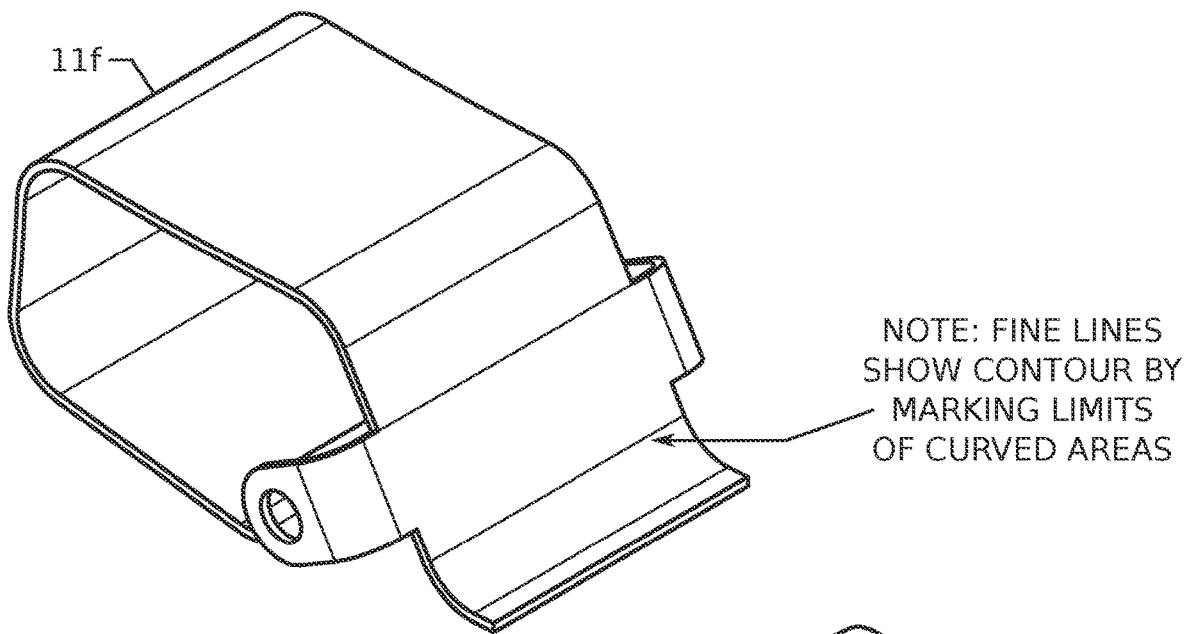
FIGS. 16A, 16B, 16C, 16D, 16E, 16F, and 16G illustrate a metal circuit-breaking spring in its relaxed state after manufacturing or in its open state following an overcurrent or overtemperature event.
Figure 16B:
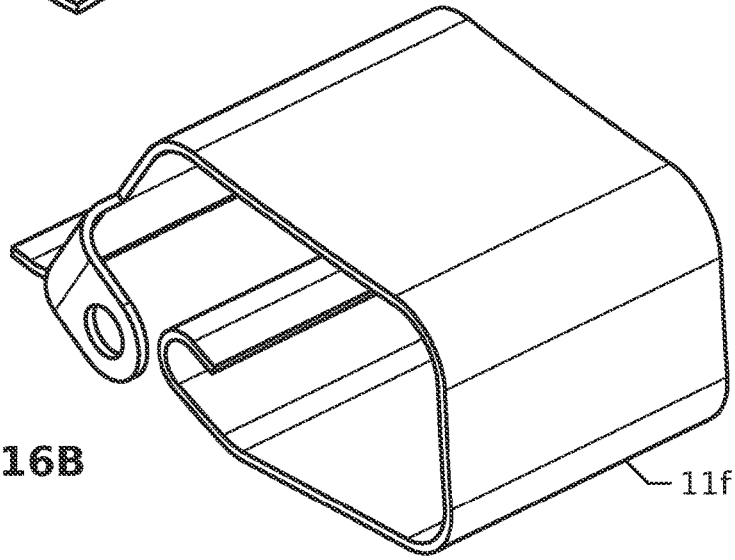
Figure 16C:
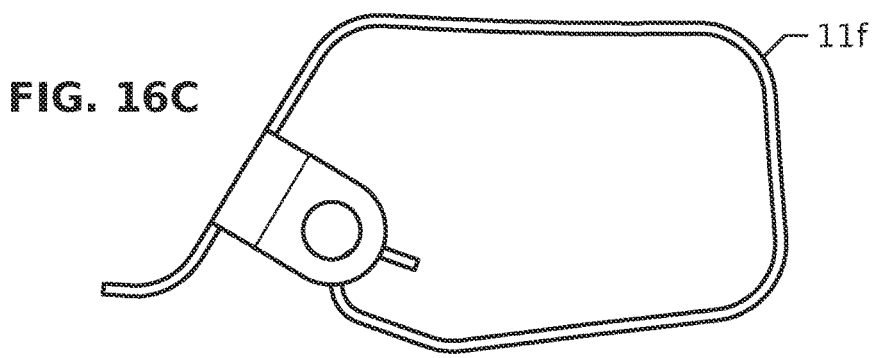
Figure 16D:
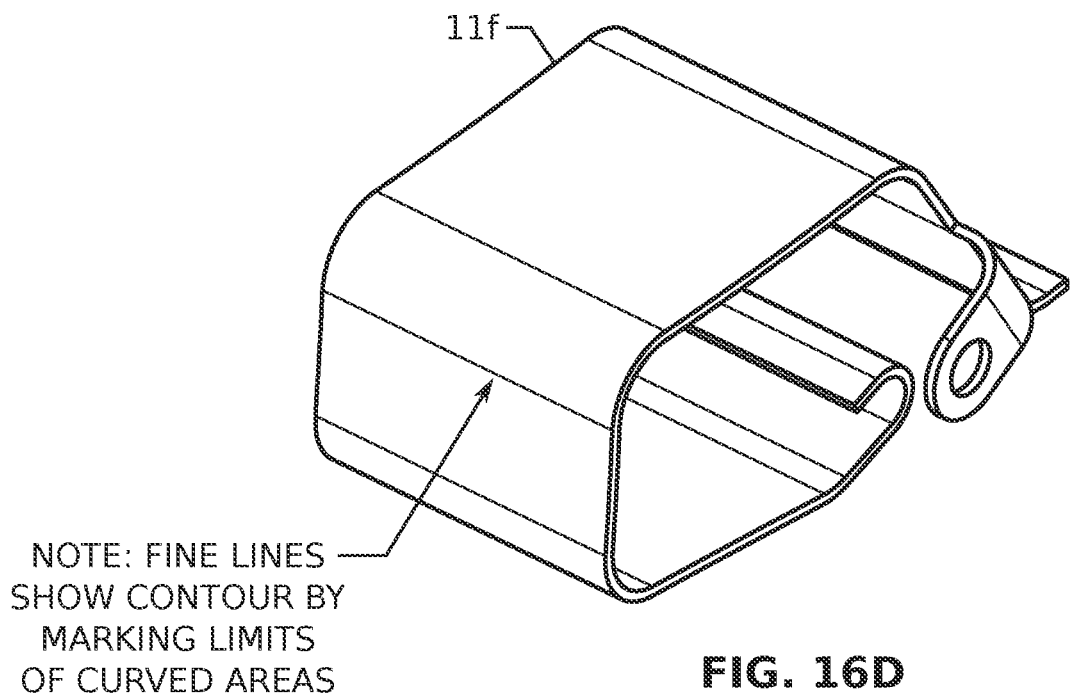
Figure 16E:
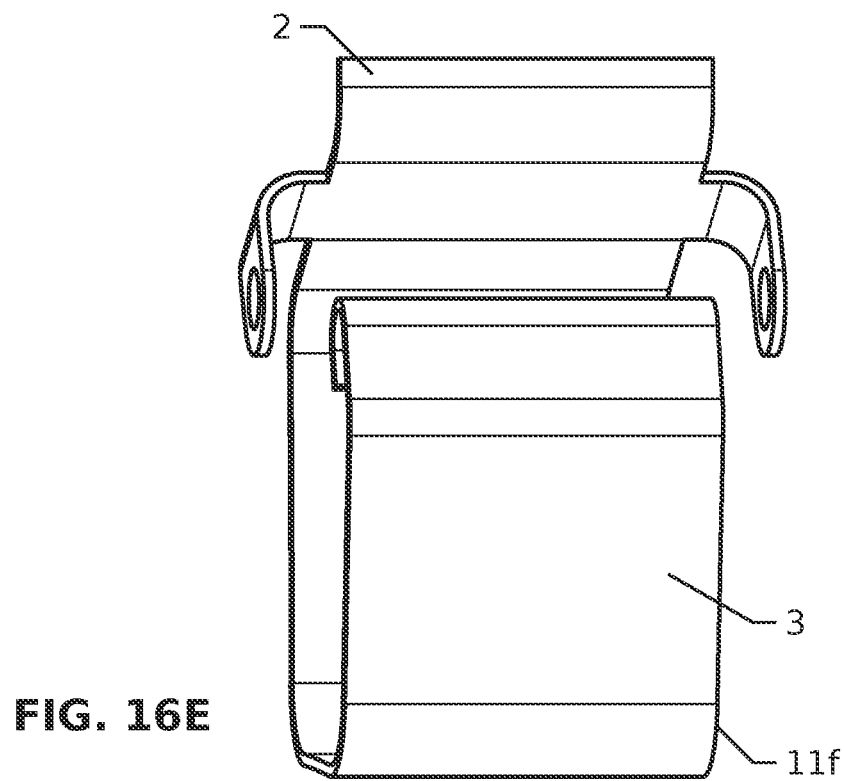
Figure 16F:
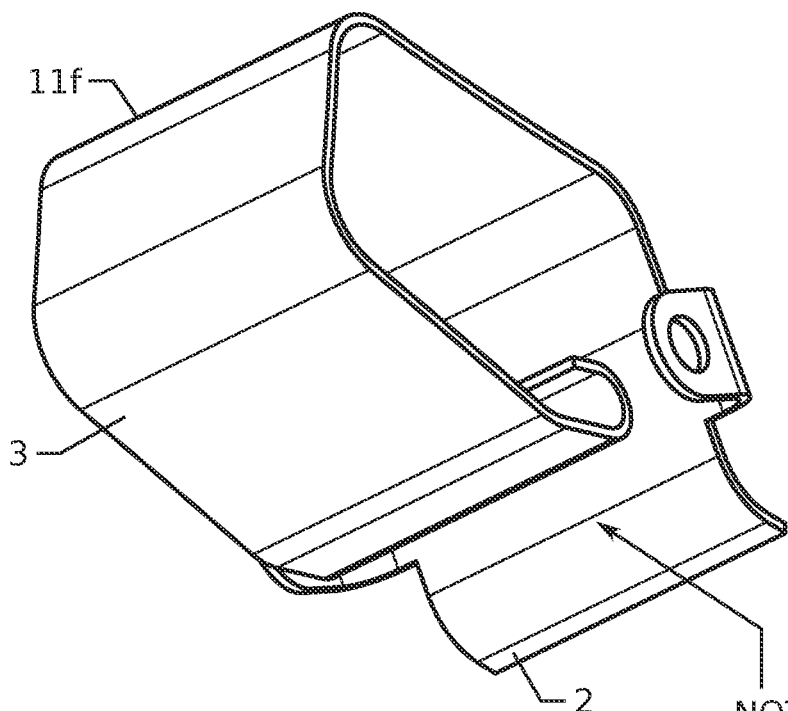
Figure 16G:
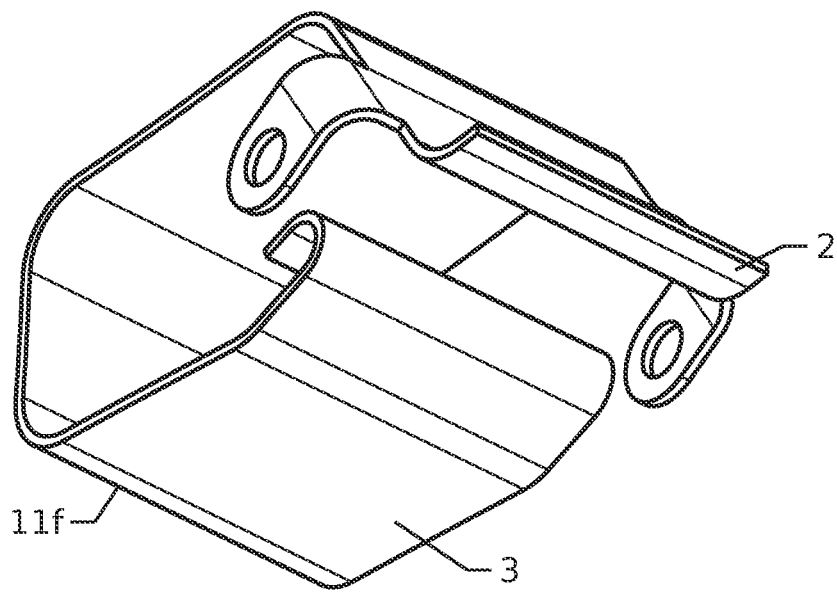
Figure 17A:
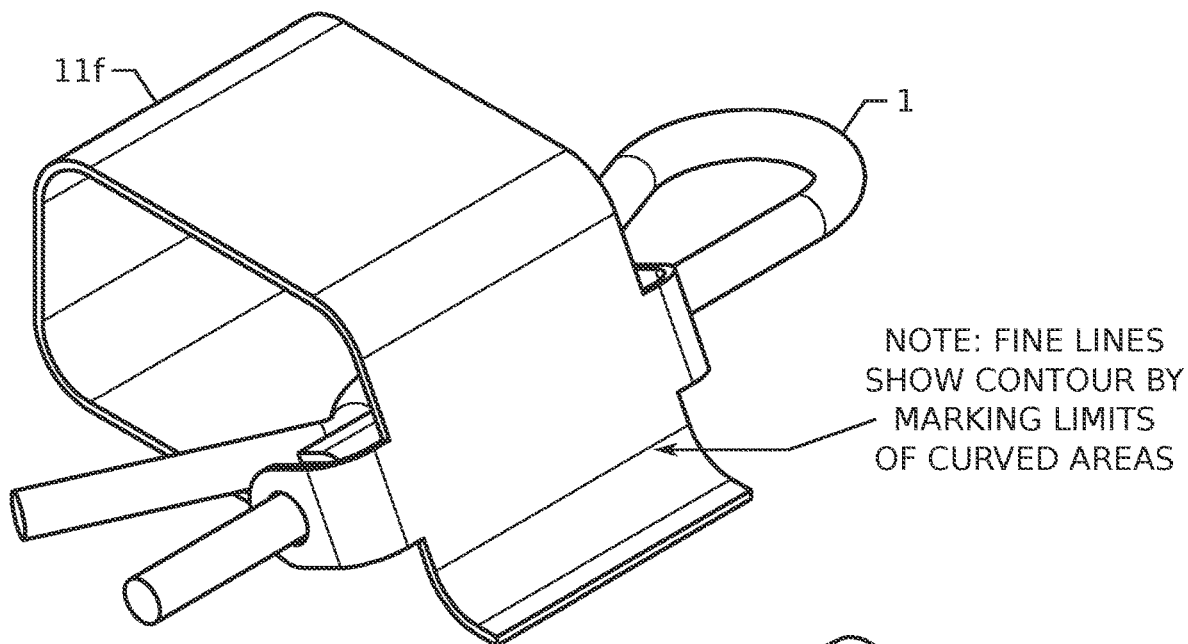
FIGS. 17A, 17B, 17C, 17D, 17E, 17F, and 17G illustrate a metal circuit-breaking spring pinned for assembly.
Figure 17B:
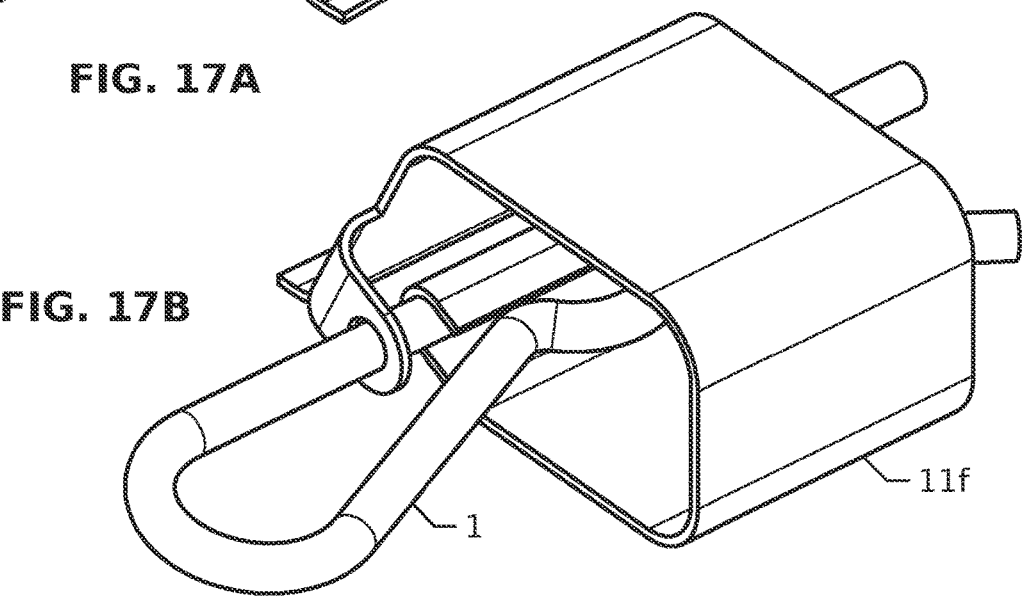
Figure 17C:
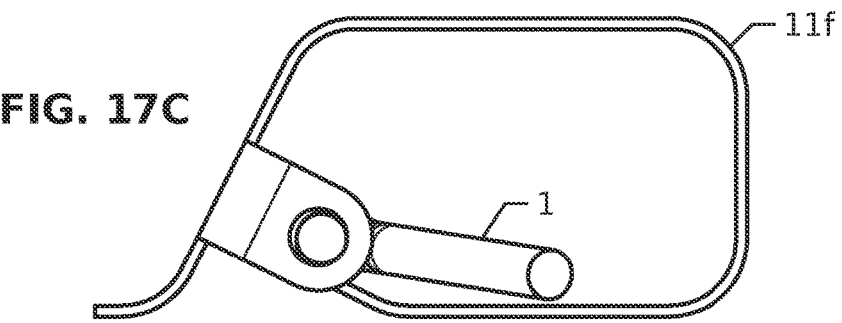
Figure 17D:
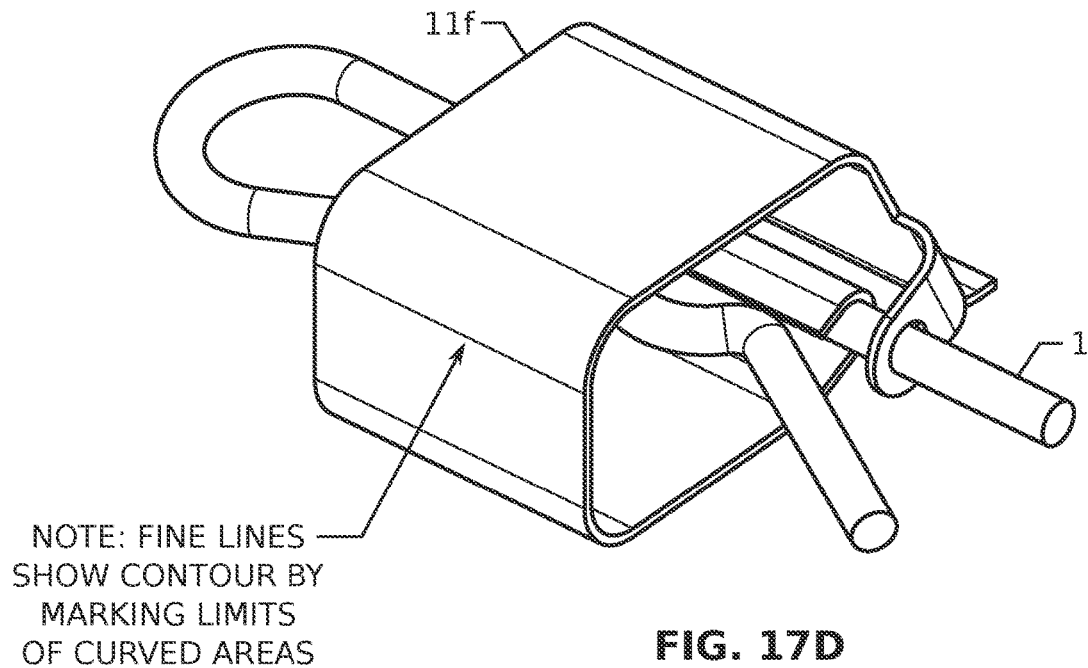
Figure 17E:
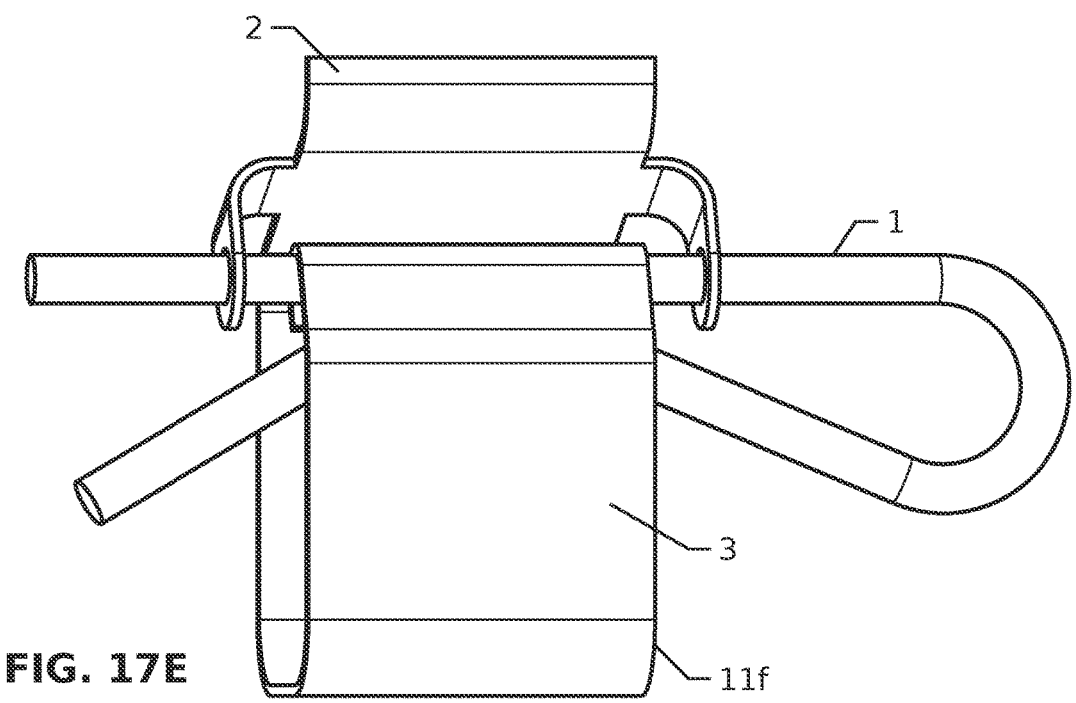
Figure 17F:
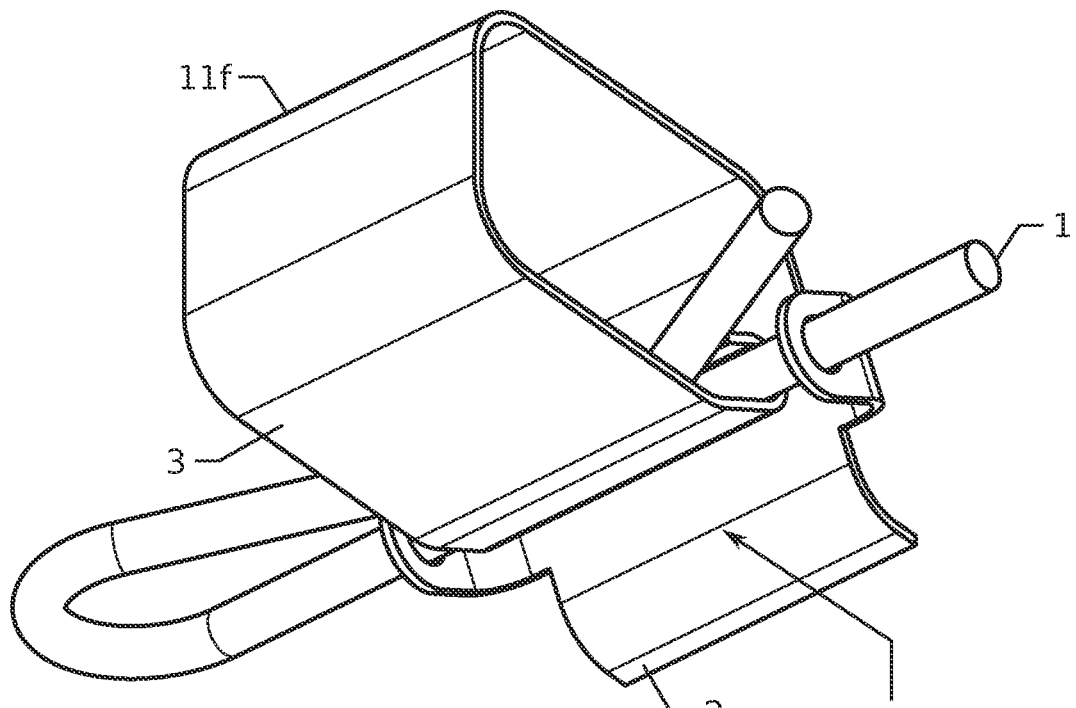
Figure 17G:
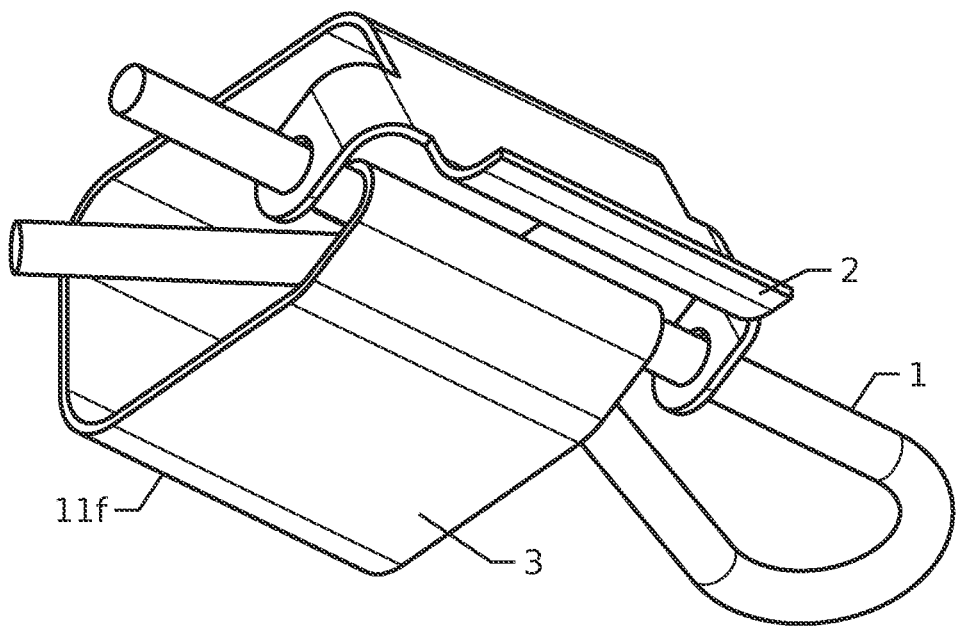

FIGS. 16A, 16B, 16C, 16D, 16E, 16F, 16G, 17A, 17B, 17C, 17D, 17E, 17F, 17G, 18A, 18B, 18C, 18D, 18E, 18F, and 18G illustrate a metal circuit-breaking spring 11f in its three main states. FIGS. 16A, 16B, 16C, 16D, 16E, 16F, and 16G illustrate a spring in its relaxed state after manufacturing or in its open state following an overcurrent or overtemperature event. FIGS. 17A, 17B, 17C, 17D, 17E, 17F, and 17G illustrate a spring pinned for assembly using clip 1. FIGS. 18A, 18B, 18C, 18D, 18E, 18F, and 18G illustrate a spring in its normal operational state. The longest dimension in FIG. 16C is about 10 millimeters and the sheet thickness is consistently 150 microns, resulting in an approximately 60-amp rating. All are of the same design, which represents one example of many possible configurations which may be optimal for different individual uses. Each of these illustrated springs forms one singular fuse element in this embodiment, but one or more similar or different pieces may be required for other designs. Referring to FIG. 17E, surface 3 will be preferentially mounted to a printed circuit board by solder and will be intended to never disconnect. Surface 2 will also be preferentially mounted to a printed circuit board by solder, but with much less area and somewhat greater resistance so that heat can be generated locally to melt and break the solder joint upon an overcurrent event. Assembly would typically be conducted by applying solder paste to copper pads on a printed circuit board in a manner which is very commonly known and placing the pinned spring down upon the printed circuit board. Other components may be added at this time, preferably the remainder of the components within the module 11 such as that shown in FIG. 3. A standard reflow process would be conducted, followed by the removal of clip 1 to finalize assembly.

Since spring 11f in its normal operational state is under tension with a force of typically 0.5 to 1.5 newtons, the protruding end will be pulled off of the printed circuit board or other mounting surface during an overcurrent event due to melted solder. If properly optimized, an advantage of this design is the low electrical resistance across the fuse element, which reduces losses in the overall system. Ease of production is beneficial for economics, as each spring can be quickly stamped out of a material such as C15100 copper-zirconium sheet and therefore each is very inexpensive. Another advantage of using one or more metal circuit breaking springs as opposed to a common-off-the-shelf filament fuse is that if a low-temperature solder such as a tin-bismuth alloy with a melting point around 138 degrees Celsius is employed, 11f will also act as a thermal cutout to alleviate runaway battery fires. Further advantages include easy identification of circuits which have opened and simple/inexpensive repairability by means of resoldering the one or more springs back to their normal operational state as opposed to a full replacement which would otherwise be necessary with a standard filament fuse.

FIGS. 40A, 40B, and 40C list switch states under various commanded modes of operation for all application types, where processing array and interface array numbers are indicated for each type. Delineations between processing arrays and interface arrays are fluid, and these blocks have been diagrammed in this manner to facilitate a schematic-level understanding of the major operations within the switching array. Additionally, filter inductors may be positioned at any location within the system. When AC charging is described regarding interface arrays, it should be assumed that power may flow in either direction depending on settings available to the user or based on a command from a signal originating at the electric utility or from a local energy storage/management unit.

Referring to FIGS. 19, 20, 21, and 22, processing arrays 41, 42, 43, and 44 are variations of the generic processing array 40 as shown in FIG. 1. Each contains slightly different functionality, hence the importance of the numbering change. Similarly referring to FIGS. 23, 24, 25, and 26, interface arrays 51, 52, 53, and 54 are variations of the generic interface array 50 as shown in FIG. 1. Only certain combinations of these processing and interface arrays can be used together, and example implementations are shown in FIGS. 27, 28, 29, 30, 31, 32, 33, and 34, where FIGS. 35 and 36 demonstrate the ability to interconnect a certain pair of multi-level inverters from the latter set.

Figure 19:
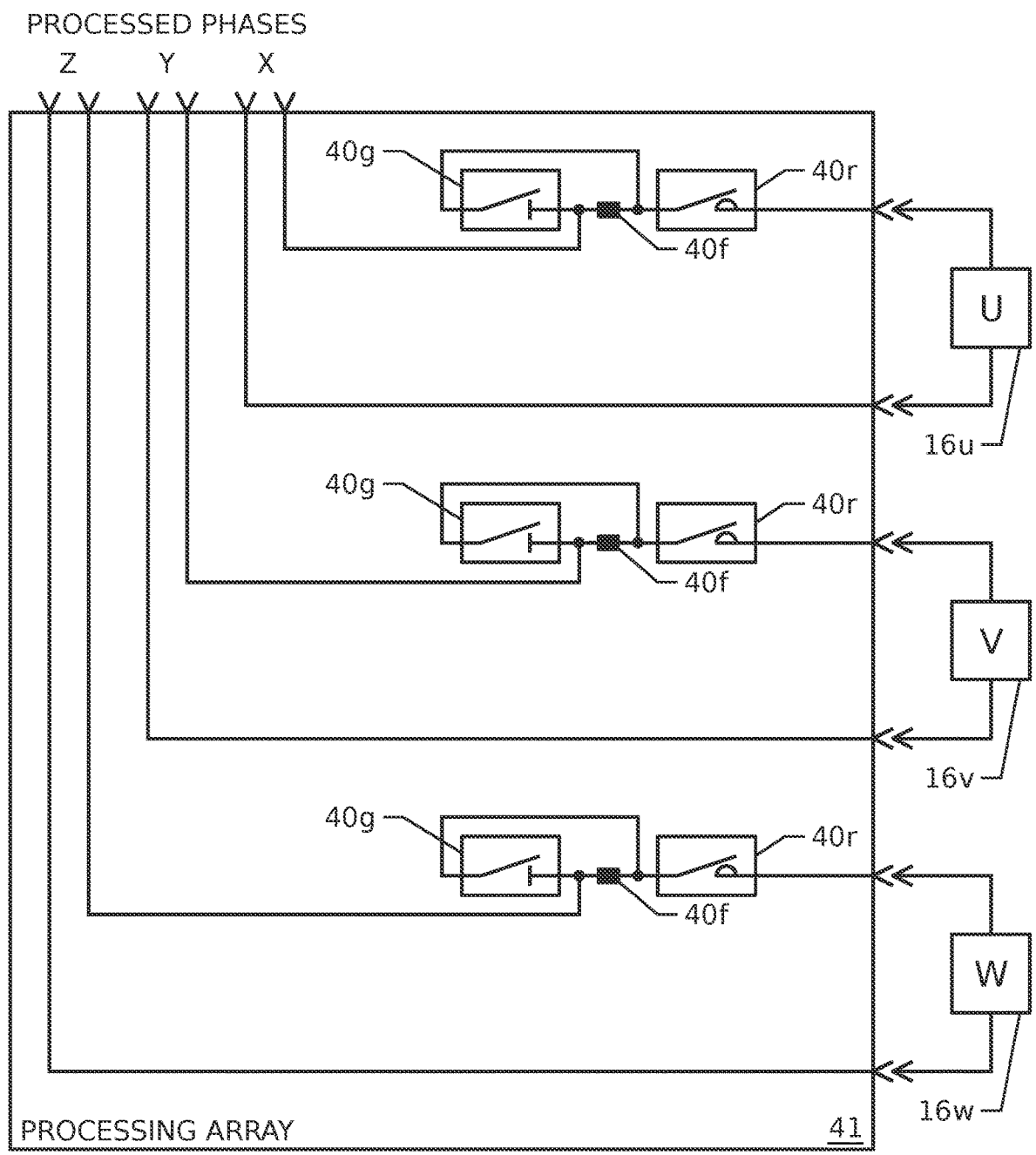
FIG. 19 is a block diagram of a processing array intended for large trailer, medium work van, large work van, and semi truck applications, designed to interface with cascade inverter phases not including center taps.

FIG. 19 is a block diagram of a processing array 41 intended for large trailer, medium work van, large work van, and semi truck applications, designed to interface with cascade inverter phases not including center taps. Cascade inverter phases 16u, 16v, and 16w are external to the processing array 41 and are wired to it by any type of connector or bolted lug. Internally, interrupting switches

40*r*, which are preferably contactors, function as main pack disconnects, and non-interrupting switches 40*g*, which are preferably relays, are present to enable or disable filter inductors 40*f* depending on the commanded mode of operation. An interrupting switch is able to open or close under a current load and typically features arc suppression, and a more lightly constructed non-interrupting switch shall not be subjected to such a requirement. For any given series electrical connection, only one interrupting switch will typically be used to save cost. Virtual cascade inverter phases X, Y, and Z therefore become the processed versions of original cascade inverter phases 16*u*, 16*v*, and 16*w*. Virtual cascade inverter phases X, Y, and Z can become interconnected within other inverters in some circumstances (such as for large trailer applications), bypassing most of the downstream power connections in the local system.

Figure 20:
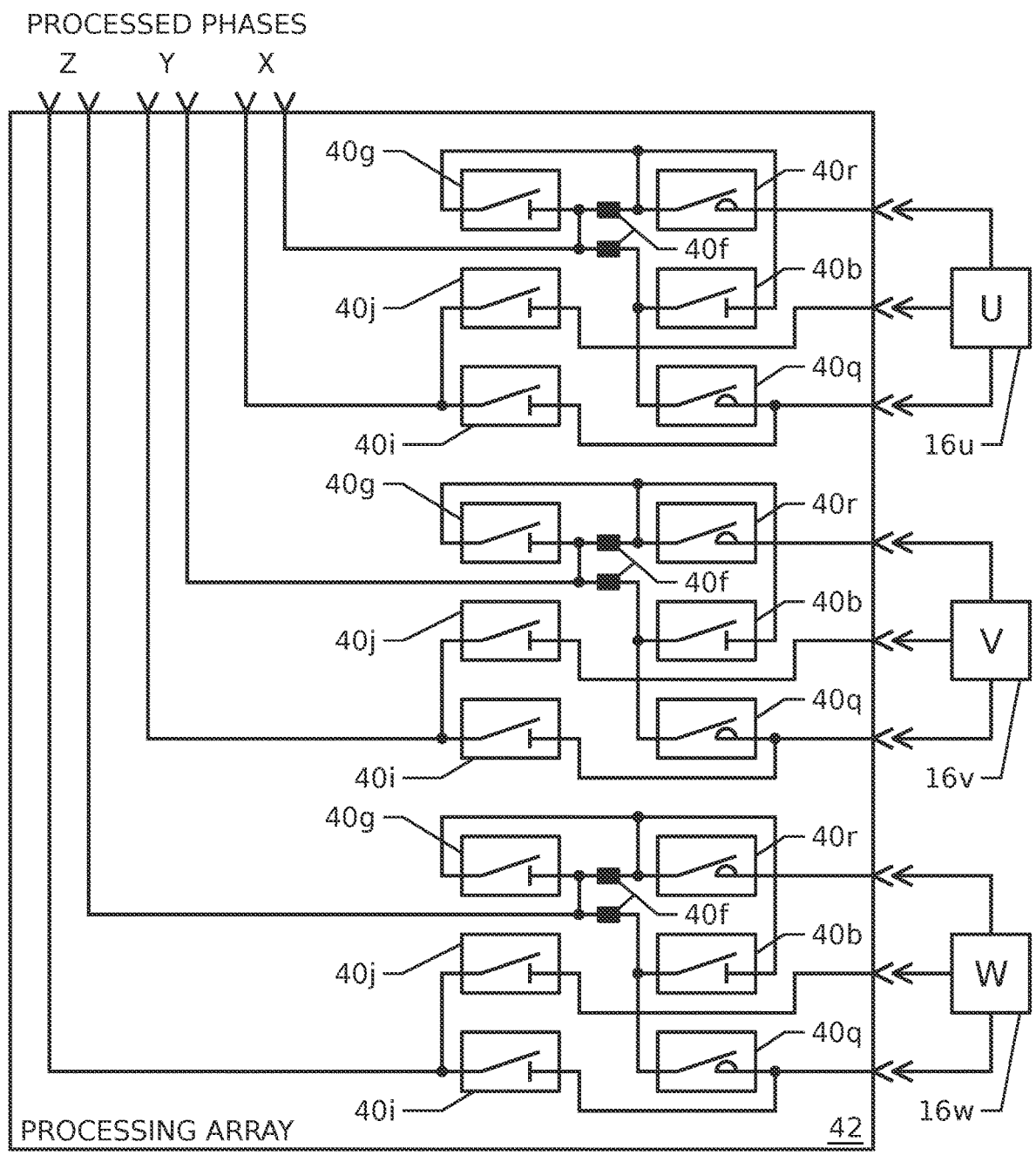
FIG. 20 is a block diagram of a processing array intended for motorcycle, small trailer, large passenger car, and small work van applications, designed to interface with cascade inverter phases including center taps.

FIG. 20 is a block diagram of a processing array 42 intended for motorcycle, small trailer, large passenger car, and small work van applications, designed to interface with cascade inverter phases including center taps. This design is similar to that shown in FIG. 16, but components have been added to support folding cascade inverter phases 16*u*, 16*v*, and 16*w* in order to halve their existing voltage ratings and double their existing current ratings. The quantity of filter inductors 40*f* has been doubled—with each rated for about half the current as those in FIG. 19, all else being equal—so that each power terminal of cascade inverter phases 16*u*, 16*v*, and 16*w* now can be filtered individually. Interrupting switches 40*q*, which are preferably contactors, are now present to enable or disable folding depending on the commanded mode of operation and can be opened in the case of an internal fault or voltage disagreement between the two halves of the associated cascade inverter phase. Non-interrupting switches 40*b*, which are preferably relays, have been added to allow paralleling of the filter inductors 40*f*. Such paralleling would be enabled in the non-folded mode, to restore the original current handling capability as shown in FIG. 19, or disabled in the folded mode, allowing the two halves of the cascade inverter phases 16*u*, 16*v*, and 16*w* to be only indirectly connected to avoid unintended current spikes due to small timing errors during the operation of the plurality of modules contained within. Non-interrupting switches 40*i* and 40*j*, which are preferably relays, select either non-folded or folded modes respectively. Virtual cascade inverter phases X, Y, and Z can become interconnected within other inverters in some circumstances (such as for small trailer applications), bypassing most of the downstream power connections in the local system.

Figure 21:
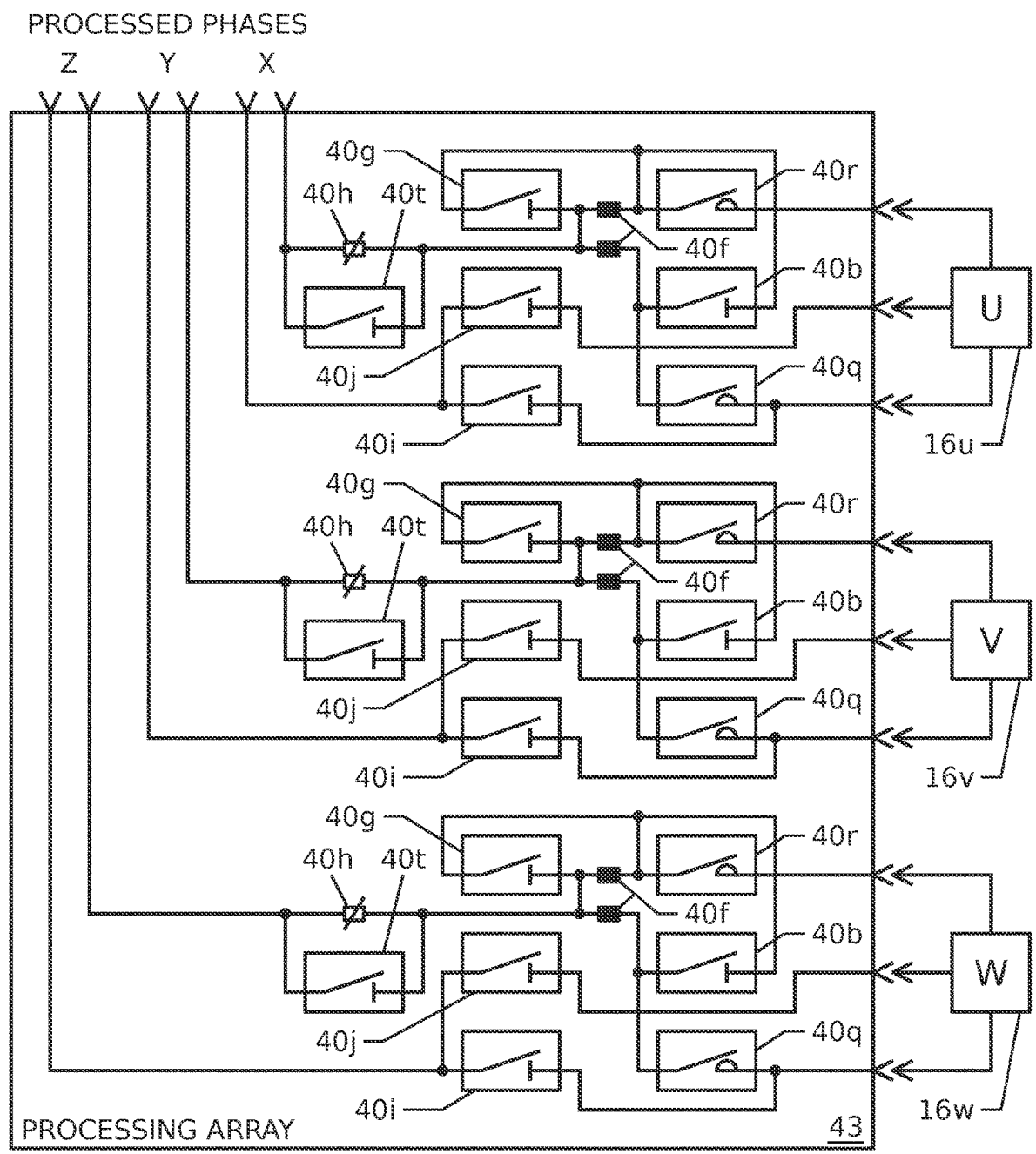
FIG. 21 is a block diagram of a processing array intended for small passenger car applications, designed to interface with cascade inverter phases including center taps and incorporating phase-level electrical heating elements.

FIG. 21 is a block diagram of a processing array 43 intended for small passenger car applications, designed to interface with cascade inverter phases including center taps. This design is similar to that shown in FIG. 20, but components have been added to support per-phase heating. Electrical heating elements 40*h*, which are actually external to processing array 43 and contained within cascade inverter phases 16*u*, 16*v*, and 16*w*, can be enabled or disabled by non-interrupting switches 40*t*, which are preferably relays.

Figure 22:
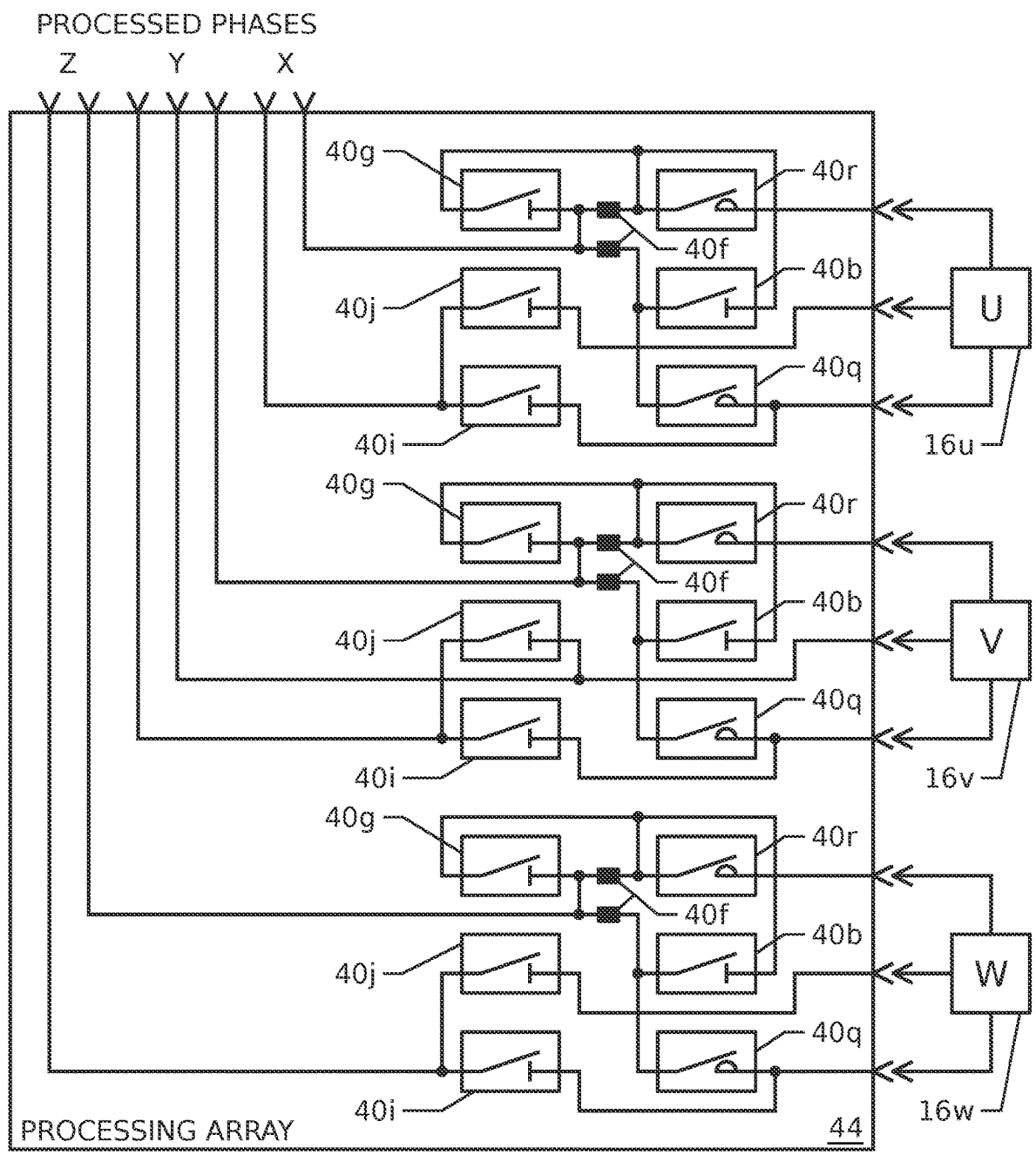
FIG. 22 is a block diagram of a processing array intended for generator set applications, designed to interface with cascade inverter phases including center taps.

FIG. 22 is a block diagram of a processing array intended for generator set applications, designed to interface with cascade inverter phases including center taps. This design is nearly identical to that shown in FIG. 20, but a direct connection to the center tap of cascade inverter phase 16*v* has now been brought out. Virtual cascade inverter phases X, Y, and Z can become interconnected within other inverters, bypassing most of the downstream power connections in the local system.

Figure 23:
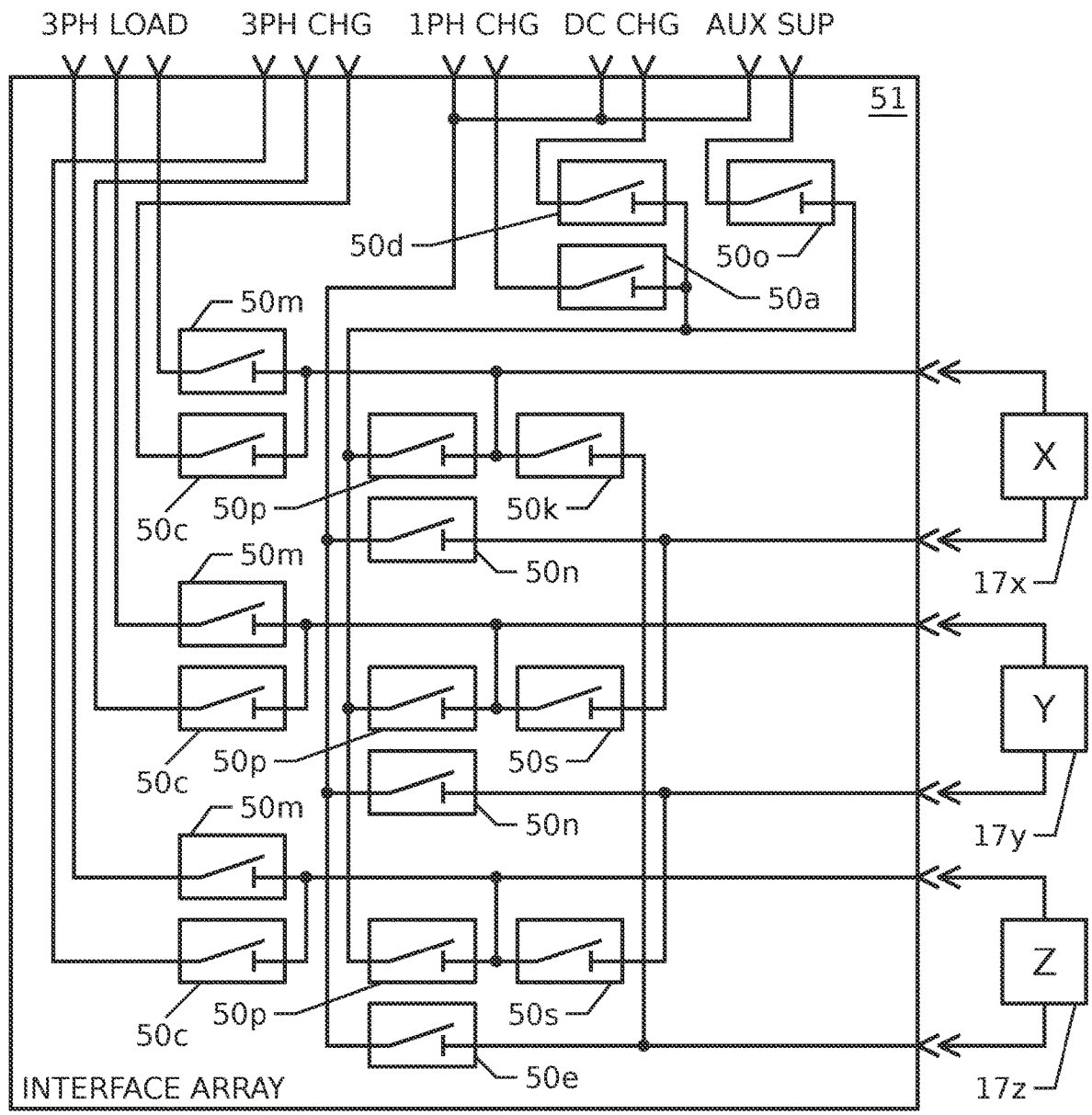
FIG. 23 is a block diagram of an interface array intended for small trailer, large trailer, small passenger car, and large passenger car applications, which does not include the ability to accept interconnected multi-level inverters.

FIG. 23 is a block diagram of an interface array 51 intended for small trailer, large trailer, small passenger car, and large passenger car applications, which does not include the ability to accept interconnected inverters. During normal driving operation and while charging from certain high-voltage, three-phase AC sources, non-interrupting switches 50*n* and 50*e*, which are preferably relays, will be closed to form a three-phase wye circuit out of cascade inverter phases 16*u*, 16*v*, and 16*w*. Non-interrupting switches 50*p*, which are preferably relays, facilitate a parallel connection between the three cascade inverter phases for handling high currents, and require switches 50*n* and 50*e* to also be closed. Non-interrupting switches 50*s*, which are preferably relays, facilitate a series connection between the three cascade inverter phases for handling high voltages, and require switches 50*n* to be open. Non-interrupting switch 50*k*, which is preferably a relay, closes the series loop fully and facilitates a circular delta configuration of the three cascade inverter phases; only while this configuration is applied, switch 50*e* will be open as switch 50*k* and switch 50*e* always have opposing states. Non-interrupting switches 50*m*, which are preferably relays, will only be closed during normal driving operation. Likewise, non-interrupting switches 50*c*, which are preferably relays, will only be closed during three-phase AC charging, regardless if the cascade inverter phases are placed into wye or delta mode. Non-interrupting switches 50*a*, 50*d*, and 50*o*, which are preferably relays, enable one-phase AC charging, DC charging, and one-phase AC auxiliary supply modes respectively.

Figure 24:
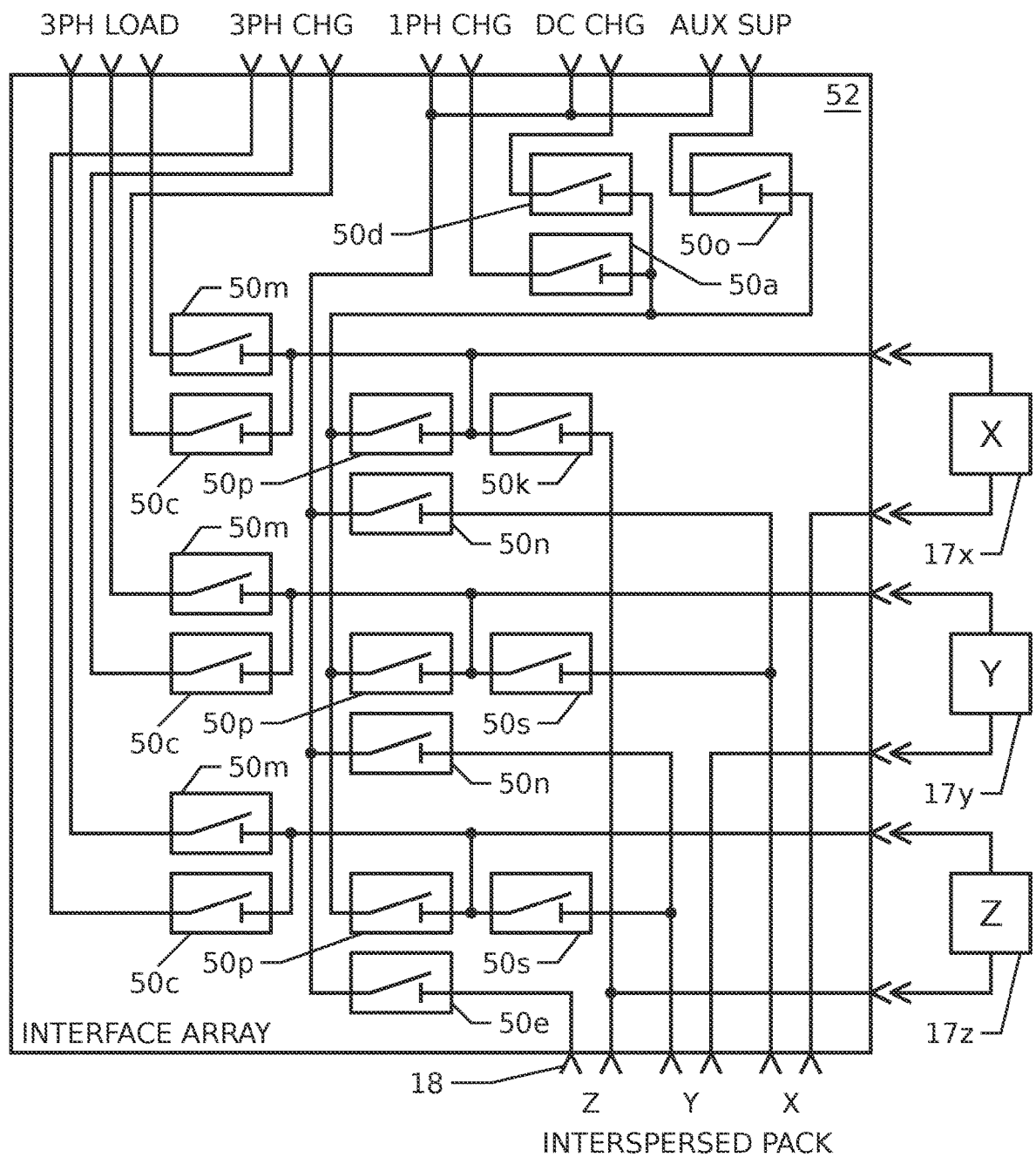
FIG. 24 is a block diagram of an interface array intended for small work van, medium work van, large work van, and semi truck applications, which includes the ability to accept interconnected multi-level inverters.

FIG. 24 is a block diagram of an interface array 52 intended for small work van, medium work van, large work van, and semi truck applications, which includes the ability to accept interconnected inverters. This design is similar to that shown in FIG. 23, but contains additional ports to accept three virtual cascade inverter phase connections 18 from an external recessive inverter, which will be placed in series per phase with the virtual cascade inverter phases 17*x*, 17*y*, and 17*z*. The corresponding terminal pairs of these ports 18 must be shorted together during operation without an interconnected inverter, in which case the operation of interface array 52 is identical to the operation of interface array 51 shown in FIG. 23.

Figure 25:
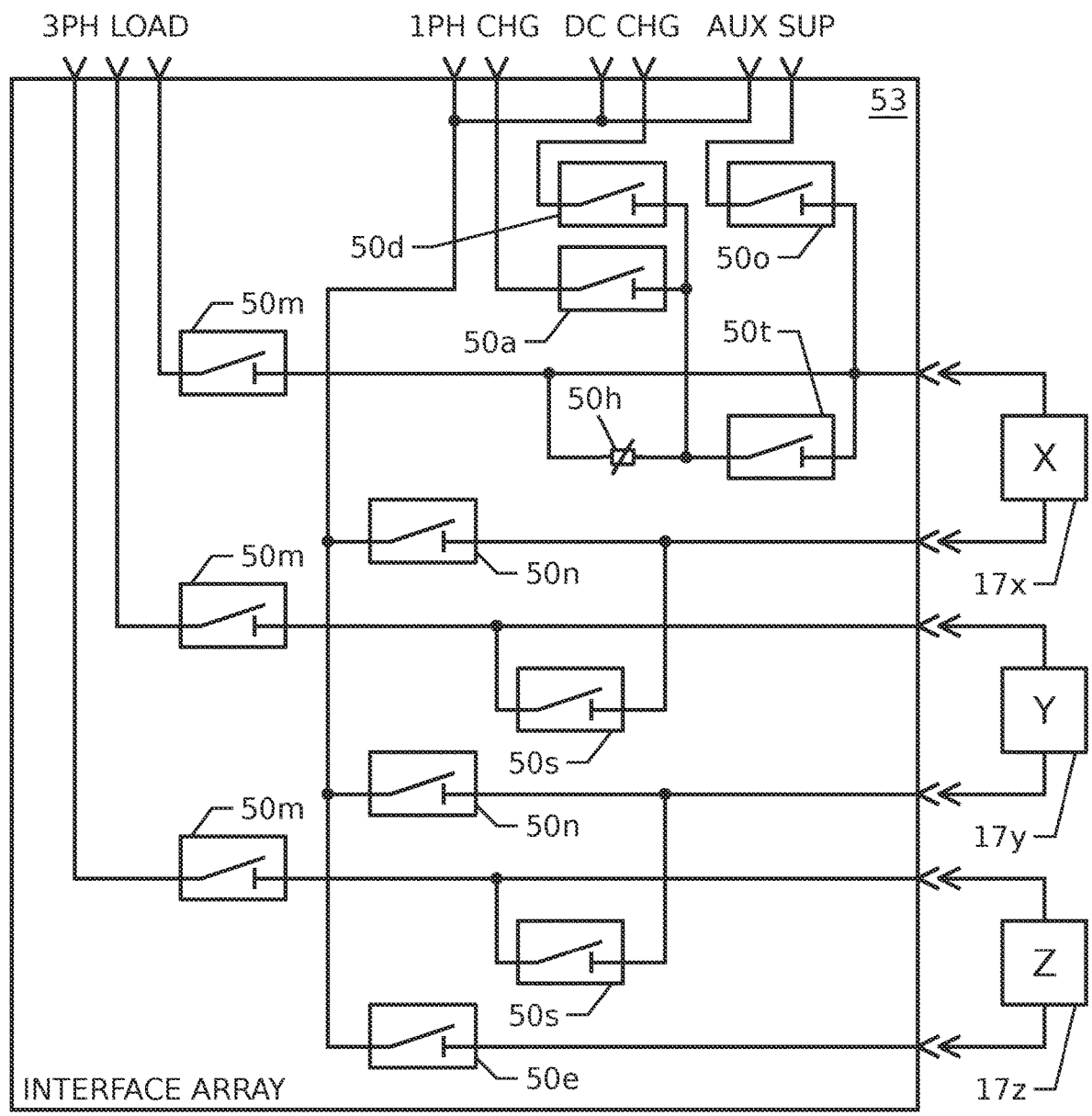
FIG. 25 is a block diagram of an interface array intended for motorcycle applications, which has been simplified compared to those shown in FIGS. 23 and 24, and does not include the ability to transfer power to or from a three-phase AC voltage source.

FIG. 25 is a block diagram of an interface array 53 intended for motorcycle applications, which has been simplified compared to the designs shown in FIGS. 23 and 24 and therefore has reduced functionality. This design removes the possibility of charging from a three-phase AC voltage source, paralleling virtual cascade inverter phases 17*x*, 17*y*, and 17*z*, and creating a circular delta configuration in comparison to the other designs. However, this design adds a per-pack heating capability, implying that per-module heating is not used within the motorcycle. Electrical heating element 50*h*, which is actually external to interface array 53 and contained within the original cascade inverter phases of the inverter, can be enabled or disabled by non-interrupting switch 53*t*, which is preferably a relay.

Figure 26:
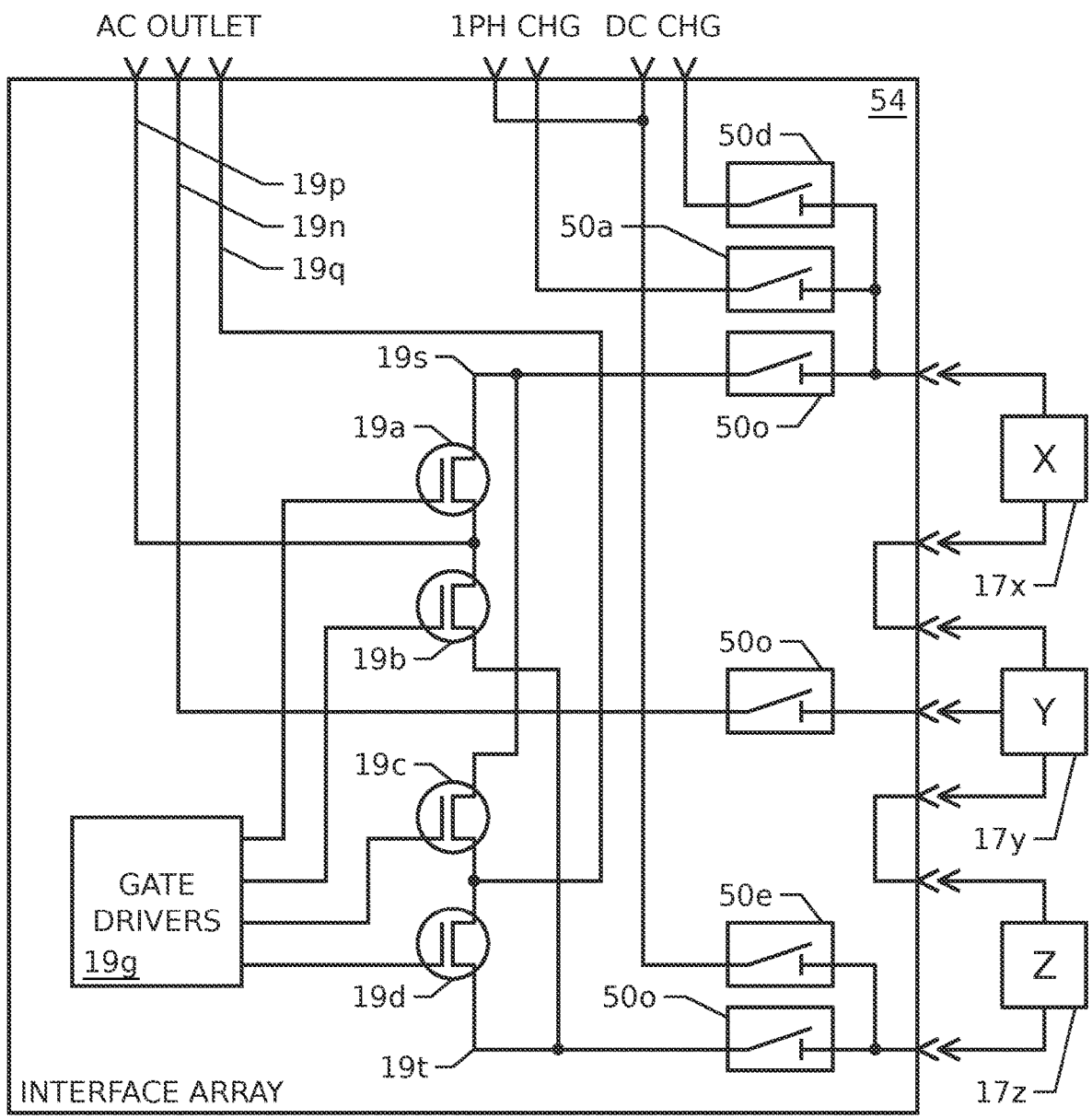
FIG. 26 is a block diagram of an interface array intended for generator set applications, which includes split-phase driving circuitry.

FIG. 26 is a block diagram of an interface array 54 intended for generator set applications and bears little resemblance to the other interface arrays. Non-interrupting switches 50*a*, 50*d*, and 50*e*, which are preferably relays, are still present to facilitate AC one-phase and DC charging as before. Non-interrupting switches 50*o*, which are preferably relays, enable or disable the entire split-phase circuitry section when necessary. Virtual cascade inverter phases 17*x*, 17*y*, and 17*z* are now permanently connected in series, and cascade inverter phase 17*y* has a center tap which acts as a neutral line 19*n* on the split-phase outlet. Gate drivers 19*g* control four switches 19*a*, 19*b*, 19*c*, and 19*d*, which are preferably high-voltage transistors, where lines 19*s* and 19*t* support the voltage bus of this H-bridge. Output lines 19*p* and 19*q* are 180 degrees out of phase so that 240 volts AC is provided directly across them, while just 120 volts AC is provided between each and the neutral line 19*n*. Associated waveforms can be seen in FIGS. 48, 49, 50, and 51.

Referring to FIGS. 27, 28, 29, 30, 31, 32, 33, 34, 35, and 36, element numbers 60 or higher which end in '7' are used to refer to elements supporting one-phase AC, '8' to elements supporting split-phase AC, and '9' to elements supporting three-phase AC. In particular, this includes three-phase drive motor 69, one-phase auxiliary outlet 77, split-phase auxiliary outlet 78, three-phase auxiliary outlet 79, one-phase charging inlet 87, and three-phase charging inlet 89. It shall be noted that one-phase charging inlet 87 additionally supports DC interaction, and three-phase charging inlet 89 additionally supports DC and one-phase AC interaction; both also support bidirectional power transfer. It is conceivable that outlets 77, 78, and 79 support DC interaction, but it is anticipated that the demand for such a mode would be minimal. Standard outlets and inlets shall be used whenever possible for these elements. Possible suggestions follow: one NEMA 5-20 for outlet 77, a combination of two NEMA 5-20 (one per split phase) and one NEMA 14-50 for outlet 78; one NEMA L15-30 for outlet 79; IEC 62196-3 Configuration EE (CCS Combo 1), J3400 (Tesla/NACS), or J3068 (IEC 62196-2 Type 2) for inlet 87; and IEC 62196-3 Configuration FF (CCS Combo 2) or J3068 (IEC 62196-2 Type 2) for inlet 89.

Charging inlets such as element 80 in FIG. 1 may dual as auxiliary outlets such as element 70 in the same figure. The primary difference is that an external adapter must be connected to the charging inlet in order to provide auxiliary outlet functionality. Auxiliary outlets may only be voltage sources providing real power, while charging inlets may be voltage sources, current sources, or current sinks. Charging inlets may also function to transfer reactive power where no meaningful real power transfer is taking place, especially upon a request from an electric utility.

Figure 27:
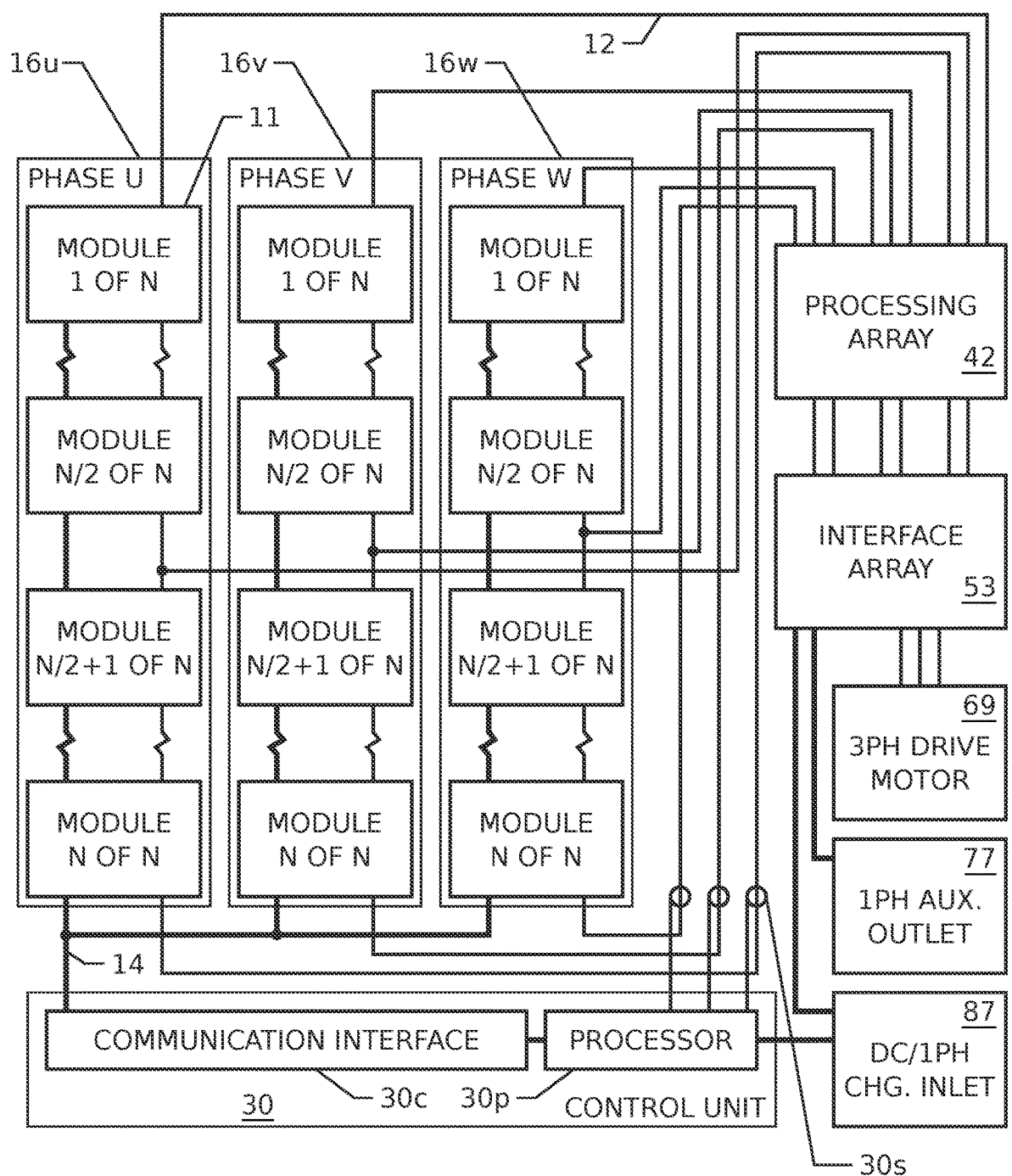
FIG. 27 is a block diagram of a multi-level inverter intended for motorcycle applications.

FIG. 27 is a block diagram of a multi-level inverter intended for motorcycle applications, which contains processing array 42 such as that shown in FIG. 20 and interface array 53 such as that shown in FIG. 25. Modules 11, such as those shown in FIGS. 2 and 3, are organized into three cascade inverter phases 16*u*, 16*v*, and 16*w*. In this embodiment, one internal bus 14 is used, which originates from communication interface 30*c* within control unit 30. Current sensors 30*s* send signals to processor 30*p*, which is also within control unit 30. Module power terminals 12, which include center taps, connect to processing array 42. Processing array 42 then connects to interface array 53, which then connects to drive motor 69, auxiliary outlet 77, and charging inlet 87. Optional signal wires interconnect charging inlet 87 to processor 30*p*.

Figure 28:
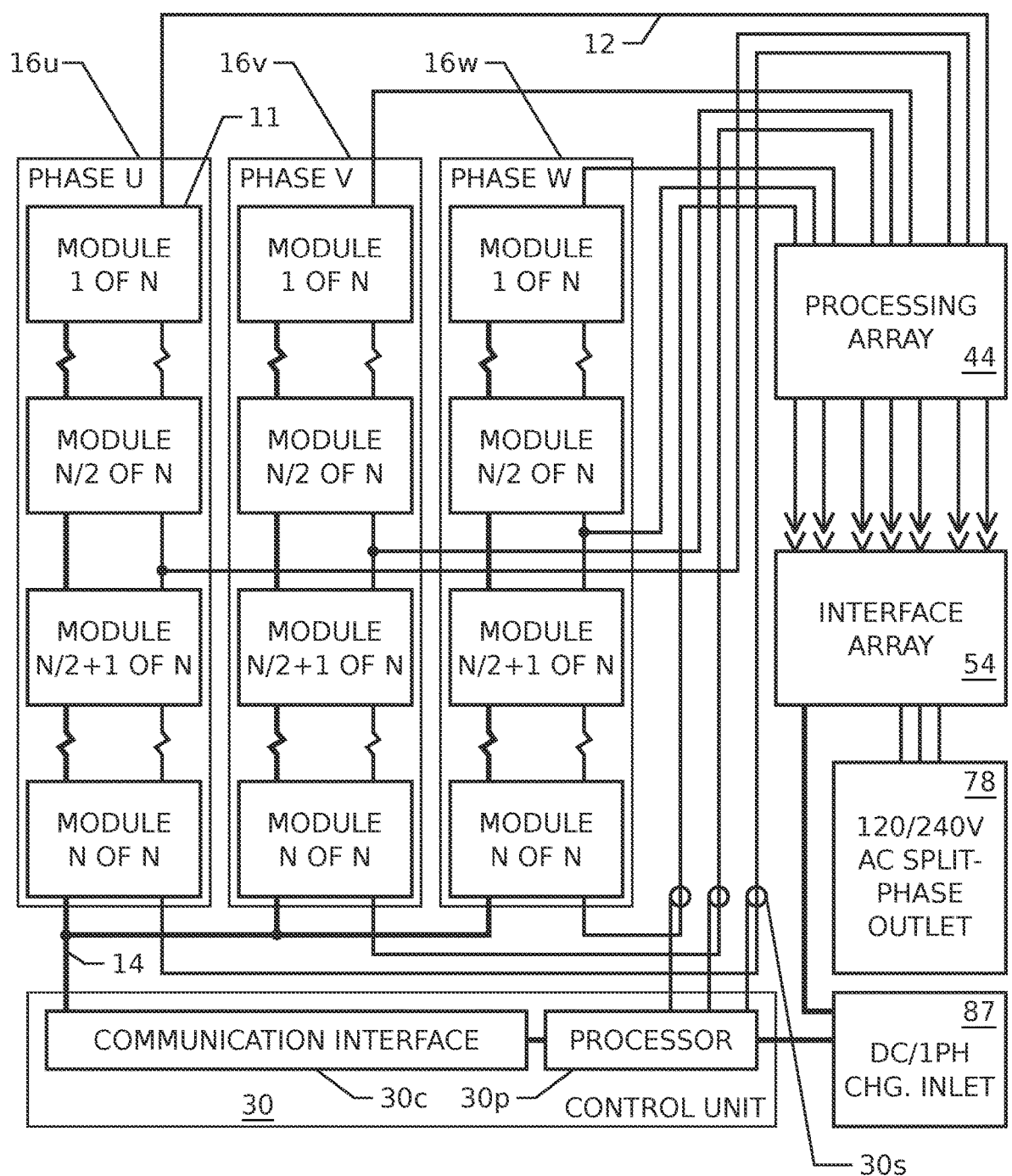
FIG. 28 is a block diagram of a multi-level inverter intended for generator set applications.
Figure 35:
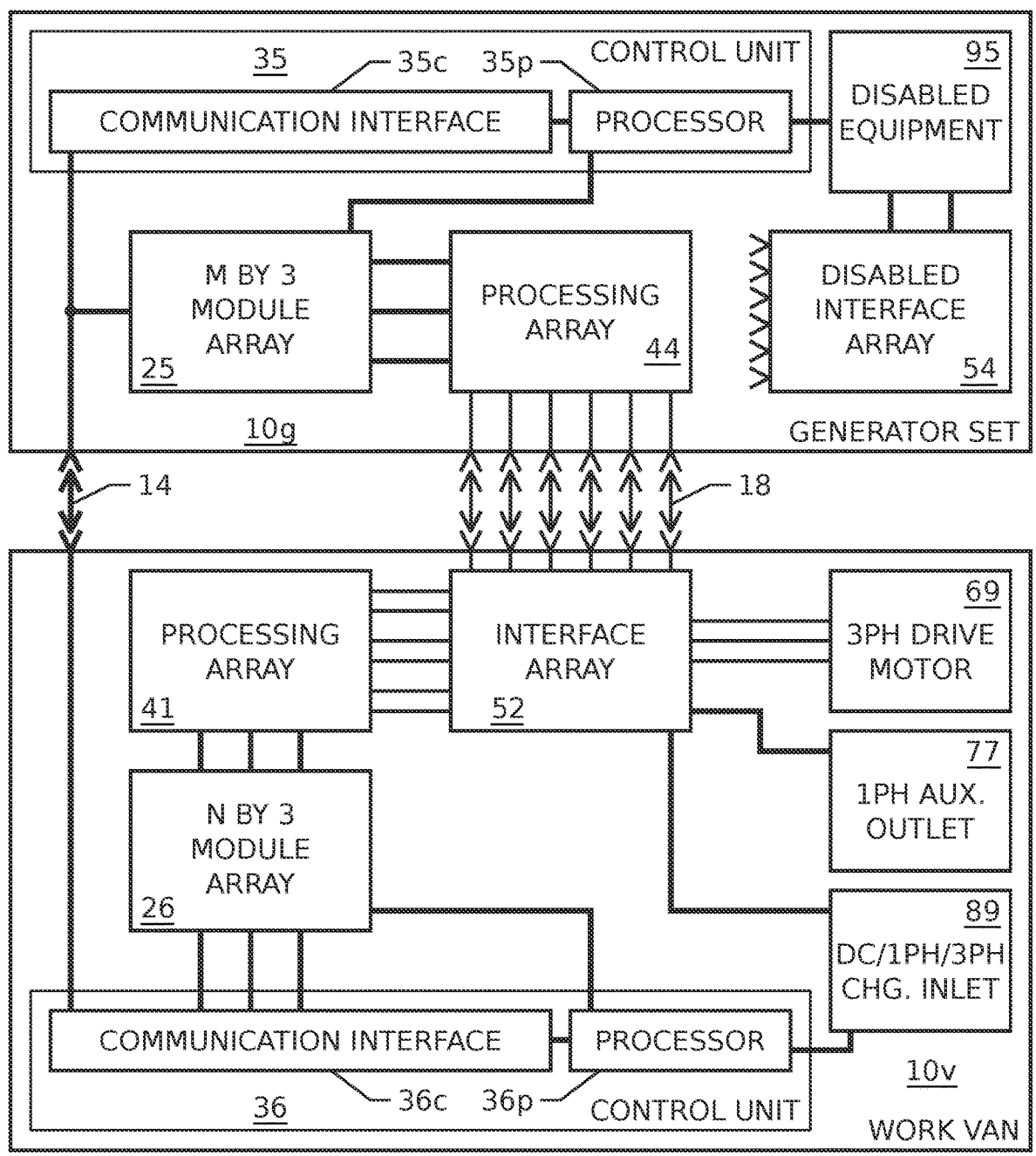
FIG. 35 is a block diagram of a recessive generator set multi-level inverter interconnected within a dominant medium/large work van multi-level inverter.

FIG. 28 is a block diagram of a multi-level inverter intended for generator set applications, which contains processing array 44 such as that shown in FIG. 22 and interface array 54 such as that shown in FIG. 26. Modules 11, such as those shown in FIGS. 4, 5, 6, 7, 8, and 9, are organized into three cascade inverter phases 16*u*, 16*v*, and 16*w*. In this embodiment, one internal bus 14 is used, which originates from communication interface 30*c* within control unit 30. Current sensors 30*s* send signals to processor 30*p*, which is also within control unit 30. Module power terminals 12, which include center taps, connect to processing array 44. Processing array 44 then connects to interface array 54, which then connects to auxiliary outlet 78 and charging inlet 87. Optional signal wires interconnect charging inlet 87 to processor 30*p*. The three virtual cascade inverter phase outputs of processing array 44 can be reconfigured to connect to the interface array of an external dominant inverter instead of interface array 54, such as shown in FIG. 35, wherein this inverter would become recessive and the two inverters would act as a single interconnected inverter. In this arrangement, internal bus 14 would facilitate real-time signaling within the system.

Figure 29:
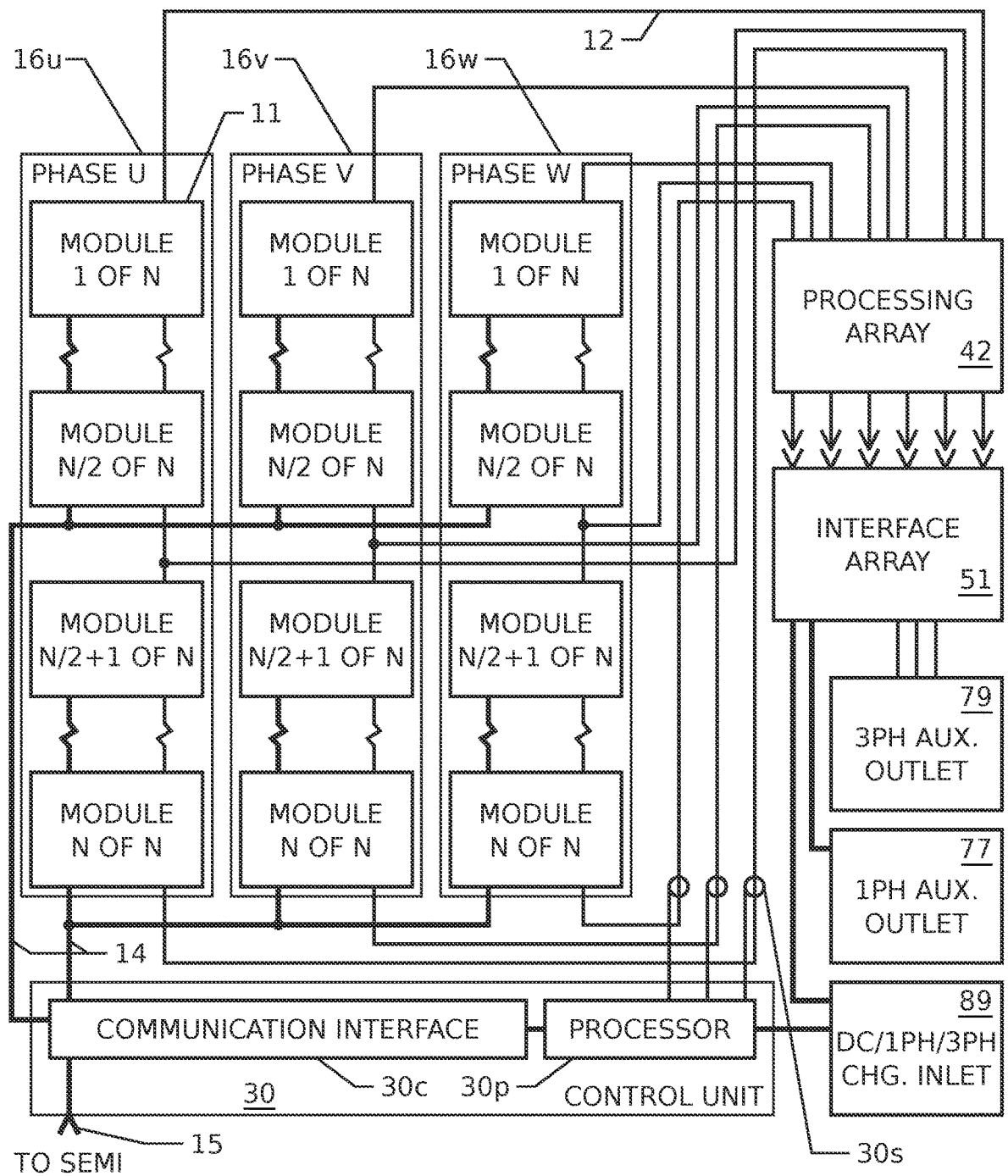
FIG. 29 is a block diagram of a multi-level inverter intended for small trailer applications.
Figure 36:
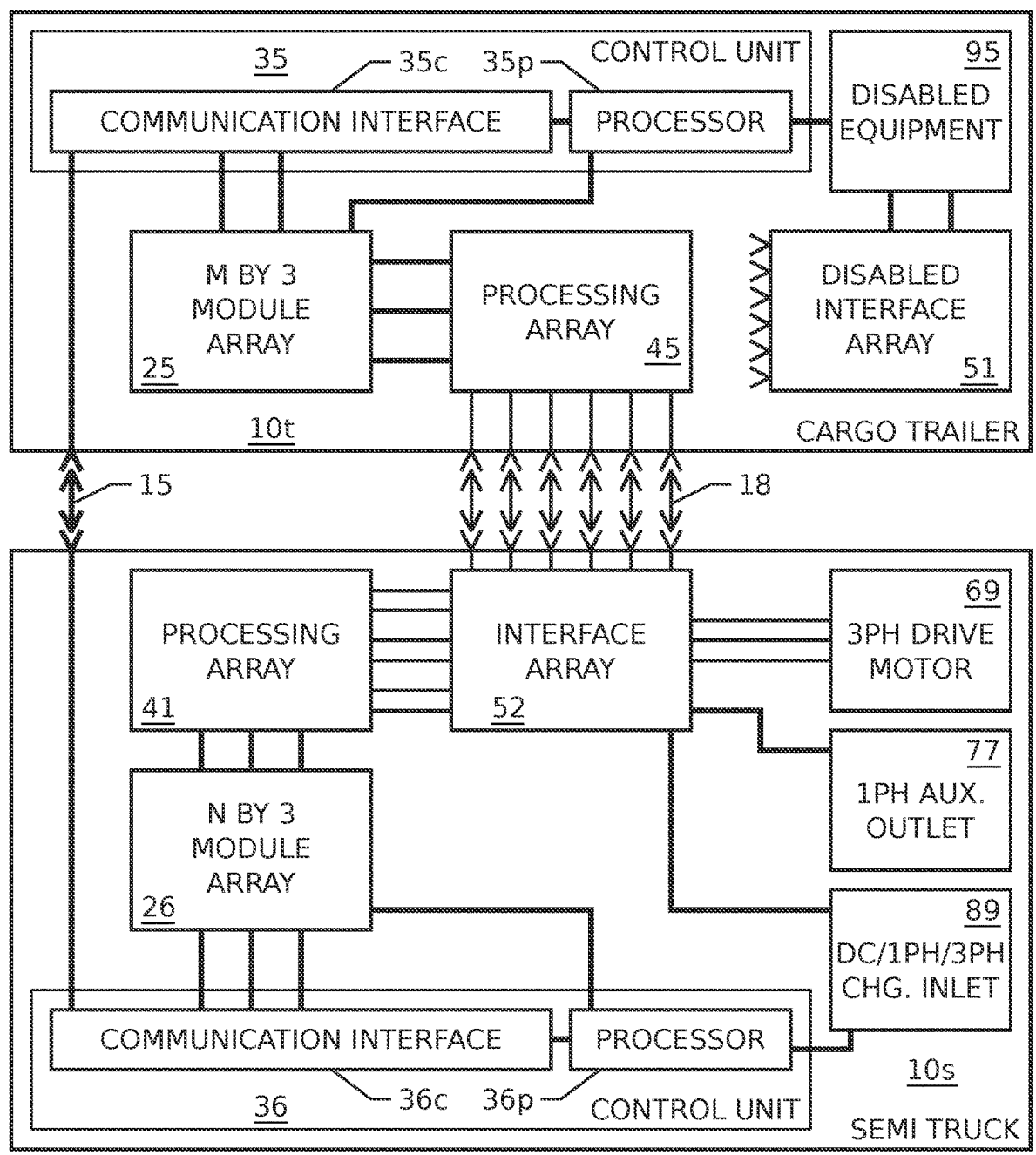
FIG. 36 is a block diagram of a recessive trailer multi-level inverter interconnected within a dominant semi truck multi-level inverter.

FIG. 29 is a block diagram of a multi-level inverter intended for small trailer applications, which contains processing array 42 such as that shown in FIG. 20 and interface array 51 such as that shown in FIG. 23. Modules 11, such as those shown in FIGS. 4, 5, 6, 7, 8, and 9, are organized into three cascade inverter phases 16*u*, 16*v*, and 16*w*. In this embodiment, two internal buses 14 are used, which originate from communication interface 30*c* within control unit 30. Current sensors 30*s* send signals to processor 30*p*, which is also within control unit 30. Module power terminals 12, which include center taps, connect to processing array 42. Processing array 42 then connects to interface array 51, which then connects to auxiliary outlet 79, auxiliary outlet 77, and charging inlet 89. Optional signal wires interconnect charging inlet 89 to processor 30*p*. The three virtual cascade inverter phase outputs of processing array 42 can be reconfigured to connect to the interface array of an external dominant inverter instead of interface array 51, such as shown in FIG. 36, wherein this inverter would become recessive and the two inverters would act as a single interconnected inverter. In this arrangement, auxiliary communication bus 15 would facilitate real-time signaling within the system.

Figure 30:
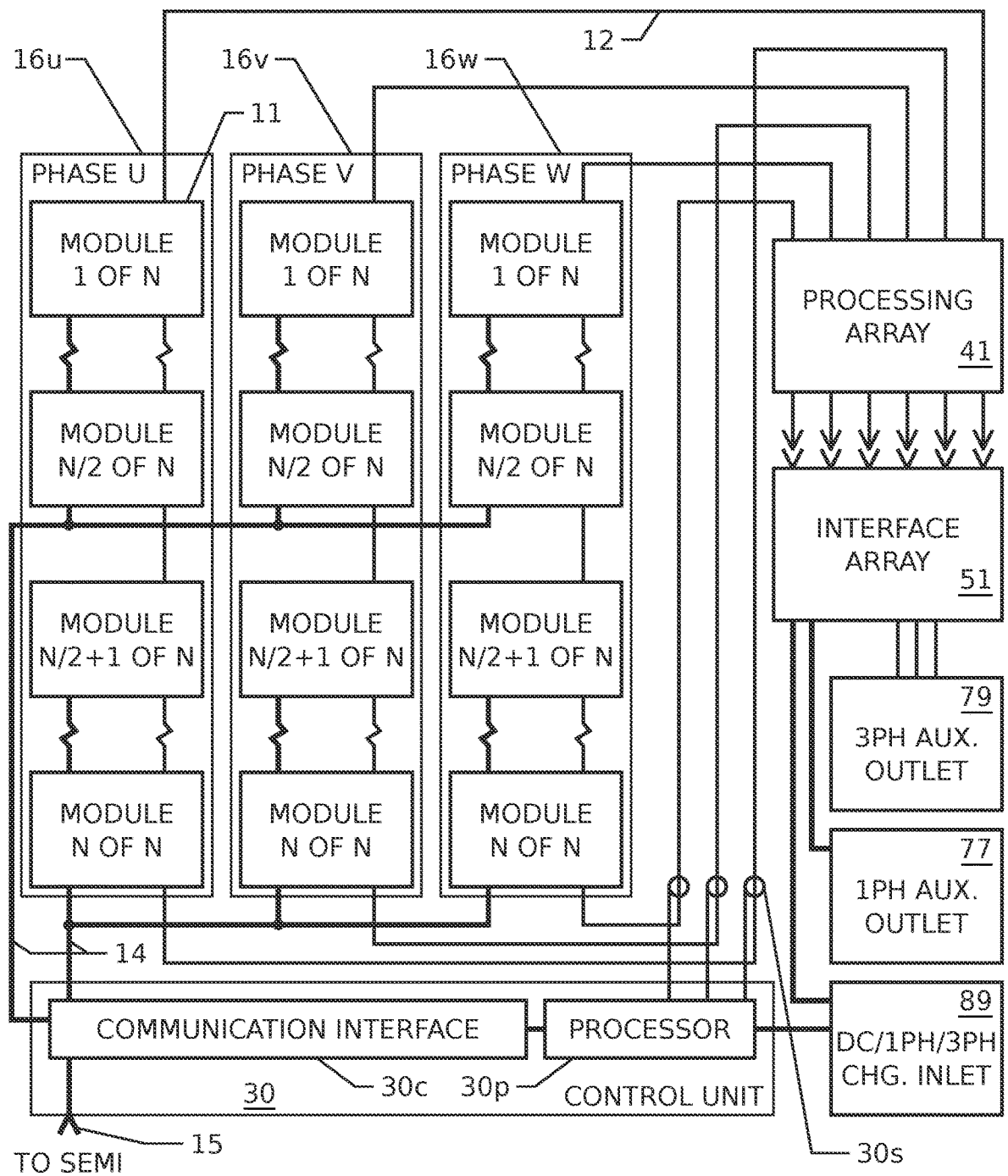
FIG. 30 is a block diagram of a multi-level inverter intended for large trailer applications.

FIG. 30 is a block diagram of a multi-level inverter intended for large trailer applications, which is otherwise identical to the inverter shown in FIG. 29 except that it contains a processing array 41 such as that shown in FIG. 19, which lacks connections for center taps within cascade inverter phases 16*u*, 16*v*, and 16*w*. It is intended that the charge storage elements within modules 11 have double the capacity of those shown in FIG. 29, so folding of the cascade inverter phases—resulting in the effective doubling of the capacity of the charge storage elements—is not required to match the capacity of the charge storage elements in an associated dominant semi truck inverter. This concept is demonstrated in FIG. 39 where the capacity ratings of the charge storage elements are 80, 160, and 160 amp-hours respectively under the small trailer ("ST"), large trailer ("LT"), and semi truck ("SM") columns.

Figure 31:
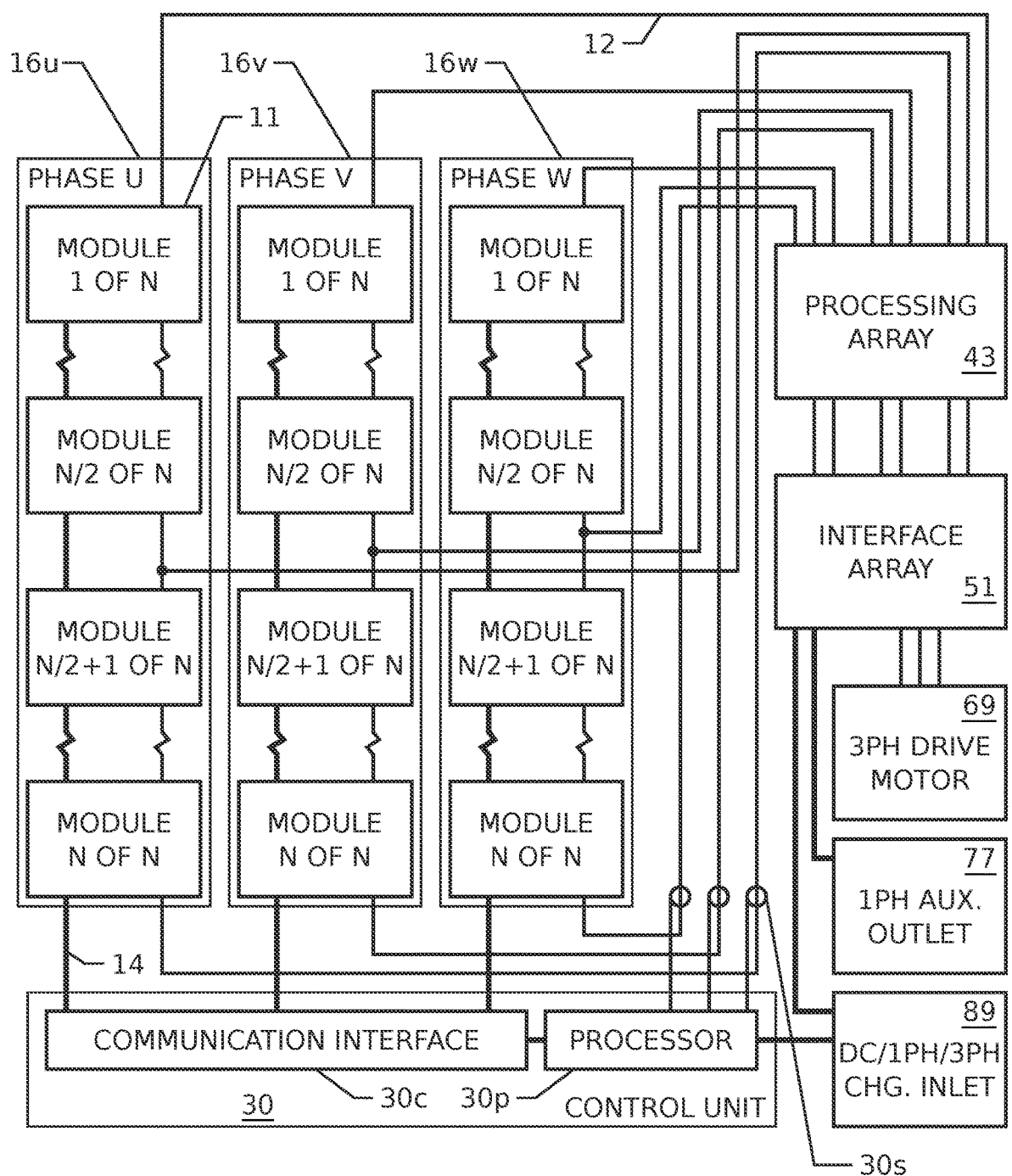
FIG. 31 is a block diagram of a multi-level inverter intended for small passenger car applications.

FIG. 31 is a block diagram of a multi-level inverter intended for small passenger car applications, which contains processing array 43 such as that shown in FIG. 21 and interface array 51 such as that shown in FIG. 23. Modules 11, such as those shown in FIGS. 2 and 3, are organized into three cascade inverter phases 16*u*, 16*v*, and 16*w*. In this embodiment, three internal buses 14 are used, which originate from communication interface 30*c* within control unit 30. Current sensors 30*s* send signals to processor 30*p*, which is also within control unit 30. Module power terminals 12, which include center taps, connect to processing array 43. Processing array 43 then connects to interface array 51, which then connects to drive motor 69, auxiliary outlet 77, and charging inlet 89. Optional signal wires interconnect charging inlet 89 to processor 30*p*.

Figure 32:
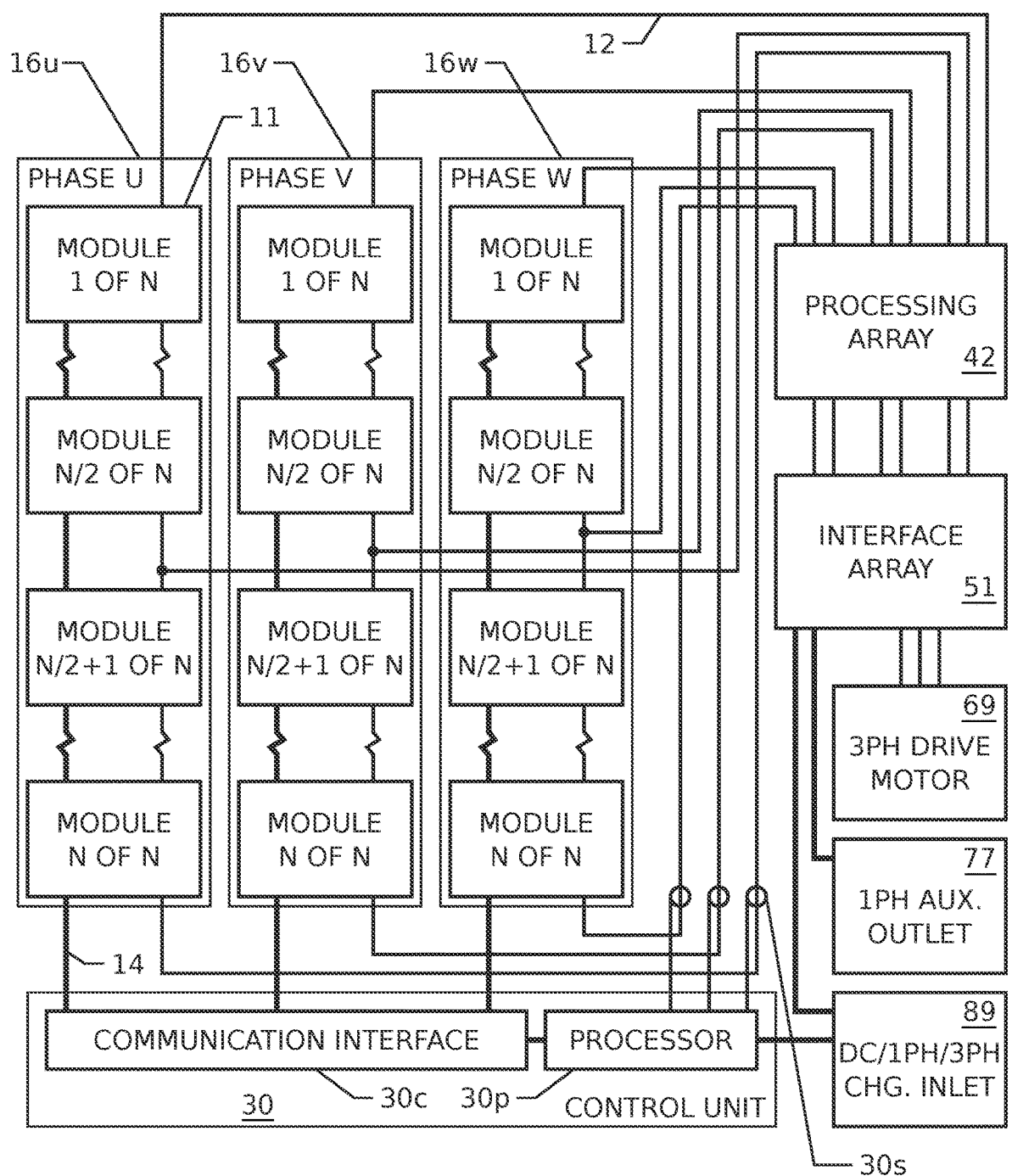
FIG. 32 is a block diagram of a multi-level inverter intended for large passenger car applications.

FIG. 32 is a block diagram of a multi-level inverter intended for large passenger car applications, which is otherwise identical to the inverter shown in FIG. 31 except that it contains a processing array 42 such as that shown in FIG. 20, which lacks control for per-phase electrical heating elements, and modules 11 such as those shown in FIGS. 4, 5, 6, 7, 8, and 9, which feature locally-controlled electrical heating elements. Such differences in embodiment variations are clarified in FIG. 38.

Figure 33:
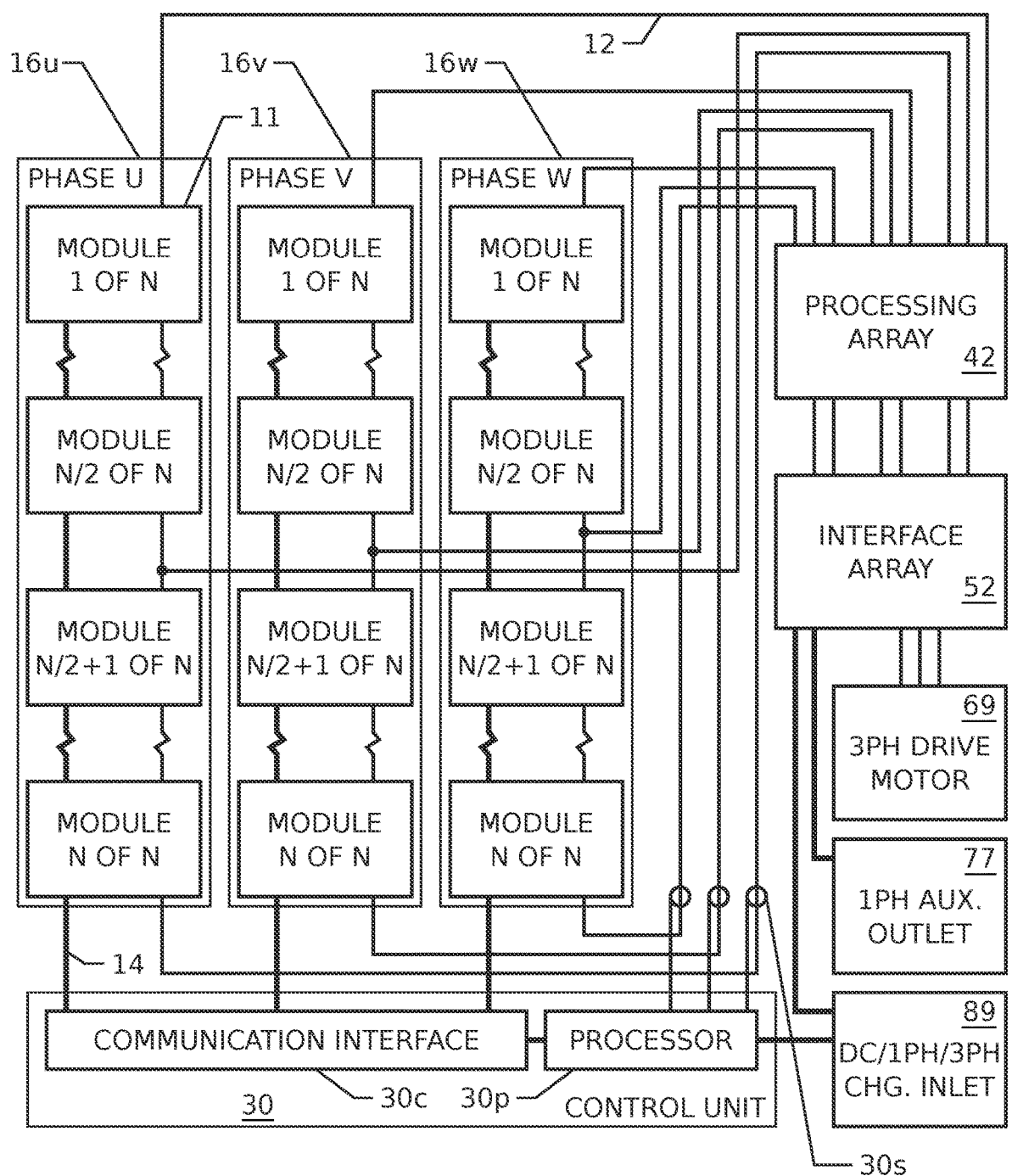
FIG. 33 is a block diagram of a multi-level inverter intended for small work van applications.

FIG. 33 is a block diagram of a multi-level inverter intended for small work van applications, which is otherwise identical to the inverter shown in FIG. 32 except that it contains an interface array 52 such as that shown in FIG. 24, which contains additional ports to accept three virtual cascade inverter phase connections from an external recessive multi-level inverter, wherein the two would become interconnected.

Figure 34:
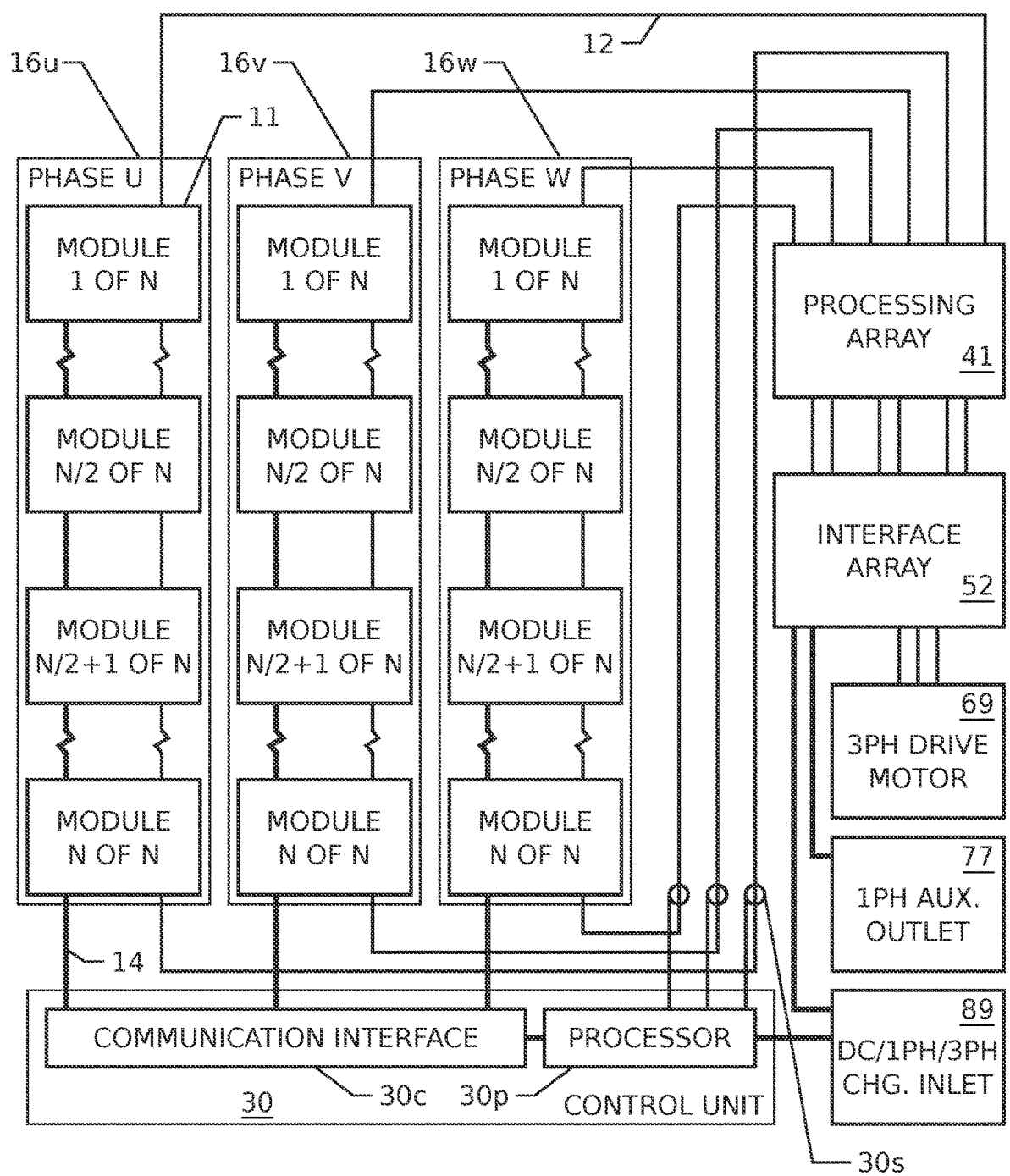
FIG. 34 is a block diagram of a multi-level inverter intended for medium work van, large work van, and semi truck applications.

FIG. 34 is a block diagram of a multi-level inverter intended for medium work van, large work van, and semi truck applications, which is otherwise identical to the inverter shown in FIG. 33 except that it contains a processing array 41 such as that shown in FIG. 19, which lacks connections for center taps within cascade inverter phases 16*u*, 16*v*, and 16*w*. Given the fairly large number of modules 11 in these applications, a parallel as opposed to half-series configuration of cascade inverter phases (see FIG. 39) gives a sufficient voltage range so that center taps would not show much of a benefit for most types of voltage sources (such as charging stations). This is especially the case in an application where the modules feature a series connection of three or more charge storage elements.

Referring to FIGS. 35 and 36, certain element numbers 20 or higher have been changed to end in '5' to refer to elements within recessive multi-level inverters and '6' to refer to elements within dominant multi-level inverters. The specified elements are otherwise still in their original forms as previously described. The numbering change is made only when necessary to distinguish elements within each of FIGS. 35 and 36.

FIG. 35 is a block diagram of a recessive generator set multi-level inverter 10*g*, such as that shown in FIG. 28, interconnected within a dominant medium/large work van multi-level inverter 10*w*, such as that shown in FIG. 34. Communication bus cable 14 (directly connected to module array 25 and communication interface 35*c*) and virtual cascade inverter phase interconnection cable 18 facilitate joining the two inverters, and include some combination of electrical plugs and sockets. Communication bus cable 14 may be used to transfer data between control units 35 and 36 as necessary, in addition to normal module messaging by control unit 36. In some cases, control unit 35 may be largely idle. Disabled equipment 95 within inverter 10*g* includes auxiliary outlet 78 and charging inlet 87 as shown in FIG. 28.

FIG. 36 is a block diagram of a recessive trailer multi-level inverter 10*t*, such as that shown in FIGS. 29 and 30, interconnected within a dominant semi truck multi-level inverter 10*s*, such as that shown in FIG. 34. Communication bus cable 15 (directly connected to communication interface 35*c*) and virtual cascade inverter phase interconnection cable 18 facilitate joining the two inverters, and include some combination of electrical plugs and sockets. Disabled equipment 95 within inverter 10*g* includes auxiliary outlet 79, auxiliary outlet 77, and charging inlet 89 as shown in FIGS. 29 and 30.

Figure 37:
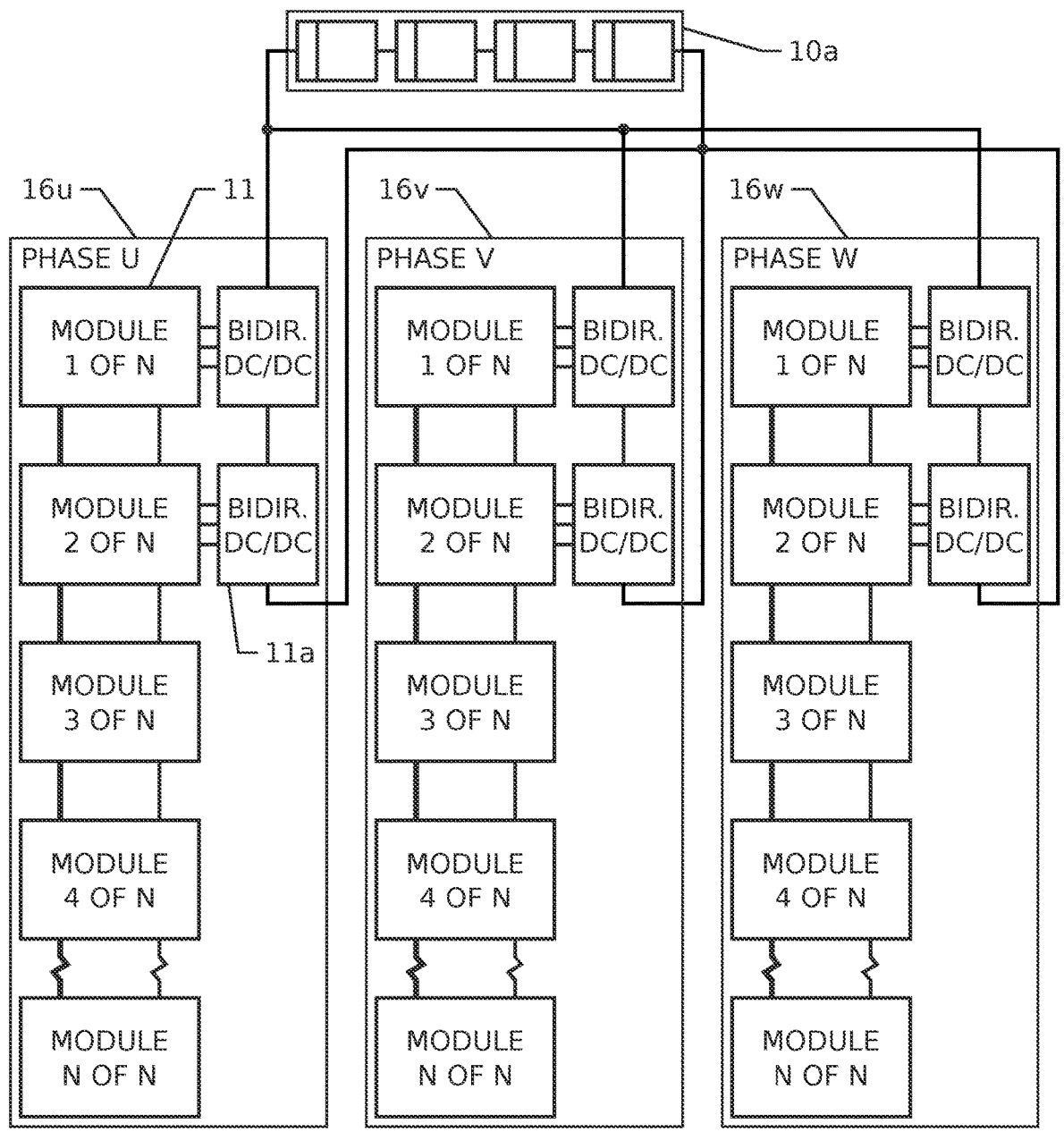
FIG. 37 is a block diagram of a DC accessory supply configuration within a multi-level inverter using bidirectional DC/DC converters on a subset of modules.

FIG. 37 is a block diagram of a DC accessory supply configuration within a multi-level inverter using bidirectional DC/DC converters 11*a* on a subset of modules 11 such as those shown in FIGS. 2, 3, 4, 5, 6, 7, 8, and 9, and including charge storage element set 10*a* (the "accessory battery") which typically has a nominal voltage of approximately 12, 24, 36, or 48 volts DC. Series and/or parallel connections between converters provide flexibility and can support configurable accessory battery voltages. The accessory battery may be employed to provide a small amount of power to the control unit within the inverter and is preferably comprised of charge storage elements similar in type and construction to those within modules 11, for example lithium iron phosphate cells which are nominally 3.2 volts each. The accessory battery may also provide a wide range of power to external needs (such as electric power steering racks or HVAC systems) or even accept power from external sources (such as photovoltaic arrays). Converters 11*a* can be enabled and disabled by modules 11 using one control signal each, and normally all within the inverter will be in the same state as determined by the control unit. They preferably operate with a fixed voltage ratio and essentially serve as balancers to proportionally equalize the voltage of the accessory battery with the voltages of a subset of the cells (or other types of charge storage elements) in the pack—in the case of FIG. 37, those within the first and second modules 11 of each cascade inverter phase 16*u*, 16*v*, and 16*w*. Therefore, any voltage imbalance will be continually corrected among this group of cells as long as converters 11*a* are enabled. The quantity of modules with converters should be consistent among the cascade inverter phases in all inverter designs, and if cascade inverter phase center taps are present, it is strongly preferred that the quantity of modules with converters is symmetrical about the center taps.

While the inverter is operating, regardless of the direction of power flow, at least some balancing is possible between the modules with converters and those without by varying the output voltage modulation of each (i.e. what fraction of time each module's differential output is zero versus non-zero). The amount of balancing possible is affected by the load/source power factor as well as the achievable ratio of duty cycles between modules with and without converters. This ratio is affected by the commanded inverter output voltage, the fraction of modules with converters to those without, the state of charge of the cells in the inverter, and the ratio of the capacity of the cells within modules with converters to those in modules without. To improve the ability to keep cells in the inverter balanced, it may be prudent to moderately reduce the designed capacity of the cells within modules with converters relative to those without, so as to normalize the virtual capacity of the cells within the inverter.

While the inverter is idle, the total number of cells may be balanced by connecting the drive motor or a similar low-impedance load to the cascade inverter phase outputs, and by commanding modules in a proper subset of cascade inverter phases to have a near zero-sum voltage where equivalent numbers of modules with and without converters would have outputs of opposite polarities. The outputs of modules within the remaining cascade inverter phases would be fully off (zero-output/shorted) in the case of a drive motor load so that a return path for current would be present, and continuous cycling would be used to symmetrically equalize all cell voltages. In this way, the entire plurality of cells could be indirectly charged through the accessory battery up to a power level roughly limited by the total rating of the converters. Conversely, the accessory battery may be charged by the modules while the inverter is idle or operating.

FIG. 41A is a table of module addresses for communication buses each supporting three phases and either 20 or 30 modules per phase, and would generally be relevant to inverters with one internal bus. Headers "1×", "2×", "3×", and "6×" refer to modes where multiple modules are addressed at once, which is useful to increase the inverter's output voltage slew rate or to better control modules while cascade inverter phases are folded, placed in parallel, or placed in series for split-phase generator set applications (in order to avoid internal voltage mismatches). Likewise, FIG. 41B is a table of module addresses for communication buses each supporting one phase and either 60, 72, or 84 modules per phase, and would generally be relevant to inverters with three internal buses. The control unit is responsible for determining when to use multiple addressing. It is not necessary that there be a distinct boundary between use and disuse, as all addressing quantities may be mixed during communications, though typically the minimum number of modules will be addressed at once as long as the network can provide enough bandwidth.

Figure 42:
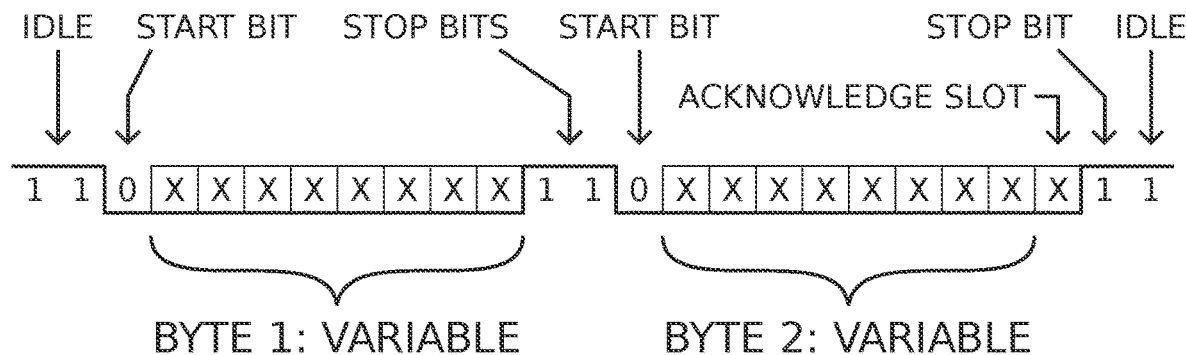
FIG. 42 is a diagram showing a general message sequence to be transmitted over the communication buses.
Figure 43:
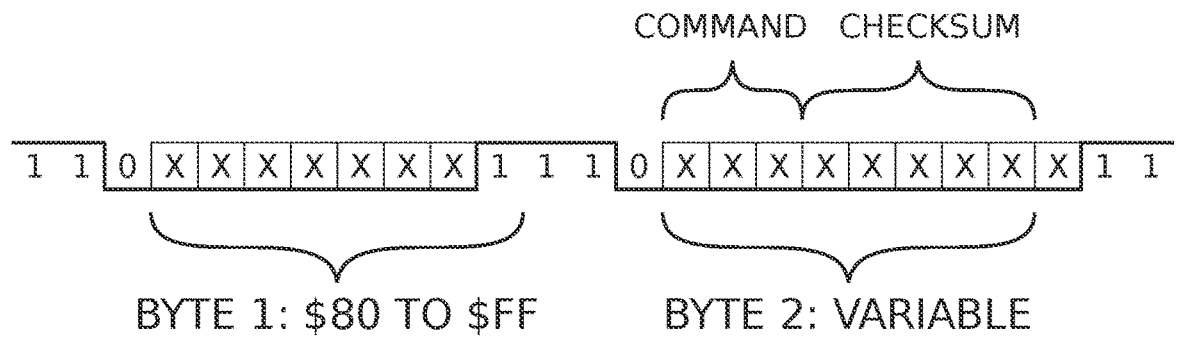
FIG. 43 is a diagram showing a checksummed message sequence to be transmitted over the communication buses.
Figure 44:
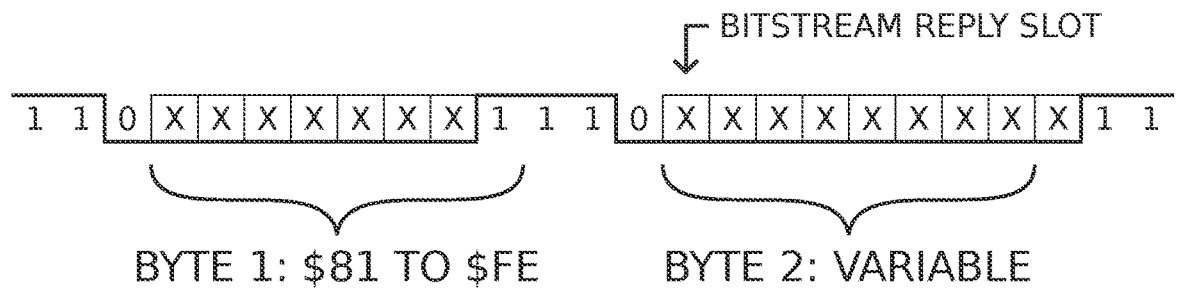
FIG. 44 is a diagram showing a checksummed message sequence including a bitstream reply to be transmitted over the communication buses.

FIGS. 42, 43, and 44 are diagrams showing sample message sequences to be transmitted over the communication buses. All messages are asynchronously timed and are transmitted serially at a rate of preferably 500 kilobaud or greater, where a high level represents a recessive bit and a low level represents a dominant bit. Each individual sequence (or "word") is made up of a pair of back-to-back bytes which each contain one start bit, eight data bits, one acknowledge slot, and one stop bit; least significant bits are transmitted first. Certain micro-controllers may be set to nine-bit operation to support this protocol, where the ninth bit is the acknowledge slot and is always transmitted as a recessive bit by the control unit (but can be read back as bits are echoed, where a dominant value indicates an acknowledgment). Only the acknowledge slot of the second byte is normally used—and only for certain messages—so the acknowledge slot of the first byte effectively acts as an additional stop bit. Extra filler bits are present during bus idle periods to guarantee more time for modules to process transmissions and take any necessary actions. Certain words contain five-bit checksums and typically elicit acknowledgments, as shown in FIG. 43. These will be addressed to specific modules, where the address is contained in the bottom seven bits of the first byte of the sequence, and the command is contained in the bottom three bits of the second byte of the sequence. An address value of zero is a broadcast message and will not elicit an acknowledgment. A value that addresses multiple modules may or may not elicit an acknowledgment depending on the system configuration. All other values will elicit an acknowledgment except for 127, which is invalid for checksummed words and reserved for special messages.

During experimentation, a CRC-5 with the polynomial $\{x^5+x^4+x^2+x+1\}$ has been found to be preferred for the checksum since it is resistant to burst errors up to five bits in length in this application. An alternative implementation could use error correction codes instead of a checksum or cyclic redundancy check, such as the extended Hamming code (16, 11); this code would allow correction of single bit errors and detection of double bit errors.

All implementations of the present invention must include a method for the modules to transmit status information back to the control unit, especially that about the voltage of their charge storage elements. This will of course be done over the communication buses, typically following a specific request from the control unit. Sample returned content could include the average DC voltage for each charge storage element, the AC voltage ripple upon each charge storage element, one or more temperature readings, and an error bitfield which could include notifications of a failed checksum and/or one or more other types of reception problems.

FIG. 44 identifies the bitstream reply slot within select messages, typically H-bridge power stage control messages that would be the vast majority of traffic during normal operation. This slot is similar to the acknowledgment slot where it represents a single bit of data flowing in the opposite direction. Due to the rapid rate of traffic and critical timing needed when driving loads at higher voltages and frequencies, there is limited time for larger chunks of data to be returned from the modules to the control unit. Thus, returning data gradually in this case is preferred. Modules would assemble content which they wish to return into internally recorded bitstreams, for example of 128 bits in length. Each bitstream would preferably include a number of constant identifying bits to act as a synchronization sequence. As bits were returned from this slot to the control unit, the latter would reassemble the bitstreams into readings of voltage, temperature, and other return values.

Figure 45:
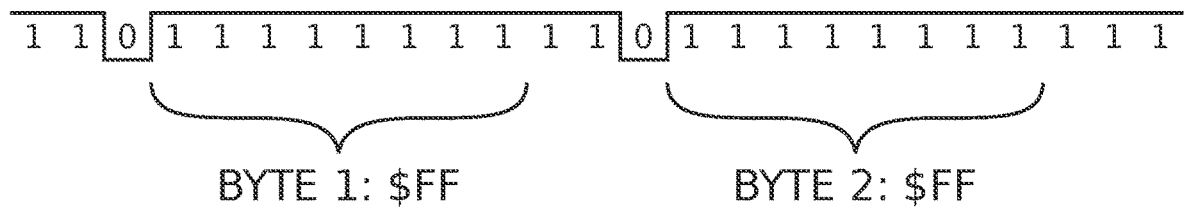
FIG. 45 is a diagram showing a wake/calibrate message sequence relating to the optional wake-from-sleep ability of the modules.
Figure 46:
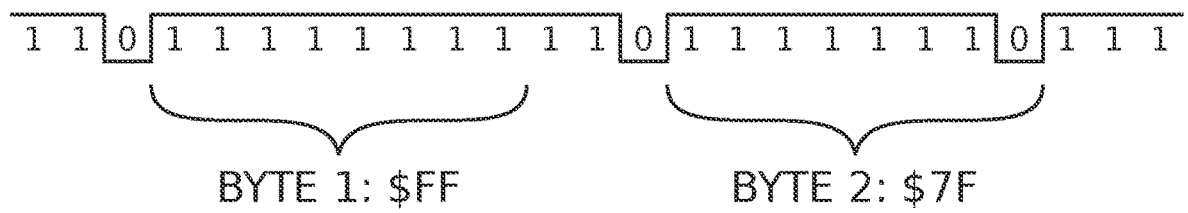
FIG. 46 is a diagram showing a store calibration message sequence relating to the optional wake-from-sleep ability of the modules.
Figure 47:
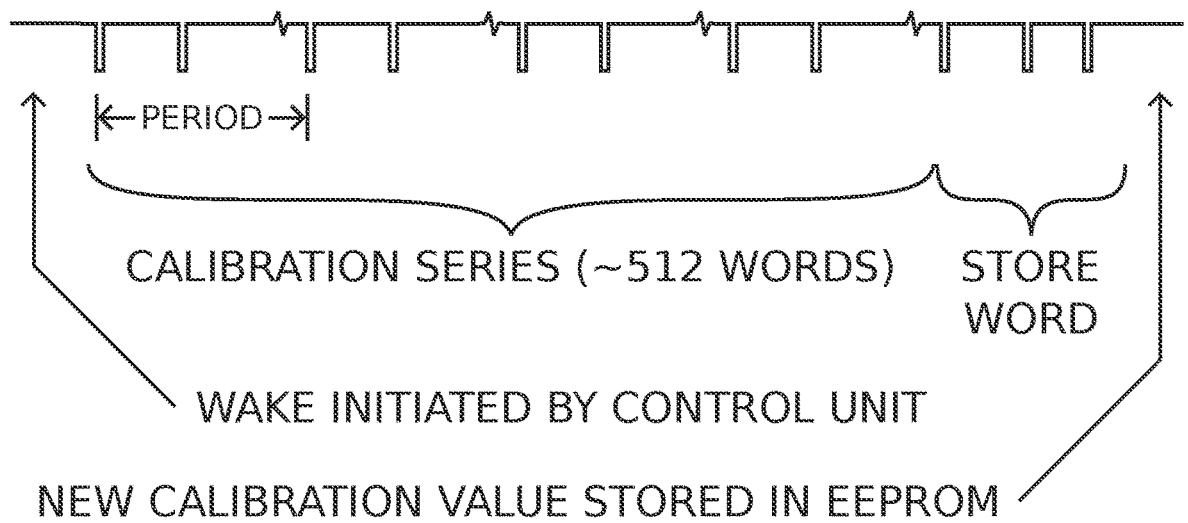
FIG. 47 is a diagram showing the timeline of wake/calibrate and store calibration message sequences relating to the optional wake-from-sleep ability of the modules.

FIGS. 45, 46, and 47 are diagrams showing message sequences relating to the optional wake-from-sleep ability of the modules. Since the communication interfaces within the modules—such as those compliant to ISO 11898-2—may draw a non-negligible amount of current, it may be desired in some systems to disable them while they are not being used to reduce phantom drain from the pack. This creates an issue for system startup in that module data reception is no longer possible in this idle state. To alleviate this, the micro-controller as part of the processing unit within each module will turn on the associated communication interface at a predictable interval, around 50 milliseconds, and keep it on for only a short period of time, around 250 microseconds, thereby keeping the overall duty cycle quite low. This interval will continue indefinitely while asleep so that the modules can detect wake requests sent by the control unit.

As accurate oscillators may be uneconomical for certain applications with a large number of modules, it is practical to use less advanced clock generators for the modules. However, the control unit shall still contain an accurate timebase (the "central clock generator") so that all functions can be performed predictably. To ensure that data from the control unit will be correctly received over the serial buses, the modules must include the ability to calibrate their clock frequencies so that they correlate to the frequency of the central clock generator (the rates may not match, but will be ratiometric). A new calibration process must be carried out at every wake so that any messages that follow are received correctly; certain factors such as age and temperature may invalidate previous calibrations.

To with, the control unit will transmit a clock rate calibration series when it desires to wake the modules and bring them operational. The total duration of the calibration series shall be nearly double the waking interval of the communication interfaces of the modules, so around 100 milliseconds. The message word period as depicted in FIG. 47 shall be shorter than the length of time the communication interfaces remain on during each waking interval, so around 200 microseconds. Once the modules receive a dominant bit of data during the short waking interval, they cancel their normal sleep re-entry and align themselves to the proper start of the next word by avoiding dominant bit detection for 11 bit times plus an added margin for clock rate tolerance. The modules will then receive a large quantity of words sent at a known interval (that shown in FIG. 45), to which the associated micro-controllers are able to calibrate their adjustable module clock generators, which will then correlate to the clock frequency of the central clock generator. The final word sent by the control unit (that shown in FIG. 46) will instruct the modules to store their discovered calibration values in non-volatile memory, such as EEPROM, so that a relatively accurate clock can be generated in case module power is lost (due to repair, etc.). The modules will then remain in the active mode for a certain minimum duration as they await further commands.

Communication interfaces such as those compliant to ISO 11898-2 typically require interconnection cables with three or four conductors. Not only does this conductor count increase the overall risk of breakage, but installation and maintenance become more complicated. For these reasons it is desired to reduce the total conductor count to one per bus. Using a capacitive coupling method allows parallel as opposed to series connections on this conductor, where parallel connections are greatly preferred from a pack construction point of view. It has been found that high-voltage capacitors of around 150 picofarads can achieve reasonable bidirectional data transfer at around one megabaud using an eight megahertz modulated on-off-keying carrier with proper generation and detection circuits, and with appropriate termination and pack design. In this case, a path for return current would be made through the power terminals of the cascade inverter phases.

Though not required, preferred embodiments of the present invention will include galvanic isolation barriers within modules, typically inside their communication interfaces such that fewer signals must be isolated. The aforementioned capacitive coupling method is satisfactory and optical methods may also be used. Certain interface integrated circuits compliant to ISO 11898-2 provide isolation based on signal modulation through capacitors and are therefore a self-contained solution. The CHB multi-level inverter has a much lower isolation voltage slew rate requirement (less than one kilovolt per microsecond) than typical applications using high-voltage PWM (up to 50 kilovolts per microsecond), which opens up possibilities which may not have otherwise been acceptable.

Figure 48:
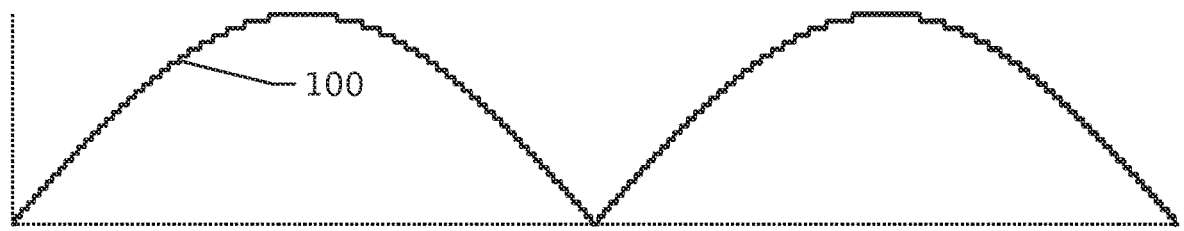
FIG. 48 is a diagram showing half-wave voltage waveforms within the split-phase switching mechanism for generator set applications.
Figure 49:
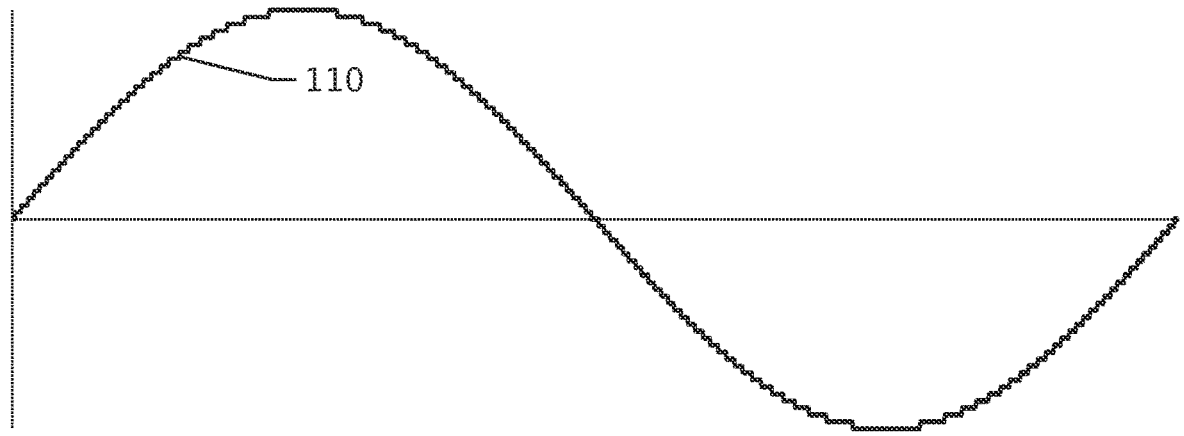
FIG. 49 is a diagram showing line-to-neutral voltage waveforms within the split-phase switching mechanism for generator set applications.
Figure 50:
FIG. 50 is a diagram showing the first and fourth switch states within the split-phase switching mechanism for generator set applications.
Figure 51:
FIG. 51 is a diagram showing the second and third switch states within the split-phase switching mechanism for generator set applications.
Figure 52:
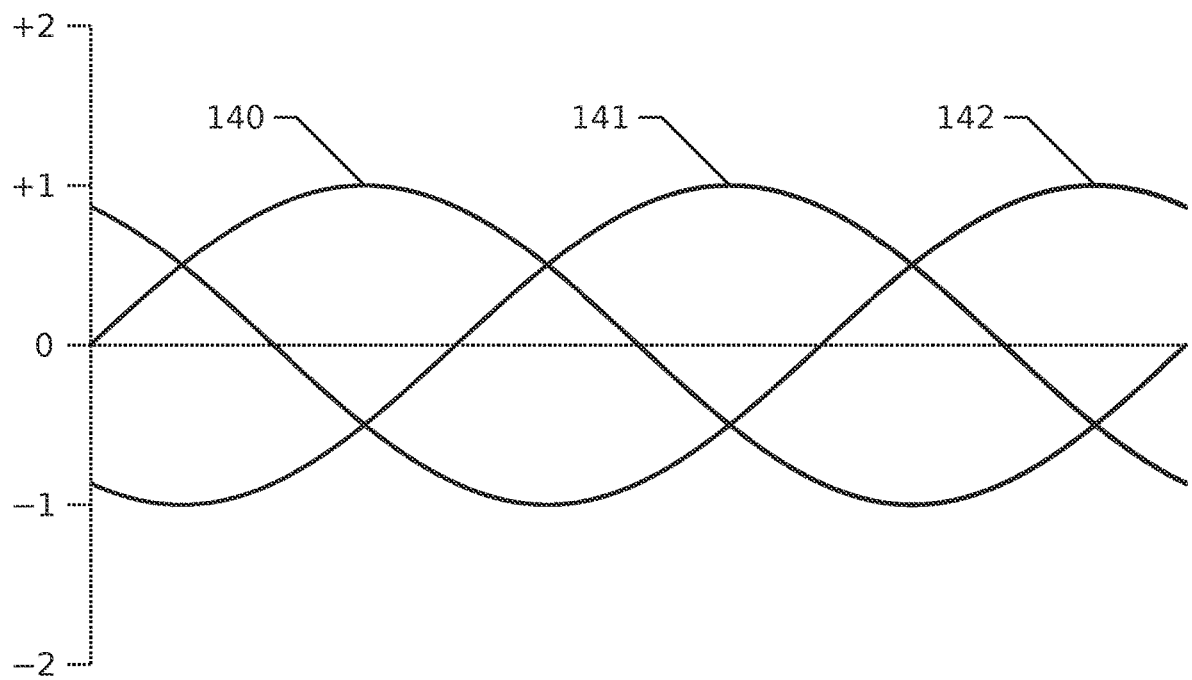
FIG. 52 is a diagram showing line-to-neutral voltage waveforms from a multi-level inverter not employing zero sequence injection.

FIGS. 48, 49, 50, and 51 are diagrams showing the operation of the split-phase switching mechanism for generator set applications and make reference to the element numbers shown in FIG. 26. The waveforms shown in these four figures are continually periodic, and one full cycle is depicted. For split-phase circuits such as 120/240 volts AC, two hot lines 19p and 19q are present that each have a 120 volts AC potential to cold line 19n but are 180 degrees out of phase (trace 110 in FIG. 49), so that the total potential across 19p and 19q is 240 volts AC. This allows various loads (and even sources) to be connected to the generator set, enhancing its versatility. Trace 100 in FIG. 48 shows the voltage difference between lines 19s and 19n as well as 19n and 19t, which resembles a half-wave rectified sine wave. A transistor array comprised of switches 19a, 19b, 19c, and 19d is applied in order to balance the average load between the two halves of the pack, which are on either side of the center tap on virtual cascade inverter phase 17y that is tied to line 19n while the inverter is actively operating in a voltage output mode. The voltage at 19s must always be higher than that at 19t in order for it to be possible to use N-type MOSFET transistors for 19a, 19b, 19c, and 19d, and this condition is satisfied in the shown design. In the first half of the cycle, line 19s connects to line 19p, and line 19t connects to line 19q. These associations reverse in the second half of the cycle, so line 19s now connects to line 19q, and line 19t now connects to line 19p. In this way, the average currents flowing through lines 19s and 19t are roughly equal. Trace 120 in FIG. 50 shows the switch states of 19a and 19d whereas trace 130 in FIG. 51 shows the switch states of 19b and 19c, where a signal trace above the X axis (which is time over one full cycle) denotes a closed switch.

Due to the manner in which the modules' outputs are commanded by the control unit over the serial communication network, the slew rate of the output voltage waveforms across the cascade inverter phases is limited. Shared addressing can overcome this limitation to an extent, but it is preferred to not use it unless necessary as it by definition does not allow individual control of all modules, and therefore full balancing of the charge storage elements is not possible. It is common in standard three-phase inverter drives to utilize state-space PWM control in order to achieve approximately 15.47 percent higher output voltages than would otherwise be accomplished with normal PWM. The neutral point will take on the voltage of a triangle wave three times the frequency of the fundamental wave since this is essentially what is being added to the voltages of all phases equally to better "fit" them inside the DC link. Assuming there are three motor phases spaced at 120 degrees electrically, the third harmonics will cancel out and pure fundamental sine waves will be present across the difference of any two phases. This is known as zero sequence injection, and other neutral-point/offset waveforms are also available such as sinusoidal third harmonics and triplen harmonics, the latter disclosed in U.S. Pat. No. 3,839,667, issued Oct. 1, 1974. Similarly, this technique can be applied to the present invention and provides an identical amount of theoretical voltage boost. Triplen harmonics are especially practicable in the present invention since they result in optimal communication bus usage, where each cascade inverter phase output is stable for 60 electrical degrees twice per full cycle assuming a consistent drive amplitude, requiring no switching during that time. A wye connection of cascade inverter phases shall be used when employing zero sequence injection (as opposed to a delta connection), which in most cases will be the default configuration. It is additionally worth noting that zero sequence injection is not mutually exclusive with shared addressing and they may be enabled simultaneously, and that zero sequence injection may also be applicable to phase counts greater than three with certain waveform modifications.

Figure 53:
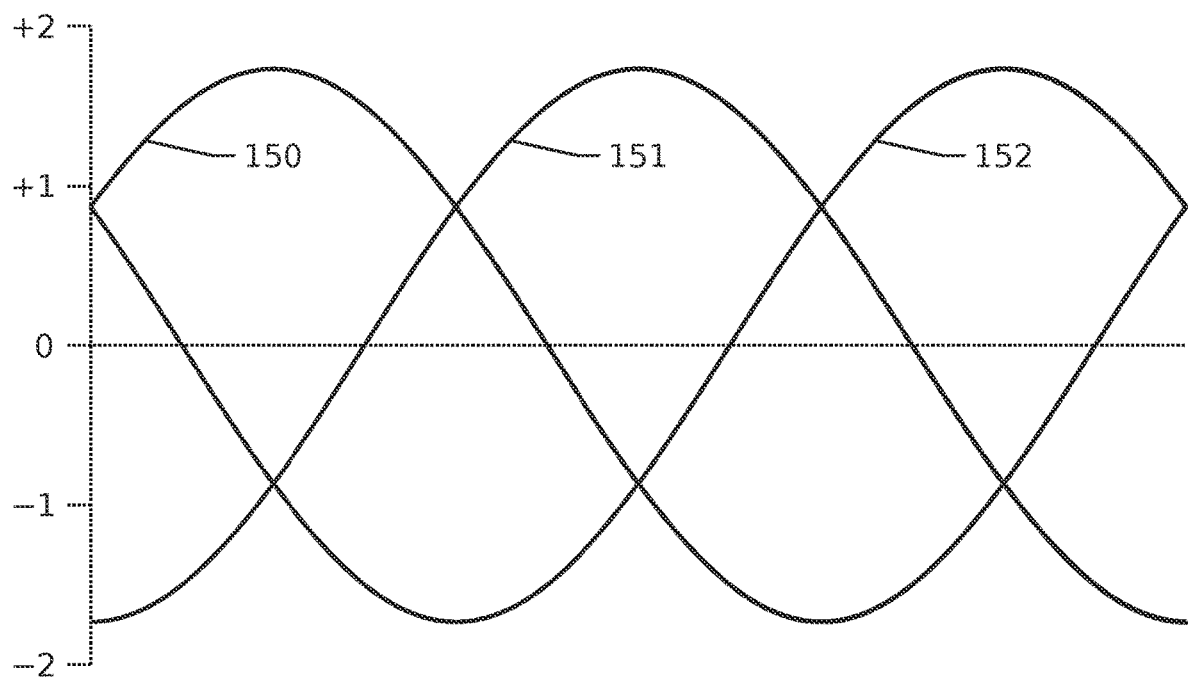
FIG. 53 is a diagram showing line-to-line voltage waveforms from a multi-level inverter not employing zero sequence injection.
Figure 54:
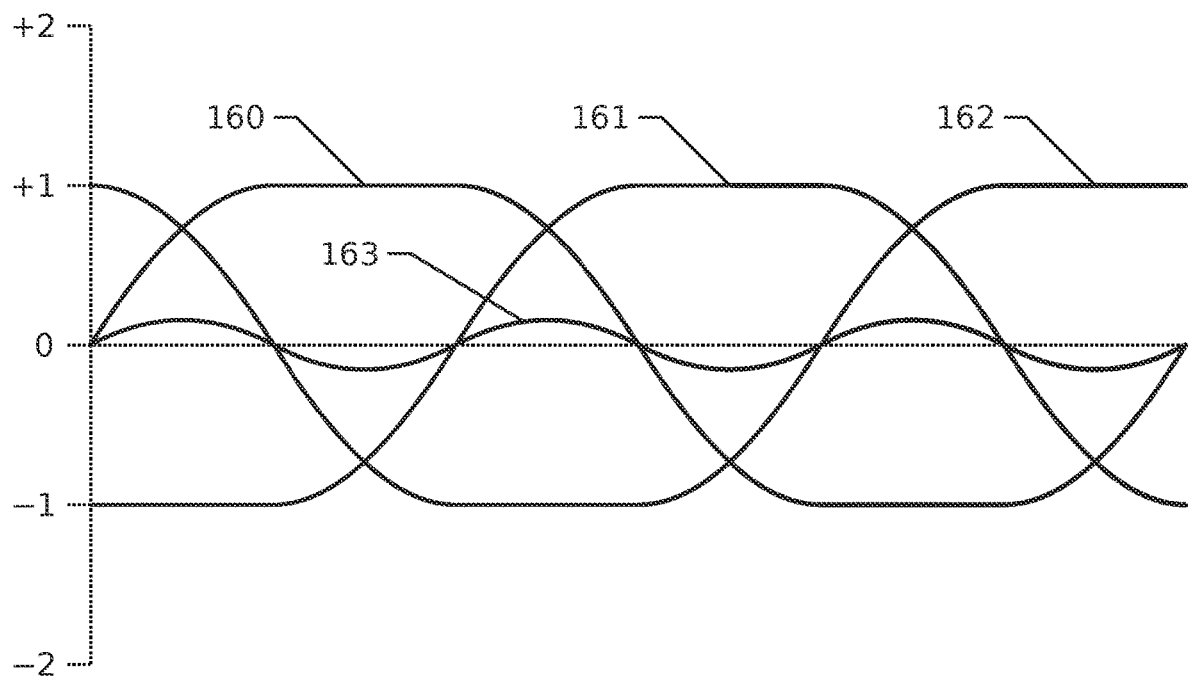
FIG. 54 is a diagram showing line-to-neutral voltage waveforms from a multi-level inverter employing zero sequence injection using triplen harmonics.
Figure 55:
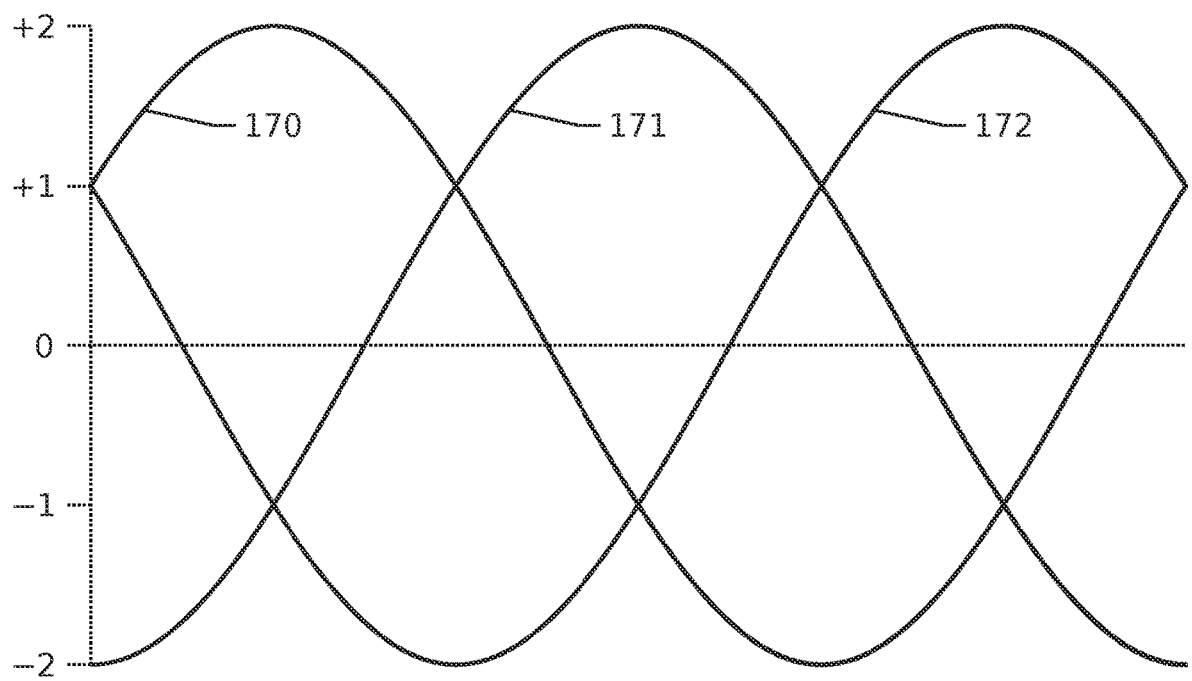
FIG. 55 is a diagram showing line-to-line voltage waveforms from a multi-level inverter employing zero sequence injection using triplen harmonics, demonstrating an extended range compared to FIG. 53.

FIGS. 52, 53, 54, and 55 demonstrate the extended line-to-line voltage range when employing zero sequence injection using triplen harmonics. The relative peak of traces 150, 151, and 152 in FIG. 53 is limited to the square root of three, whereas the relative peak of traces 170, 171, and 172 in FIG. 55 is two, representing a 15.47 percent improvement. Trace 163 in FIG. 54 depicts the triplen harmonic series which is summed with the original line-to-neutral sine waveforms; this effectively represents the neutral voltage with respect to a relative ground. It should be noted that the pure sine components of the line-to-neutral waveforms shown by traces 160, 161, and 162 in FIG. 54 are 15.47 percent greater in amplitude than traces 140, 141, and 142 in FIG. 52, and this is possible since the triplen harmonic series compresses their peaks. Although all traces shown are very smooth, in actual operation a slight amount of stepping would be present—with a Y distance equal to the total charge storage element voltage per module—similar to what is shown in trace 110 in FIG. 49 representing 30 modules in series.

Normally zero sequence injection is used at its full potential at all times when implemented, but this is not necessary nor preferable in the present invention. As the frequency and voltage of the cascade inverter phase outputs together approach a relatively high level, a certain point will be reached where distortion will start to set in due to communication limitations of the serial buses. Crucially, it has been discovered that the amount of voltage distortion created by an overdriven waveform using zero sequence injection is worse than that of one without any injection. As the frequency rises beyond the point of initial distortion, the amount of injection shall be gradually decreased along with the output voltage, such that at a second point there is no longer any injection. This creates a smooth transition between modes and extends the effective operating frequency range of the system. Beyond this second point, the pure sinusoidal output voltages no longer including injection must be proportionally reduced in amplitude relative to frequency to prevent distortion. Optionally, the injection amplitude may be set based on minimum need, where what begins as a pure sinusoidal output waveform will have injection slowly added as the frequency and voltage increase in order to reduce unnecessary neutral point fluctuation in case of motor bearing stress or other similar concerns. In this way, there will be a relatively small area of enabled injection in the space of frequency and voltage variation.

In order to support DC charging which should almost always be a capability, it is preferred for the modules to be able to drive their H-bridge power stage transistors fully statically. Some gate drive circuits can only operate at a very high duty cycle such as 95%, but this is generally unacceptable for the purpose of the present invention. Circuits which use bootstrapping to drive high-side transistors require a short off-time—where the low-side transistor in the half-bridge pair would be conducting—in order to recharge each bootstrap capacitor. This is a less expensive method of generating a voltage above that of the series electrical combination of the charge storage elements in order to provide a proper gate drive signal for the high-side transistors within the H-bridge power stage. However, in the present invention, a separate charge pump or other type of boost circuit would be required if the high-side transistors were N-type, possibly powered by components of the balancing circuit. There may be other types of gate drive circuits which work on AC only, such as that directly using isolation transformers, and these shall be avoided unless they can be modified to output fully static drive signals.

In most cases it is desired to balance the heat dissipation across the low-side and high-side H-bridge power stage switch pairs, such as those represented by 11t within module 11 as shown in FIG. 2. A more equal distribution of dissipation will alleviate the existence of hotspots as well as lower the overall peak temperature, reducing stress on these components. Ideally the time-averaged dissipation will be equal per individual switch. As the vast majority of waste heat will be created by current flowing through these switches while they are on (as opposed to switching losses), the time which each spends on shall be explicitly controlled with this factor in mind. It should be recalled that the zero-output/shorted state of an H-bridge power stage can be achieved in two separate modes: one where all low-side switches are on, and one where all high-side switches are on. If the low-side and high-side switches are identical components and are driven with a similar gate drive level, the zero-output/shorted state of the module shall be controlled to symmetrically alternate between the low-side switches being on and the high-side switches being on over a given time interval (with the opposite switches being off in each case). This selection may be managed by the control unit, by each module, or through a combination of both. Notably, the optimal on-time percentage will shift to prefer the low-side switches if for example the high-side switches have a higher intrinsic resistance or are driven by a relatively weaker gate drive signal, the latter which may be applicable to certain designs using N-type MOSFETs.

In the case of a sudden unexpected communication loss, which may indicate an automobile accident or another incident of some kind, modules shall take an action to safely disable themselves to reduce electrocution and fire risks. This is accomplished by modules recording the last known incoming message which has been addressed to them directly, as part of a larger subset (with typically one, two, or three other modules), or any message whatsoever. If the passage of time exceeds 100 milliseconds for example (a "predefined time period"), a module will override the last state command from the control unit and set its H-bridge power stage to either a zero-output/shorted state or an open state (a "predefined state"). Typically, the zero-output/ shorted state will be preferred during normal operation because it may be the case that only one module has lost communication, and this state will allow the inverter to continue operating with the exception of that module as current can still be passed through the associated cascade inverter phase without negative side effects. In that case, the control unit may detect the voltage loss (if voltage sensors are present within the control unit) and continue executing its algorithms accounting for the failure of that module. Conversely, the open state may be preferred in some applications in order to reduce fault currents in case of an accident, but a failure in this case will generally disable the vehicle.

In order to monitor the state of charge and/or health of the charge storage elements, a live method of calculating internal impedances is desirable. This may be accomplished within the control unit by analyzing voltage drop data reported by each module against current readings such as those known via sensors 30s in FIG. 1. As a module's H-bridge power stage changes state from a zero output to a non-zero output, any current in the associated cascade inverter phase—which may be positive or negative—will then flow through the charge storage elements, thereby affecting the voltage of each. An opposite change will occur as the H-bridge power stage reverses state again. The impedance of each charge storage element will be roughly equal to the voltage change divided by the current change, though frequency effects must be taken into account through more advanced calculations due to the presence of discrete steps (typically leading to an exponential decay of voltage toward a steady-state value). Phase data may also be gathered and processed so that the imaginary parts of the impedances could be known. The collection of such data would generally require each module to be switching at a first switching rate (while operating normally) as opposed to a zero rate (while idle).

It is further envisioned that voltage waveforms of a second switching rate may be superimposed on the modules' differential outputs by the control unit commanding additional H—bridge power stage state changes which would not contribute to—or at least not interfere with—normal functioning. For example, two modules within the same cascade inverter phase may be commanded to output differential voltages in opposing directions nearly simultaneously, thereby canceling each other out. Alternatively, short pulses of H-bridge power stage state changes may be commanded by the control unit on the plurality of modules in order to continue observing impedance effects where large currents would not otherwise be present, such as while the multi-level inverter was idle. Using this second switching rate superimposition technique, a broad spectrum of frequency responses may be determined for the internal impedances of the charge storage elements which would not otherwise be available where only the first switching rate was in effect. This broad spectrum may prove useful for certain algorithms which predict the state of charge and/or health of the charge storage elements.

The CHB topology is very well suited to utility electric grid stabilization, and not only through large stationary installations. Vehicles of all size would support utility interaction, where external commands sent through protocols such as ISO 15118-2 or J3068 would command desired current flow. These external commands may request reductions in charging power, which is a milder version of vehicle-to-grid (V2G). Controlling reactive power is also well within the domain of the present invention, and can be helpful to utilities in certain cases. For V2G to be applied to most existing electric vehicles above a level of a few kilowatts, expensive DC-to-AC conversion circuitry must be installed at the base station. This represents a significant opportunity for the inverter disclosed here, as infrastructure cost is greatly reduced to achieve high-power V2G capabilities. Furthermore, a low-cost switching array allows simple interaction with a large range of voltages.

The present invention has significant algorithmic versatility, especially when it is the combination of two interconnected systems. By intelligently setting the states of the H-bridge power stages within the modules, a control unit can arrange power transfer between dominant and recessive interconnected inverters while the overall system is charging, discharging, or idle. In general this will be accomplished by turning modules within each original inverter on in opposing directions so that the current flowing to the charge storage elements within each is inverted in polarity. For example, a dominant inverter may recharge charge storage elements within a recessive inverter while the interconnected pair was driving a motor.

While multi-level inverters are idle in warehouse storage during the production and assembly process, cycle testing and management of charge storage elements may be simplified by utilizing built-in inverter functionality in order to avoid the need for specialized testing equipment. The presence of electronics and logic on the modules reduces the need for external monitoring and control hardware and streamlines the manufacturing and distribution process. At the same time, these inverters may be used to stabilize the local power grid. Ideally, a base station would communicate with multi-level inverters over an auxiliary network bus, which for example could be later repurposed for in-vehicle communications. Manufacturing personnel would monitor and control operation of inverter systems through the base station. Errors could be immediately identified and rapidly corrected due to the modular nature of the present invention.

What is claimed is:

1. A first multi-level inverter, the first multi-level inverter comprising:
a plurality of modules, each module comprising: at least two charge storage elements, a balancing circuit for equalizing individual voltages of the at least two charge storage elements within the same module, an H-bridge power stage with a power input provided by the at least two charge storage elements connected in series, wherein the H-bridge power stage, in turn, comprises a plurality of transistors configured to produce a differential output voltage from the module on two differential outputs, and a processing unit configured to control a state of the H-bridge power stage, wherein the processing unit further comprises a first communication interface;
at least one cascade inverter phase comprising at least two modules and two power terminals, wherein when more than one cascade inverter phase is present, each cascade inverter phase has the same number of modules, wherein the modules within the at least one cascade inverter phase are connected in series between the two power terminals using the differential outputs of each module;
a first control unit comprising: a processor configured to define the state of each H-bridge power stage within a respective module of the plurality of modules, and a second communication interface operatively connected to at least one individual bus; and
a communication network comprising the at least one individual bus common to at least two modules operatively connected thereto, wherein the at least one individual bus is configured to facilitate bidirectional data transfer between the first communication interface of the plurality of modules and the second communication interface of the first control unit, wherein the first control unit is further configured to operatively communicate the defined state of the H-bridge power stage within the respective module to the plurality of modules, wherein each module is assigned an address which is unique within the individual bus associated therewith, and wherein the plurality of modules are further configured to communicate information about the respective state of their charge storage elements to the first control unit.

2. The first multi-level inverter of claim 1, wherein at least one module further comprises at least one metal circuit breaking spring configured to facilitate current flow between the charge storage elements and the H-bridge power stage thereof, and wherein the at least one metal circuit breaking spring is further configured to interrupt current flow upon occurrence of an overcurrent condition.

3. The first multi-level inverter of claim 2, wherein the at least one metal circuit breaking spring is configured to interrupt current flow upon occurrence of an overtemperature condition.

4. The first multi-level inverter of claim 1, further comprising an accessory battery and at least one converter to transfer energy between at least one charge storage element within at least one module and the accessory battery.

5. The first multi-level inverter of claim 1, further comprising at least one electrical heating element configured to warm at least one charge storage element within at least one module.

6. The first multi-level inverter of claim 5, further comprising at least one switch configured to connect the at least one electrical heating element in series with at least one cascade inverter phase thereof.

7. The first multi-level inverter of claim 5, further comprising at least one charging inlet and at least one switch configured to connect the at least one electrical heating element in series with the at least one charging inlet thereof.

8. The first multi-level inverter of claim 1, wherein at least one module further comprises at least one electrical heating element configured to warm at least one charge storage element thereof.

9. The first multi-level inverter of claim 1, wherein at least one module is assigned at least one additional address which is shared with at least one other module.

10. The first multi-level inverter of claim 9, wherein the first control unit is configured to command a simultaneous action on a group of at least two modules using the at least one additional address.

11. The first multi-level inverter of claim 1, wherein data transmitted by the first control unit over the communication network are organized into messages.

12. The first multi-level inverter of claim 11, wherein at least one module is configured to validate integrity of at least one message.

13. The first multi-level inverter of claim 11, wherein at least one module is configured to report an acknowledgment to the first control unit during or following reception of at least one message.

14. The first multi-level inverter of claim 11, wherein at least one module is configured to internally record a bitstream comprising locally gathered status information and report at least one bit from the bitstream to the first control unit during or following reception of at least one message.

15. The first multi-level inverter of claim 11, wherein the processing unit within at least one module is configured to force the associated H-bridge power stage into a predefined state when a message within a group of at least one message type is not received within a predefined time period.

16. The first multi-level inverter of claim 1, wherein at least one module is configured to enter a sleep mode with reduced current consumption and disabled first communication interface.

17. The first multi-level inverter of claim 16, wherein at least one module is configured to periodically wake from the sleep mode to check for communications.

18. The first multi-level inverter of claim 1, wherein the first control unit further comprises a central clock generator, wherein at least one module further comprises a module clock generator, and wherein the processing unit within the at least one module correlates the module clock generator thereof to the central clock generator based on the data transmission rate of the first control unit.

19. The first multi-level inverter of claim 1, wherein the first communication interface of at least one module is configured to provide galvanic isolation.

20. The first multi-level inverter of claim 1, wherein at least one individual bus within the communication network comprises a single conductor capacitively coupled to the first communication interface of at least one module.

21. The first multi-level inverter of claim 1, further comprising a split-phase power outlet and a transistor array, wherein the transistor array interfaces the split-phase power outlet to the plurality of modules, and wherein the transistor array is configured to equalize energy flow through the charge storage elements within the plurality of modules.

22. The first multi-level inverter of claim 1, wherein the H-bridge power stage within at least one module comprises a plurality of low-side switches and a plurality of high-side switches, and wherein the H-bridge power stage is operated to equalize heat dissipation between the plurality of low-side switches and the plurality of high-side switches.

23. The first multi-level inverter of claim 1, wherein the processing unit within at least one module is configured to provide individual static drive signals to corresponding individual transistors of the plurality of transistors thereof in order to continuously hold the H-bridge power stage thereof in the same state without interruption.

24. The first multi-level inverter of claim 1, further comprising at least one current sensor associated with at least one cascade inverter phase, wherein at least one module within the at least one cascade inverter phase is configured to communicate voltage information about at least one charge storage element thereof to the first control unit, and wherein the first control unit is configured to determine the internal impedance of the at least one charge storage element from current changes through the associated current sensor and voltage changes.

25. The first multi-level inverter of claim 24, wherein when the H-bridge power stage within the at least one module is operated at a zero rate or at a first switching rate, it is also operated at a second switching rate superimposed on the zero rate or the first switching rate respectively.

26. The first multi-level inverter of claim 1, wherein the communication network further comprises an auxiliary individual bus configured to communicate with a base station during the manufacturing process thereof to facilitate testing of the first multi-level inverter.

27. The first multi-level inverter of claim 1, comprising at least three cascade inverter phases with a first power terminals of all cascade inverter phases connected together to form an electrical wye (Y) configuration, wherein the first control unit is configured to define each differential output voltage across the power terminals of each respective cascade inverter phase based on a respective voltage command, and wherein the voltage commands are substantially sinusoidal and have equally spaced phase angles.

28. The first multi-level inverter of claim 27, wherein all voltage commands are summed with a zero sequence injection harmonic waveform followed by a rescaling by the control unit to achieve a higher amplitude sinusoidal voltage between a second power terminals of any two adjacent cascade inverter phases.

29. The first multi-level inverter of claim 28, wherein the summed zero sequence injection harmonic waveform is modulated in amplitude by the control unit according to the frequency of the voltage commands, the amplitude of the voltage commands, and the data bandwidth of the communication network.

30. An electric vehicle comprising an alternating current (AC) drive motor, at least one charging inlet, and at least one first multi-level inverter of claim 1 having at least three cascade inverter phases.

31. The electric vehicle of claim 30, wherein the electric vehicle is configured to modify its charge or discharge rate through the at least one charging inlet based on external information received by the electric vehicle.

32. The first multi-level inverter of claim 1, wherein the processor within the first control unit is configured to control the direction of energy flow to a subgroup of modules in the opposite direction of energy flow to the plurality of modules.

33. The first multi-level inverter of claim 1, further comprising at least one connector configured to attach the first multi-level inverter to another multi-level inverter.

34. A group of interconnected multi-level inverters comprising the first multi-level inverter of claim 33 with a respective control unit designated as a dominant control unit and a second multi-level inverter of claim 33 with the respective control unit designated as a recessive control unit, wherein the dominant control unit defines operation of the entire group of interconnected multi-level inverters.

35. The first multi-level inverter of claim 33, further comprising a switching array, in turn comprising a processing array connected to an interface array.

36. A group of interconnected multi-level inverters comprising a first multi-level inverter of claim 35 with the respective control unit designated as a dominant control unit and a second multi-level inverter of claim 35 with the respective control unit designated as a recessive control unit, wherein the dominant control unit defines operation of the entire group of interconnected multi-level inverters, and wherein the processing array of the second multi-level inverter is disconnected from the interface array thereof and connected to the interface array of the first multi-level inverter.

37. The group of interconnected multi-level inverters of claim 36, wherein the first multi-level inverter is contained within an electric vehicle, wherein the second multi-level inverter is contained within a detachable trailer associated with the electric vehicle, and wherein the energy among the first multi-level inverter and second multi-level inverter is redistributed based on operative commands from the dominant control unit.

* * * * *